(12) United States Patent
Igasaki et al.

(10) Patent No.: US 11,471,976 B2
(45) Date of Patent: Oct. 18, 2022

(54) LASER LIGHT RADIATION DEVICE AND LASER LIGHT RADIATION METHOD

(71) Applicant: HAMAMATSU PHOTONICS K.K., Hamamatsu (JP)

(72) Inventors: Yasunori Igasaki, Hamamatsu (JP); Aiko Nakagawa, Hamamatsu (JP); Takeshi Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 659 days.

(21) Appl. No.: 16/082,982

(22) PCT Filed: Mar. 10, 2017

(86) PCT No.: PCT/JP2017/009764
§ 371 (c)(1),
(2) Date: Sep. 7, 2018

(87) PCT Pub. No.: WO2017/155104
PCT Pub. Date: Sep. 14, 2017

(65) Prior Publication Data
US 2019/0084089 A1 Mar. 21, 2019

(30) Foreign Application Priority Data
Mar. 10, 2016 (JP) .............................. JP2016-047159

(51) Int. Cl.
*B23K 26/38* (2014.01)
*B23K 26/04* (2014.01)
(Continued)

(52) U.S. Cl.
CPC ............ *B23K 26/38* (2013.01); *B23K 26/032* (2013.01); *B23K 26/04* (2013.01); *B23K 26/043* (2013.01);
(Continued)

(58) Field of Classification Search
CPC .... B23K 26/38; B23K 26/064; B23K 26/705; B23K 26/032; B23K 26/04; B23K 26/043;
(Continued)

(56) References Cited

U.S. PATENT DOCUMENTS

| 7,333,255 B2 * | 2/2008 | Eda | B23K 26/064 |
| | | | 359/197.1 |
| 8,134,099 B2 * | 3/2012 | Nakano | B23K 26/046 |
| | | | 219/121.69 |

(Continued)

FOREIGN PATENT DOCUMENTS

| CN | 101403822 A * | 4/2009 |
| CN | 101403822 A | 4/2009 |

(Continued)

OTHER PUBLICATIONS

English translation of CN-101403822-A (Year: 2009).*
International Preliminary Report on Patentability dated Sep. 20, 2018 for PCT/JP2017/009764.

*Primary Examiner* — Chris Q Liu
(74) *Attorney, Agent, or Firm* — Faegre Drinker Biddle & Reath LLP

(57) ABSTRACT

A laser machining device includes a laser light source, a spatial light modulator which includes a display unit, an objective lens, an image-transfer optical system, a camera and a controller. The controller executes first display processing and second display processing. According to first display processing, when the camera captures the image, the display unit displays a first phase pattern for adjusting a condensing position of laser light condensed by the objective lens to a first condensing position. According to second display processing, when the camera captures the image, the display unit displays a second phase pattern for adjusting the condensing position of the laser light condensed by the (Continued)

objective lens to a second condensing position different from the first condensing position in an irradiation direction of the laser light.

6 Claims, 31 Drawing Sheets

(51) Int. Cl.
  *B23K 26/064* (2014.01)
  *B23K 26/70* (2014.01)
  *B23K 26/03* (2006.01)
  *B23K 26/06* (2014.01)
  *B23K 26/08* (2014.01)
  *B23K 26/402* (2014.01)
  *B23K 103/00* (2006.01)
  *B23K 101/36* (2006.01)
  *G02B 5/08* (2006.01)
  *H01S 3/10* (2006.01)
  *G02B 7/198* (2021.01)

(52) U.S. Cl.
  CPC ........ *B23K 26/064* (2015.10); *B23K 26/0643* (2013.01); *B23K 26/0648* (2013.01); *B23K 26/0665* (2013.01); *B23K 26/0884* (2013.01); *B23K 26/402* (2013.01); *B23K 26/705* (2015.10); *G02B 5/08* (2013.01); *G02B 7/198* (2013.01); *H01S 3/10* (2013.01); *B23K 2101/36* (2018.08); *B23K 2103/50* (2018.08)

(58) Field of Classification Search
  CPC ............ B23K 26/0643; B23K 26/0648; B23K 26/0665; B23K 26/0884; B23K 26/402; B23K 26/53

USPC ............ 219/121.67, 121.74, 121.75, 121.78; 438/463

See application file for complete search history.

(56) References Cited

U.S. PATENT DOCUMENTS

| | | | |
|---|---|---|---|
| 2005/0098548 A1* | 5/2005 | Kobayashi | B23K 26/067 219/121.73 |
| 2006/0121697 A1* | 6/2006 | Fujii | H01L 21/30604 438/460 |
| 2009/0117712 A1* | 5/2009 | Sakamoto | B23K 26/40 219/121.69 |
| 2009/0212030 A1* | 8/2009 | Clifford, Jr. | B23K 26/046 219/121.72 |
| 2010/0232007 A1* | 9/2010 | Byren | F41H 13/005 359/239 |

FOREIGN PATENT DOCUMENTS

| | | |
|---|---|---|
| CN | 101772398 A | 7/2010 |
| CN | 103917914 A | 7/2014 |
| CN | 105189025 A | 12/2015 |
| JP | 3878758 B2 | 2/2007 |
| JP | 2009-34723 A | 2/2009 |
| JP | 2009-82966 A | 4/2009 |
| JP | 2011-31284 A | 2/2011 |
| JP | 2011-51011 A | 3/2011 |
| KR | 10-2009-0033817 A | 4/2009 |
| KR | 10-2010-0044791 A | 4/2010 |

* cited by examiner

Fig.25
(a)
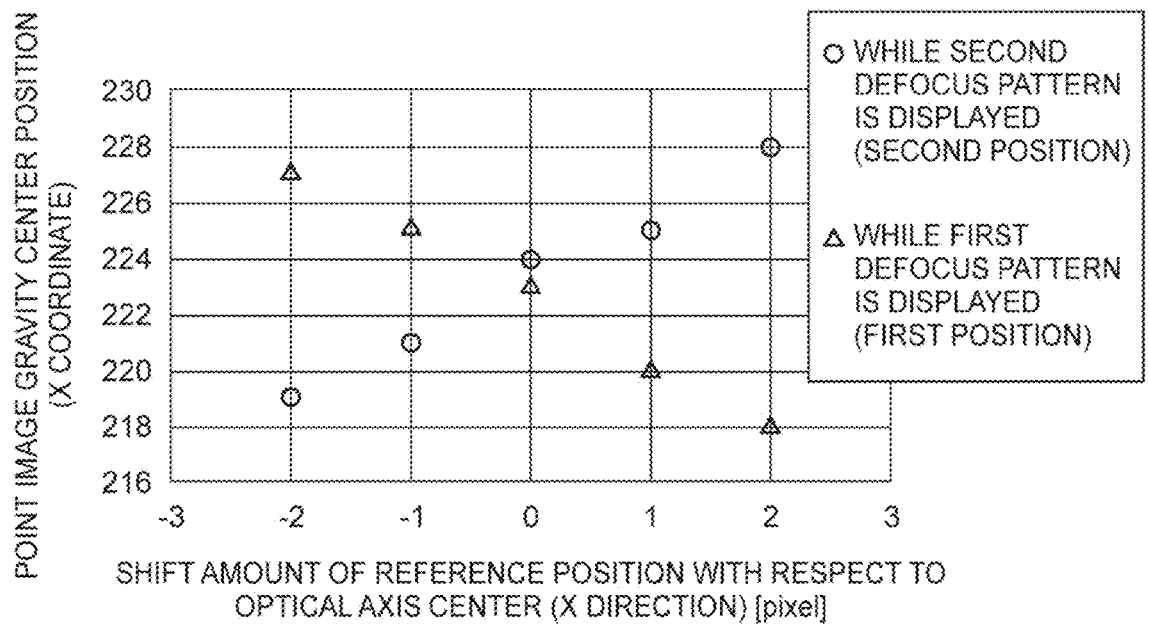
(b)
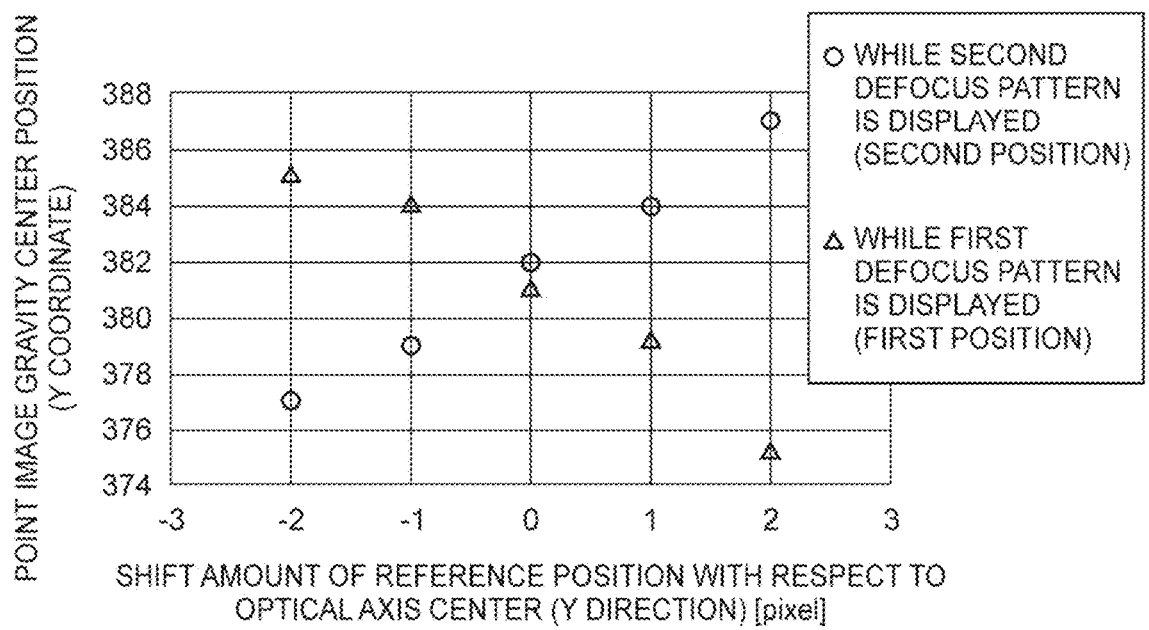

LASER LIGHT RADIATION DEVICE AND LASER LIGHT RADIATION METHOD

TECHNICAL FIELD

One aspect of the present invention relates to a laser light irradiation device and a laser light irradiation method.

BACKGROUND ART

Conventionally, for example, a device disclosed in Patent Literature 1 is disclosed as a laser light irradiation device which irradiates an object with laser light. In this laser light irradiation device, a spatial light modulator modulates laser light generated by a laser light source, and then an objective lens condenses the laser light on an object.

CITATION LIST

Patent Literature

Patent Literature 1: Japanese Unexamined Patent Publication No. 2011-51011

SUMMARY OF INVENTION

Technical Problem

In the laser light irradiation device, an image-transfer optical system such as a 4f optical system transfers an image of laser light on a display unit of the spatial light modulator to an entrance pupil plane of the objective lens. In this regard, there is case where a center position of the image of the laser light transferred to the entrance pupil plane of the objective lens and a center position of the entrance pupil plane do not match. In this case, for example, it is likely to be concerned that a beam intensity center of laser light condensed on the object is shifted, and machining quality (quality of the object after irradiation of the laser light) deteriorates.

It is therefore an object of one aspect of the present invention to provide a laser light irradiation device and a laser light irradiation method which can learn a shift between a center position of an image of laser light transferred to an entrance pupil plane of an objective lens by an image-transfer optical system, and a center position of the entrance pupil plane.

Solution to Problem

A laser light irradiation device according to one aspect of the present invention is a laser light irradiation device which irradiates an object including a reflection surface with laser light, and includes: a laser light source configured to generate the laser light; a spatial light modulator comprising a display unit configured to display a phase pattern, the spatial light modulator configured to cause the laser light generated by the laser light source to enter the display unit, modulate the laser light according to the phase pattern, and emit the laser light from the display unit; an objective lens configured to condense the laser light emitted from the spatial light modulator on the object; an image-transfer optical system configured to transfer an image of the laser light of the display unit of the spatial light modulator to an entrance pupil plane of the objective lens; a camera configured to capture an image including a point image of reflected light of the laser light irradiated on the object and reflected on the reflection surface; and a controller configured to control at least the phase pattern to be displayed on the display unit, and the controller executes first display processing of, when the camera captures the image, causing the display unit to display a first phase pattern for adjusting a condensing position of the laser light condensed by the objective lens to a first condensing position, and second display processing of, when the camera captures the image, causing the display unit to display a second phase pattern for adjusting the condensing position of the laser light condensed by the objective lens to a second condensing position different from the first condensing position in an irradiation direction of the laser light.

According to this laser light irradiation device, the camera captures an image including a point image of reflected light of the laser light irradiated on the object and reflected on the reflection surface. When the image is captured, the first phase pattern is displayed on the display unit by the first display processing of the controller, and this first phase pattern adjusts the condensing position of the laser light to the first condensing position. Furthermore, when the image is captured, the second phase pattern is displayed on the display unit by the second display processing of the controller, and this second phase pattern adjusts the condensing position of the laser light to the second condensing position. In this regard, there is a case where there is a shift (simply referred to as an "image-transfer position shift" below) between the center position of the image of the laser light transferred to the entrance pupil plane, and the center position of the entrance pupil plane. In this case, it is found that, for example, the objective lens does not adequately condense the laser light compared to a case where there is no image-transfer position shift, and the first condensing position and the second condensing position are likely to be apart from each other (not to match) in a direction perpendicular to the irradiation direction of the laser light. Consequently, it is possible to learn the image-transfer position shift based on a capturing result of the camera during execution of each of the first display processing and the second display processing.

The laser light irradiation device according to one aspect of the present invention may include a point image position obtaining unit configured to obtain a position of the point image of the reflected light in the image captured by the camera of the laser light irradiation device, and the point image position obtaining unit may execute first position obtaining processing of obtaining a first position, the first position being the position of the point image of the reflected light in the image captured by the camera during the execution of the first display processing, and second position obtaining processing of obtaining a second position, the second position being the position of the point image of the reflected light in the image captured by the camera during the execution of the second display processing. As described above, compared to the case where there is no image-transfer position shift, when there is an image-transfer position shift, the first condensing position and the second condensing position are likely to be apart from each other in the direction perpendicular to the irradiation direction of the laser light. Consequently, it is possible to learn the image-transfer position shift based on the first position and the second position obtained by the point image position obtaining unit.

The laser light irradiation device according to one aspect of the present invention may include a position determining unit configured to, when the first position and the second position obtained by the point image position obtaining unit do not match with each other, determine that there is a shift between a center position of the entrance pupil plane and a center position of the image of the laser light transferred to the entrance pupil plane by the image-transfer optical system. According to this configuration, it is possible to automatically determine whether or not there is an image-transfer position shift.

The laser light irradiation device according to one aspect of the present invention may include a position adjusting unit configured to offset a reference position based on the first position and the second position obtained by the point image position obtaining unit, the reference position being a reference when the display unit displays the phase pattern. According to this configuration, it is possible to automatically adjust the position of the image of the laser light transferred to the entrance pupil plane to, for example, reduce the image-transfer position shift.

The laser light irradiation device according to one aspect of the present invention may further include a movement mechanism configured to move at least one of the objective lens and the object, the controller may cause the movement mechanism to move at least one of the objective lens and the object to a position at which the camera can confirm the point image of the reflected light when the first position is obtained by the first position obtaining processing of the point image position obtaining unit, and cause the movement mechanism to move at least one of the objective lens and the object to a position at which the camera can confirm the point image of the reflected light when the second position is obtained by the second position obtaining processing of the point image position obtaining unit, the point image position obtaining unit may repeatedly execute the first position obtaining processing once or a plurality of times while changing a position of the first phase pattern on the display unit, and repeatedly execute the second position obtaining processing once or a plurality of times while changing a position of the second phase pattern on the display unit, and the position adjusting unit may calculate an optical axis center of the display unit based on a plurality of the first positions and a plurality of the second positions, and offset the reference position to the optical axis center. In this case, it is possible to specifically realize adjustment for reducing the image-transfer position shift.

In the laser light irradiation device according to one aspect of the present invention, the first condensing position may be one of following (A) to (C), and the second condensing position may be another one of the following (A) to (C). Consequently, it is possible to specifically realize a state where, when there is an image-transfer position shift, the first condensing position and the second condensing position are likely to be apart from each other in the direction perpendicular to the irradiation direction of the laser light.

(A) a focal position of the objective lens, (B) a position on a side of the objective lens with respect to the focal position of the objective lens, and (C) a position on a side opposite to the objective lens with respect to the focal position of the objective lens.

A laser light irradiation method according to one aspect of the present invention is a laser light irradiation method for irradiating an object including a reflection surface with laser light by using a laser light irradiation device, the laser light irradiation device includes: a laser light source configured to generate the laser light; a spatial light modulator comprising a display unit configured to display a phase pattern, the spatial light modulator configured to cause the laser light generated by the laser light source to enter the display unit, modulate the laser light according to the phase pattern, and emit the laser light from the display unit; an objective lens configured to condense the laser light emitted from the spatial light modulator on the object; an image-transfer optical system configured to transfer an image of the laser light of the display unit of the spatial light modulator to an entrance pupil plane of the objective lens; a camera configured to capture an image including a point image of reflected light of the laser light irradiated on the object and reflected on the reflection surface, and the laser light irradiation method includes: a first step of causing the display unit to display a first phase pattern for adjusting a condensing position of the laser light condensed by the objective lens to a first condensing position; a second step of causing the laser light source to generate the laser light and irradiating the object with the laser light in a state where the first phase pattern is displayed on the display unit in the first step, and causing the camera to capture an image including a point image of reflected light of the laser light reflected on the reflection surface in response to the irradiation; a third step of obtaining as a first position a position of the point image of the reflected light in the image captured in the second step; a fourth step of repeatedly executing the second step and the third step once or a plurality of times while changing a position of the first phase pattern on the display unit; a fifth step of causing the display unit to display a second phase pattern for adjusting the condensing position of the laser light condensed by the objective lens to a second condensing position different from the first condensing position in an irradiation direction of the laser light; a sixth step of causing the laser light source to generate the laser light and irradiating the object with the laser light in a state where the second phase pattern is displayed on the display unit in the fifth step, and causing the camera to capture an image including a point image of reflected light of the laser light reflected on the reflection surface in response to the irradiation; a seventh step of obtaining as a second position the position of the point image of the reflected light in the image captured in the sixth step; an eighth step of repeatedly executing the sixth step and the seventh step once or a plurality of times while changing a position of the second phase pattern on the display unit; and a ninth step of offsetting a reference position based on a plurality of the first positions obtained in the third and fourth steps and a plurality of the second positions obtained in the seventh and eighth steps, the reference position being a reference when the display unit displays the phase pattern.

As described above, it is found that, compared to the case where there is no image-transfer position shift, when there is an image-transfer position shift, the first condensing position and the second condensing position are likely to be apart from each other in the direction perpendicular to the irradiation direction of the laser light. Consequently, it is possible to learn the image-transfer position shift based on the obtained first position and second position. Furthermore, by offsetting a reference position based on a plurality of first positions and a plurality of second positions, it is possible to adjust the position of the image of the laser light transferred to the entrance pupil plane to, for example, reduce the image-transfer position shift.

A laser light irradiation device according to one aspect of the present invention is a laser light irradiation device which irradiates an object including a reflection surface with laser light, and includes: a laser light source configured to generate the laser light; a spatial light modulator comprising a display unit configured to display a phase pattern, the spatial light modulator configured to cause the laser light generated by the laser light source to enter the display unit, modulate the laser light according to the phase pattern, and emit the laser light from the display unit; an objective lens configured to condense the laser light emitted from the spatial light modulator on the object; an image-transfer optical system configured to transfer an image of the laser light of the display unit of the spatial light modulator to an entrance pupil plane of the objective lens; a camera configured to capture an image including a point image of reflected light of the laser light irradiated on the object and reflected on the reflection surface; and a controller configured to control at least the phase pattern to be displayed on the display unit, and the controller executes display processing of, when the camera captures the image, causing the display unit to display a third phase pattern for condensing the laser light condensed by the objective lens to an elongated condensing range along an irradiation direction of the laser light.

It is found that, compared to the case where there is no image-transfer position shift, when there is an image-transfer position shift, a side of the objective lens and an opposite side of the objective lens in the condensing range are likely to be apart from each other in the direction perpendicular to the irradiation direction of the laser light. Consequently, it is possible to learn the image-transfer position shift based on a capturing result of the camera during execution of the display processing.

In the laser light irradiation device according to one aspect of the present invention, when a condensing position of the objective lens is a reference condensing position and a condensed diameter of the laser light at the reference condensing position is a reference condensed diameter, a third phase pattern may be a pattern for adjusting a range having a fixed length from the reference condensing position to one side or another side in the irradiation direction of the laser light as the condensing range, and making the condensed diameter the same as the reference condensed diameter in the condensing range.

The laser light irradiation device according to one aspect of the present invention may include a point image position obtaining unit configured to obtain a position of the point image of the reflected light in the image captured by the camera, and the point image position obtaining unit may execute first position obtaining processing of obtaining a first position, the first position being the position of the point image of the reflected light in the image captured by the camera during the execution of the display processing, and second position obtaining processing of obtaining a second position, the second position being the position of the point image of the reflected light in the image captured by the camera during the execution of the display processing with a different position of the objective lens in an optical axis direction from the display processing of the first position obtaining processing. It is possible to learn the image-transfer position shift based on the first position and the second position obtained by the point image position obtaining unit.

The laser light irradiation device according to one aspect of the present invention may include a position determining unit configured to, when the first position and the second position obtained by the point image position obtaining unit do not match with each other, determine that there is a shift between a center position of the entrance pupil plane and a center position of the image of the laser light transferred to the entrance pupil plane by the image-transfer optical system. According to this configuration, it is possible to automatically determine whether or not there is an image-transfer position shift.

The laser light irradiation device according to one aspect of the present invention may include a position adjusting unit configured to offset a reference position based on the first position and the second position obtained by the point image position obtaining unit, the reference position being a reference when the display unit displays the phase pattern. According to this configuration, it is possible to automatically adjust the position of the image of the laser light transferred to the entrance pupil plane to, for example, reduce the image-transfer position shift.

The laser light irradiation device according to one aspect of the present invention may further include a movement mechanism configured to move at least one of the objective lens and the object, the controller may cause the movement mechanism to move at least one of the objective lens and the object to a position at which the camera can confirm the point image of the reflected light when the first position is obtained by the first position obtaining processing of the point image position obtaining unit, and cause the movement mechanism to move at least one of the objective lens and the object to another position at which the camera can confirm the point image of the reflected light when the second position is obtained by the second position obtaining processing of the point image position obtaining unit, the point image position obtaining unit may repeatedly execute the first position obtaining processing once or a plurality of times while changing a position of the third phase pattern on the display unit, and repeatedly execute the second position obtaining processing once or a plurality of times while changing a position of the third phase pattern on the display unit, and the position adjusting unit may calculate an optical axis center of the display unit based on a plurality of the first positions and a plurality of the second positions, and offset the reference position to the optical axis center. In this case, it is possible to specifically realize adjustment for reducing the image-transfer position shift.

Advantageous Effects of Invention

One aspect of the present invention can provide a laser light irradiation device and a laser light irradiation method which can learn a shift between a center position of an image of laser light transferred to an entrance pupil plane of an objective lens by an image-transfer optical system, and a center position of the entrance pupil plane.

BRIEF DESCRIPTION OF DRAWINGS

FIG. 25 is a graph illustrating a relationship between a point image gravity center position and a shift amount of a reference position.

DESCRIPTION OF EMBODIMENTS

Figure 1:
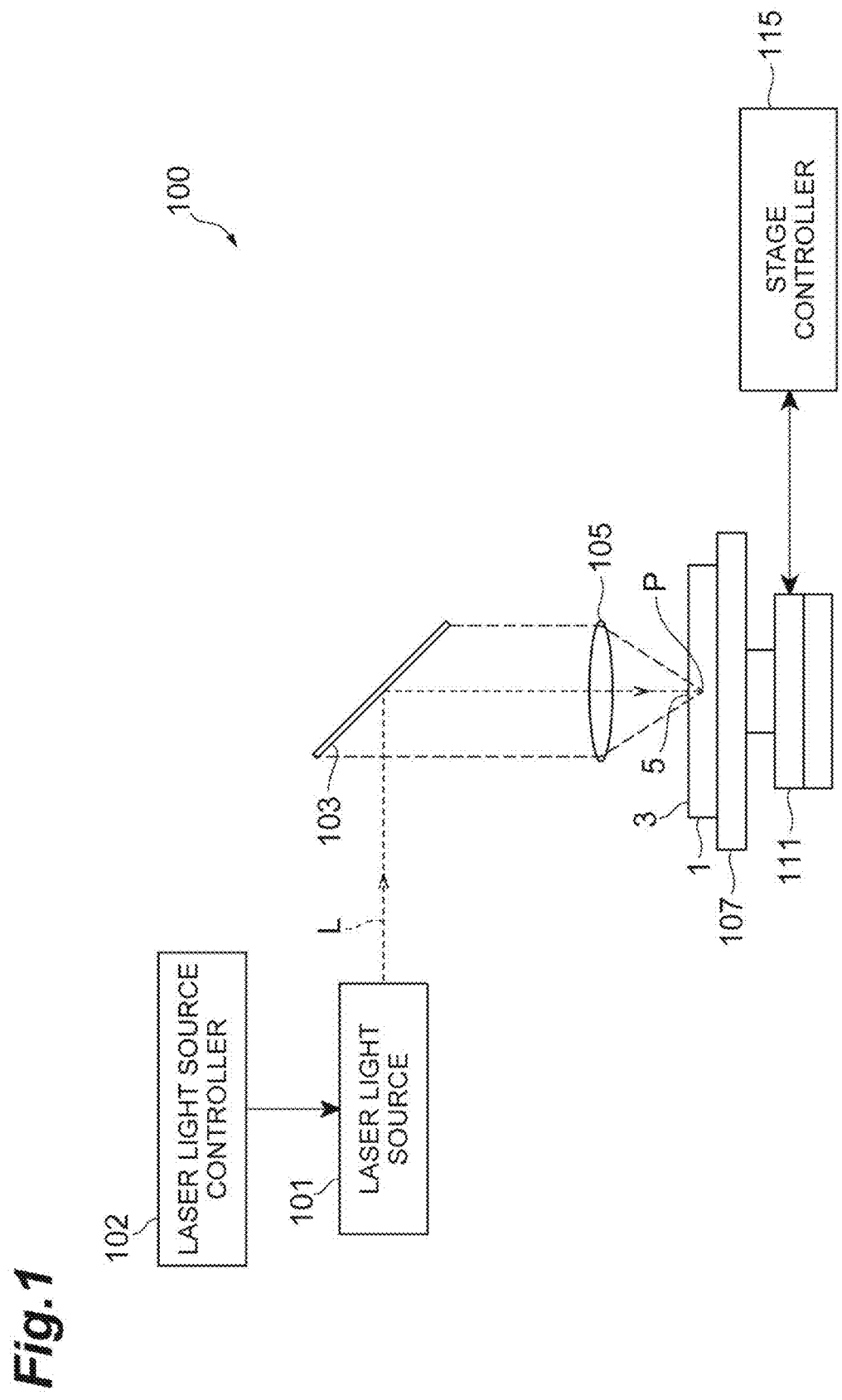
FIG. 1 is a schematic configuration diagram of a laser machining device used to form a modified region.

Hereinafter, an embodiment will be described in detail with reference to the drawings. In addition, the same or corresponding portions in each drawing will be assigned the same reference numerals, and overlapping description will be omitted.

A laser machining device (laser light irradiation device) according to the embodiment condenses laser light on a machining object to form a modified region on the machining object along a cutting scheduled line. First, formation of the modified region will be described with reference to FIGS. 1 to 6.

As illustrated in FIG. 1, a laser machining device 100 includes a laser light source 101 which performs pulse oscillation on laser light L, a dichroic mirror 103 which is disposed to change a direction of an optical axis (optical path) of the laser light L 90°, and a condenser lens 105 which condenses the laser light L. Furthermore, the laser machining device 100 includes a support stand 107 which supports a machining object 1 which is an object irradiated with the laser light L condensed by the condenser lens 105, a stage 111 which is a movement mechanism for moving the support stand 107, a laser light source controller 102 which controls the laser light source 101 to adjust an output, a pulse width and a pulse waveform of the like of the laser light L, and a stage controller 115 which controls movement of the stage 111.

In the laser machining device 100, the direction of the optical axis of the laser light L emitted from the laser light source 101 is changed 90° by the dichroic mirror 103, and the laser light L is condensed inside the machining object 1 placed on the support stand 107 by the condenser lens 105. Together with this condensation, the stage 111 is moved, and the machining object 1 is relatively moved along a cutting scheduled line 5 with respect to the laser light L. Thus, a modified region along the cutting scheduled line 5 is formed on the machining object 1. In addition, the stage 111 is moved to relatively move the laser light L. However, the condenser lens 105 may be moved or both of the stage 111 and the condenser lens 105 may be moved.

Figure 2:
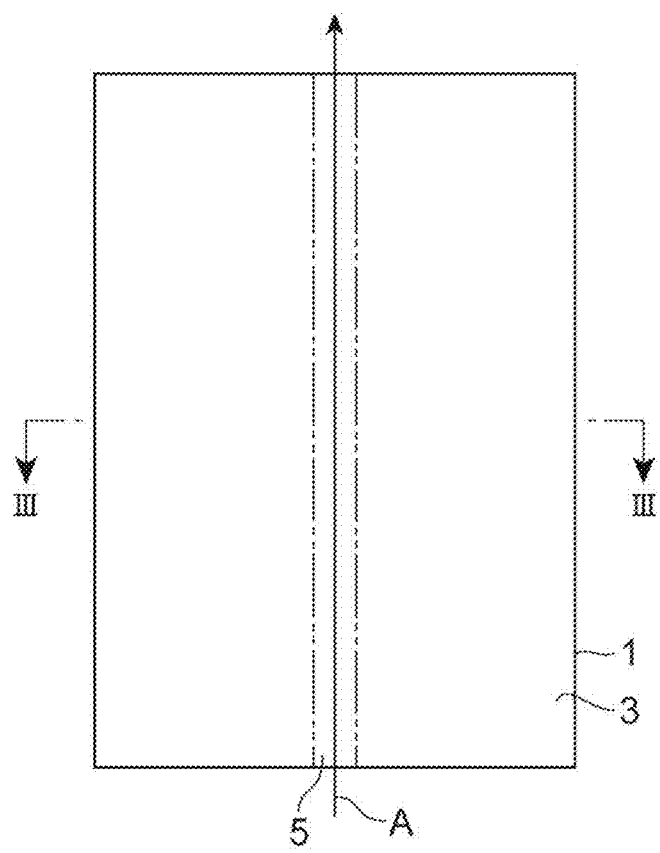
FIG. 2 is a plan view of a machining object which is a modified region formation object.
Figure 3:
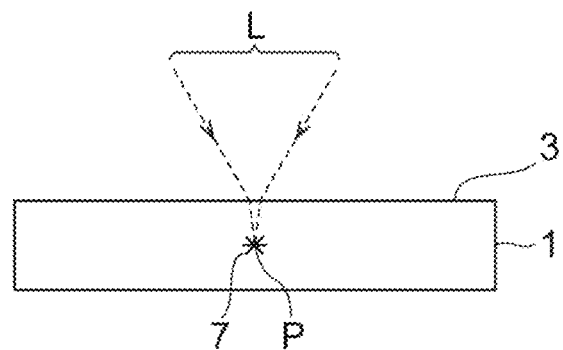
FIG. 3 is a cross-sectional view taken along a line of the machining object in FIG. 2.
Figure 4:
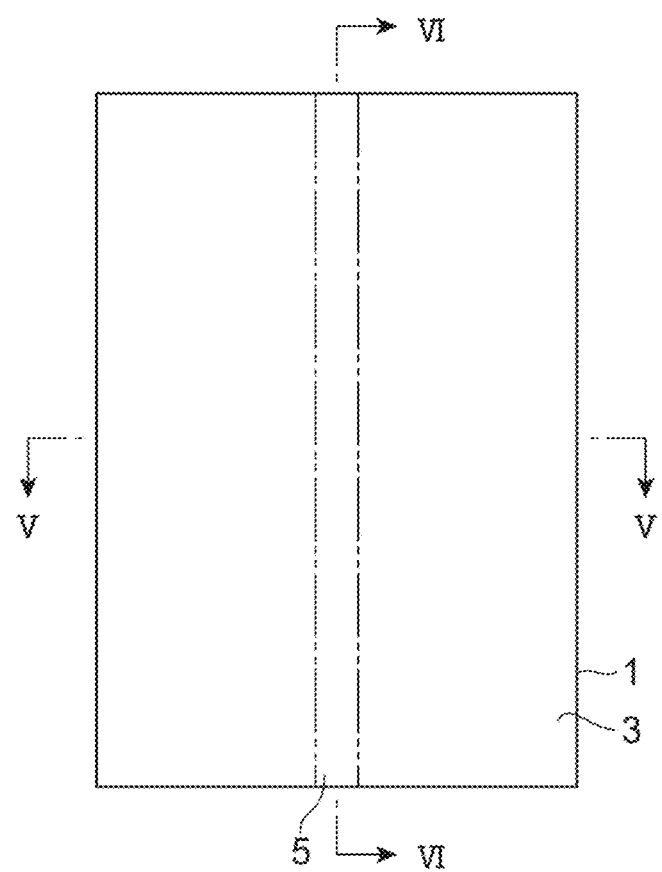
FIG. 4 is a plan view of the machining object after laser machining.
Figure 5:
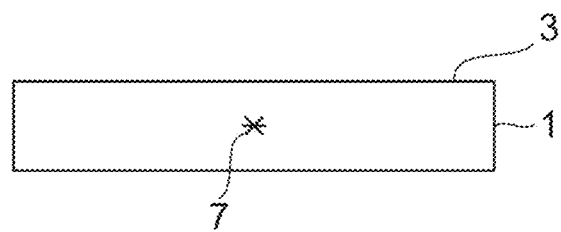
FIG. 5 is a cross-sectional view taken along a V-V line of the machining object in FIG. 4.
Figure 6:
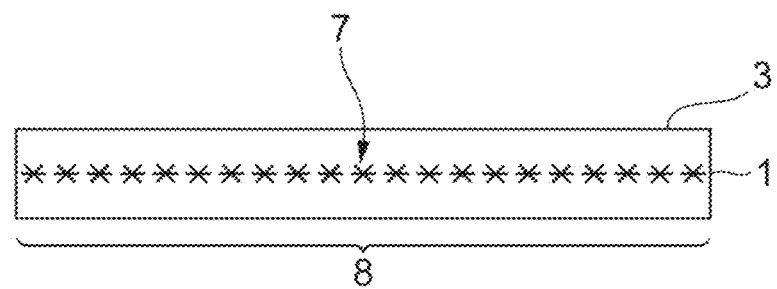
FIG. 6 is a cross-sectional view taken along a VI-VI line of the machining object in FIG. 4.

As the machining object 1, a semiconductor substrate formed by a semiconductor material or a plate-shaped member (e.g., a substrate or a wafer) including a piezoelectric substrate formed by a piezoelectric material is used. As illustrated in FIG. 2, the cutting scheduled line 5 for cutting the machining object 1 is set to the machining object 1. The cutting scheduled line 5 is a linearly extending imaginary line. When the modified region is formed inside the machining object 1, the laser light L is relatively moved along the cutting scheduled line 5 (i.e., an arrow A direction in FIG. 2) as illustrated in FIG. 3 in a state where a condensing point (condensing position) P is adjusted inside the machining object 1. Thus, as illustrated in FIGS. 4, 5 and 6, a modified region 7 is formed on the machining object 1 along the cutting scheduled line 5. The modified region 7 formed along the cutting scheduled line 5 becomes a cutting origin region 8. The cutting scheduled line 5 corresponds to an irradiation scheduled line.

The condensing point P refers to a portion at which the laser light L condenses. The cutting scheduled line 5 is not limited to a linear shape, may be a curved shape or a three-dimensional shape formed by combining these shapes or may have a shape whose coordinates are designated. The cutting scheduled line 5 is not limited to an imaginary line, and may be a line actually drawn on a surface 3 of the machining object 1. The modified region 7 is continuously formed in some cases and is discontinuously formed in some cases. The modified region 7 may have a columnar shape or a dotted shape. That is, the modified region 7 only needs to be formed at least inside or on the surface 3 or a back surface of the machining object 1. When a crack is formed from the modified region 7 as a point of origin, the crack and the modified region 7 may be exposed to an outer surface (the surface 3, the back surface or an outer circumferential surface) of the machining object 1. A laser light incident surface for forming the modified region 7 is not limited to the surface 3 of the machining object 1, and may be the back surface of the machining object 1.

In this regard, when the modified region 7 is formed inside the machining object 1, the laser light L transmits through the machining object 1, and is absorbed particularly near the condensing point P located inside the machining object 1. Thus, the modified region 7 is formed on the machining object 1 (i.e., internal absorption laser machining). In this case, the surface 3 of the machining object 1 hardly absorbs the laser light L, and therefore the surface 3 of the machining object 1 does not melt. On the other hand, when the modified region 7 is formed on the surface 3 or the back surface of the machining object 1, the laser light L is absorbed particularly near the condensing point P located on the surface 3 or the back surface of the laser light L, and the surface 3 or the back surface melts and is removed to form a removed portion such as a hole or a groove (surface absorption laser machining).

The modified region 7 refers to a region having a different density, refractive index, mechanical strength and other physical properties from surroundings. The modified region 7 is, for example, a melt processing region (which means at least one of a region which melts once and then re-solidifies, a region in a melting state and a region which is transitioning from a melting state to a re-solidifying state), a crack region, a breakdown region, a refractive index change region or a region which is a mixture of these regions. Furthermore, the modified region 7 is a region in which the density of the modified region 7 changes in a material of the machining object 1 compared to the density of a non-modified region, or a region in which a lattice defect is formed. When the material of the machining object 1 is single crystal silicon, the modified region 7 may also be referred to as a high dislocation density region.

The melting processing region, the refractive index change region, the region in which the density of the modified region 7 changes compared to the density of the non-modified region and the region in which the lattice defect is formed include cracks (split lines or microcracks) inside these regions or an interface between the modified region 7 and the non-modified region in some cases. The included cracks are formed over the entire surface of the modified region 7, or are formed partially or at a plurality of portions in some cases. The machining object 1 includes a substrate made of a crystal material having a crystal structure. For example, the machining object 1 includes a substrate formed by using at least one of gallium nitride (GaN), silicon (Si), silicon carbide (SiC), $LiTaO_3$ and sapphire ($Al_2O_3$). In other words, the machining object 1 includes, for example, a gallium nitride substrate, a silicon substrate, a SiC substrate, a $LiTaO_3$ substrate or a sapphire substrate. The crystal material may be one of anisotropic crystal or isotropic crystal. Furthermore, the machining object 1 may include a substrate made of a non-crystalline material having a non-crystalline structure (amorphous structure), and may include, for example, a glass substrate.

According to the embodiment, by forming a plurality of modified spots (machining marks) along the cutting scheduled line 5, it is possible to form the modified region 7. In this case, a plurality of modified spots gather to form the modified region 7. The modified spot is a modified portion formed by a shot of one pulse of pulsed laser light (i.e., laser irradiation of one pulse: laser shot). The modified spot is a crack spot, a melting processing spot, a refractive index change spot or a spot mixed with at least one of these spots. The modified spot allows a size and a length of a generated crack to be adequately controlled taking into account demanded cutting precision, demanded flatness of a cut plane, the thickness of the machining object 1, a type and a crystal orientation. Furthermore, according to the embodiment, the modified spots can be formed as the modified region 7 along the cutting scheduled line 5.

[Laser Machining Device according to Embodiment]

Next, the laser machining device according to the embodiment will be described. In the following description, respective directions perpendicular to each other on a horizontal plane will be referred to as an X axis direction and a Y axis direction, and a vertical direction will be referred to as a Z axis direction.

[Entire Configuration of Laser Machining Device]

Figure 7:
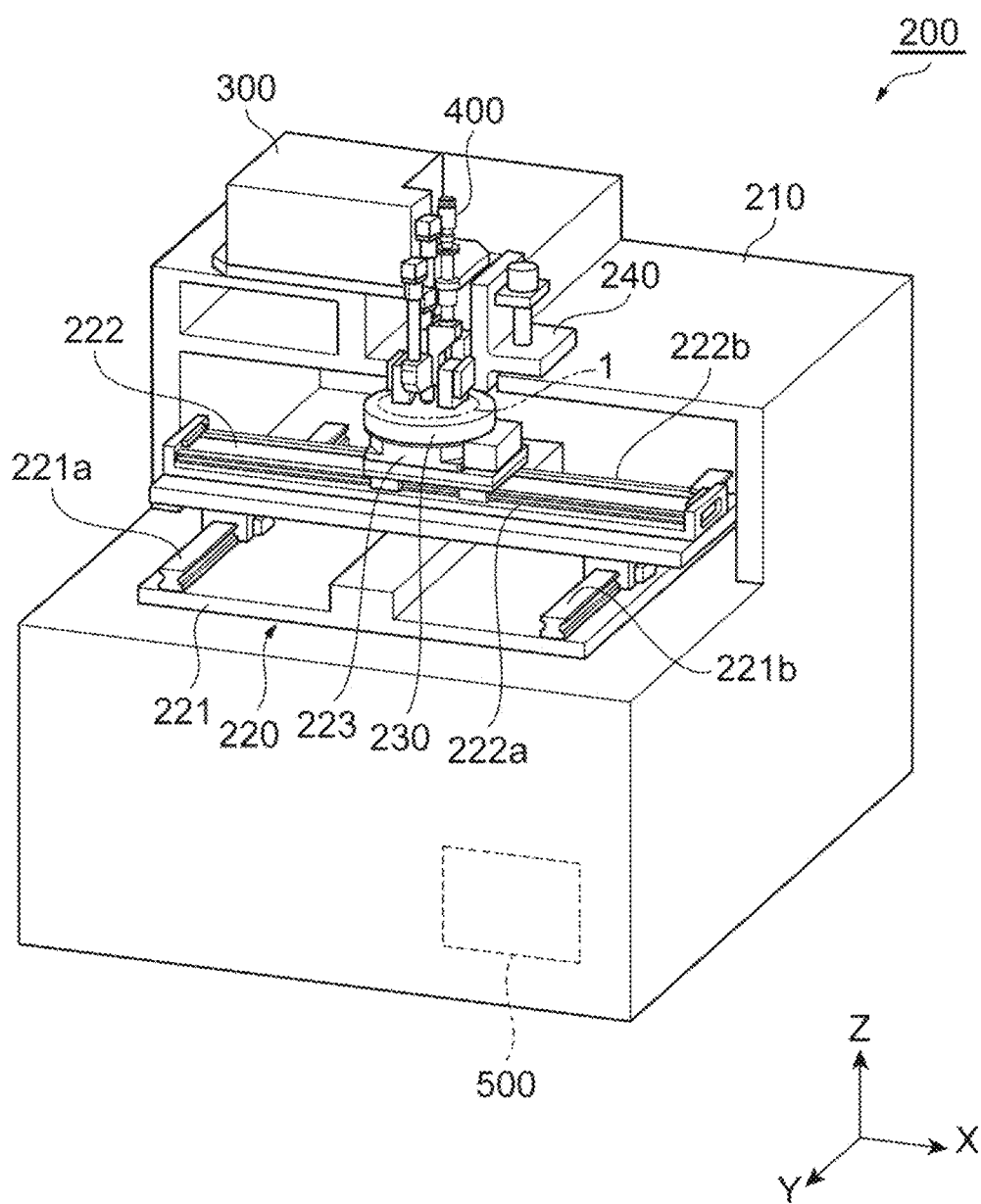
FIG. 7 is a perspective view of the laser machining device according to an embodiment.

As illustrated in FIG. 7, the laser machining device 200 includes a device frame 210, a first movement mechanism 220, a support stand 230 and a second movement mechanism (movement mechanism) 240. Furthermore, the laser machining device 200 includes a laser output unit 300, a laser condensing unit 400 and a controller 500.

The first movement mechanism 220 is attached to the device frame 210. The first movement mechanism 220 includes a first rail unit 221, a second rail unit 222 and a movable base 223. The first rail unit 221 is attached to the device frame 210. The first rail unit 221 is provided with a pair of rails 221a and 221b extending along the Y axis direction. The second rail unit 222 is attached to a pair of rails 221a and 221b of the first rail unit 221 movably along the Y axis direction. The second rail unit 222 is provided with a pair of rails 222a and 222b extending along the X axis direction. The movable base 223 is attached to a pair of rails 222a and 222b of the second rail unit 222 movably along the X axis direction. The movable base 223 is rotatable about a center line of an axial line parallel to the Z axis direction.

Figure 8:
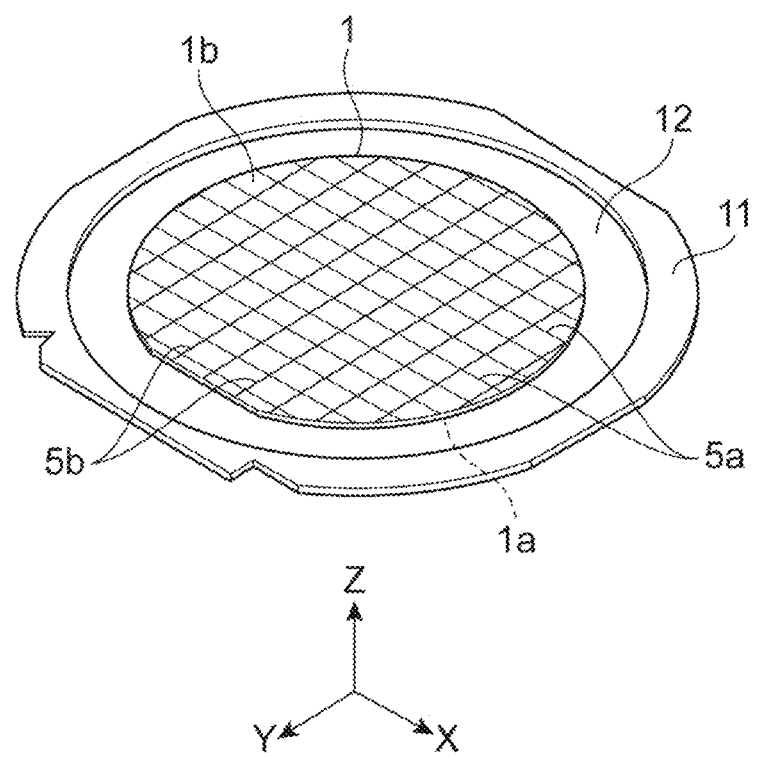
FIG. 8 is a perspective view of the machining object attached to a support stand of the laser machining device in FIG. 7.

The support stand 230 is attached to the movable base 223. The support stand 230 supports the machining object 1. The machining object 1 is formed by, for example, forming a plurality of functional elements (light reception elements such as photodiodes, light emitting elements such as laser diodes or circuit elements formed as a circuit) in a matrix pattern on a surface side of a substrate made of a semiconductor material such as silicon. When the machining object 1 is supported on the support stand 230, for example, a surface 1a of the machining object 1 (a surface on a side of a plurality of functional elements) is pasted on a film 12 pasted to an annular frame 11 as illustrated in FIG. 8. The support stand 230 supports the frame 11 by clamping, and suctions the film 12 by a vacuum chuck table to support the machining object 1. On the support stand 230, a plurality of cutting scheduled lines 5a parallel to each other and a plurality of cutting scheduled lines 5b parallel to each other are set in a lattice pattern to the machining object 1 to pass between the neighboring functional elements. The machining object 1 includes the surface 1a as a reflection surface on which the laser light L is reflected. The reflection surface is a boundary surface (boundary layer) which is a surface on which the laser light L is reflected, and the laser light L is incident on materials of different refractive indices.

As illustrated in FIG. 7, the support stand 230 is moved along the Y axis direction when the second rail unit 222 operates in the first movement mechanism 220. Furthermore, the support stand 230 is moved along the X axis direction when the movable base 223 operates in the first movement mechanism 220. Furthermore, the support stand 230 is rotated about the center line which is the axial line parallel to the Z axis direction when the movable base 223 operates in the first movement mechanism 220. Thus, the support stand 230 is attached to the device frame 210 movably along the X axis direction and the Y axis direction and rotatably about the center line which is the axial line parallel to the Z axis direction.

The laser output unit 300 is attached to the device frame 210. The laser condensing unit 400 is attached to the device frame 210 with the second movement mechanism 240 interposed therebetween. The laser condensing unit 400 is moved along the Z axis direction when the second movement mechanism 240 operates. Thus, the laser condensing unit 400 is attached to the device frame 210 movably along the Z axis direction with respect to the laser output unit 300.

The controller 500 is configured by a CPU (Central Processing Unit), a ROM (Read Only Memory) a RAM (Random Access Memory), and the like. The controller 500 controls an operation of each unit of the laser machining device 200.

For example, the laser machining device 200 fours a modified region inside the machining object 1 along each of the cutting scheduled lines 5a and 5b (see FIG. 8) as follows.

First, the machining object 1 is supported on the support stand 230 and each cutting scheduled line 5a of the machining object 1 is adjusted to the direction parallel to the X axis direction such that a back surface 1b (see FIG. 8) of the machining object 1 is a laser light incident surface. Subsequently, the second movement mechanism 240 moves the laser condensing unit 400 such that the condensing point of the laser light L is located at a position which is a predetermined distance apart from the laser light incident surface of the machining object 1 inside the machining object 1. Subsequently, while the distance between the laser light incident surface of the machining object 1 and the condensing point of the laser light L is maintained as a fixed distance, the condensing point of the laser light L is relatively moved along each cutting scheduled line 5a. Thus, the modified region is formed inside the machining object 1 along each cutting scheduled line 5a.

When formation of the modified region along each cutting scheduled line 5a is finished, the first movement mechanism 220 rotates the support stand 230 to adjust each cutting scheduled line 5b of the machining object 1 to the direction parallel to the X axis direction. Subsequently, the second movement mechanism 240 moves the laser condensing unit 400 such that the condensing point of the laser light L is located at a position which is a predetermined distance apart from the laser light incident surface of the machining object 1 inside the machining object 1. Subsequently, while the distance between the laser light incident surface of the machining object 1 and the condensing point of the laser light L is maintained as a fixed distance, the condensing point of the laser light L is relatively moved along each cutting scheduled line 5b. Thus, the modified region is formed inside the machining object 1 along each cutting scheduled line 5b.

Thus, the laser machining device 200 adopts the direction parallel to the X axis direction as a machining direction (a scanning direction of the laser light L). In addition, the first movement mechanism 220 moves the support stand 230 along the X axis direction to relatively move the condensing point of the laser light L along each cutting scheduled line 5a and relatively move the condensing point of the laser light L along each cutting scheduled line 5b. Furthermore, the first movement mechanism 220 moves the support stand 230 along the Y axis direction to relatively move the condensing point of the laser light L between the respective cutting scheduled lines 5a and relatively move the condensing point of the laser light L between the respective cutting scheduled lines 5b.

Figure 9:
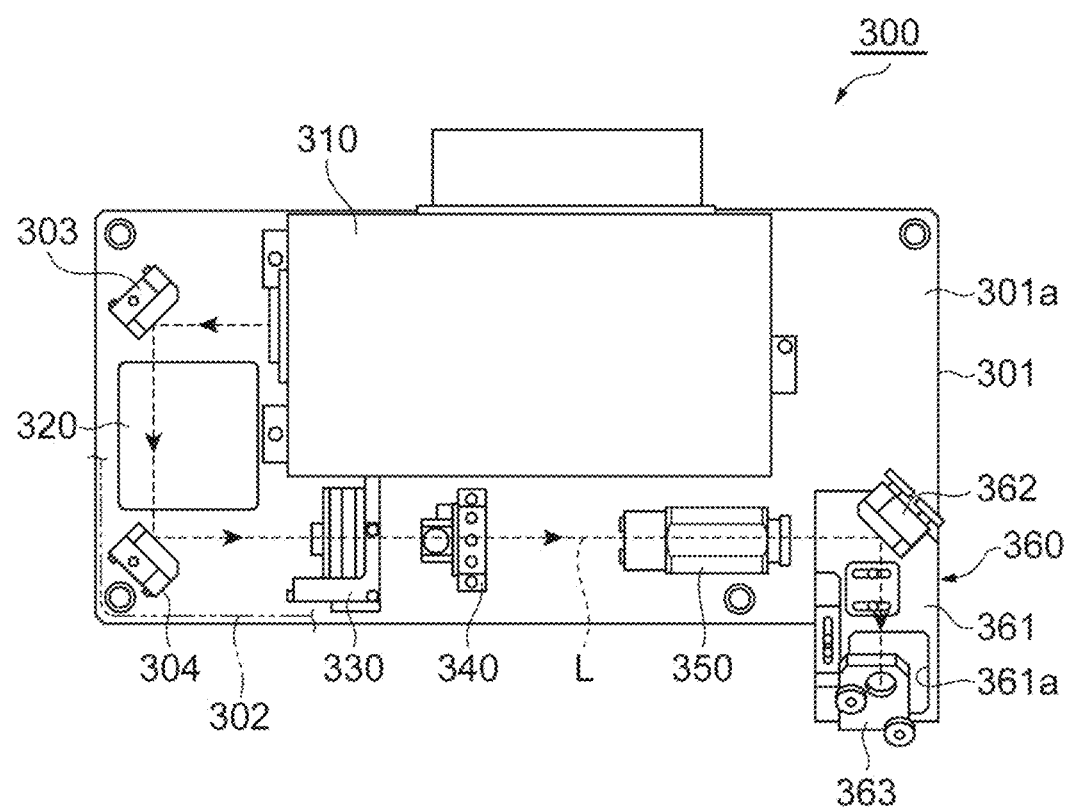
FIG. 9 is a cross-sectional view of a laser output unit taken along a ZX plane in FIG. 7.

As illustrated in FIG. 9, the laser output unit 300 includes an attachment base 301, a cover 302 and a plurality of mirrors 303 and 304. Furthermore, the laser output unit 300 includes a laser oscillator (laser light source) 310, a shutter 320, a λ/2 wavelength plate unit 330, a polarizing plate unit 340, a beam expander 350 and a mirror unit 360.

The attachment base 301 supports a plurality of mirrors 303 and 304, the laser oscillator 310, the shutter 320, the λ/2 wavelength plate unit 330, the polarizing plate unit 340, the beam expander 350 and the mirror unit 360. A plurality of mirrors 303 and 304, the laser oscillator 310, the shutter 320, the λ/2 wavelength plate unit 330, the polarizing plate unit 340, the beam expander 350 and the mirror unit 360 are attached to a principal surface 301a of the attachment base 301. The attachment base 301 is a plate-shaped member, and is attachable to the device frame 210 (see FIG. 7). The laser output unit 300 is attached to the device frame 210 with the attachment base 301 interposed therebetween. That is, the laser output unit 300 is attachable to the device frame 210.

The cover 302 covers a plurality of mirrors 303 and 304, the laser oscillator 310, the shutter 320, the λ/2 wavelength plate unit 330, the polarizing plate unit 340, the beam expander 350 and the mirror unit 360 on the principal surface 301a of the attachment base 301. The cover 302 is attachable to the attachment base 301.

The laser oscillator 310 performs pulse oscillation on the linearly polarized laser light L along the X axis direction. The wavelength of the laser light L emitted from the laser oscillator 310 is included in a one wavelength band of 500 to 550 nm, 1000 to 1150 nm and 1300 to 1400 nm. The laser light L in the wavelength band of 500 to 550 nm is suitable for the internal absorption laser machining for a substrate made of sapphire, for example. The laser light L in each wavelength band of 1000 to 1150 nm and 1300 to 1400 nm is suitable for the internal absorption laser machining for a substrate made of silicon, for example. A polarization direction of the laser light L emitted from the laser oscillator 310 is, for example, a direction parallel to the Y axis direction. The laser light L emitted from the laser oscillator 310 is reflected by the mirror 303, and is incident on the shutter 320 along the Y axis direction.

The laser oscillator 310 switches ON/OFF of the output of the laser light L as follows. When the laser oscillator 310 is constituted by a solid-state laser, ON/OFF of a Q switch (an acousto-optic modulator (AOM) or an electro-optical modulator (EOM)) provided in a resonator is switched to switch ON/OFF of the output of the laser light L at a high speed. When the laser oscillator 310 is constituted by a fiber laser, ON/OFF of an output of a semiconductor laser which constitutes a seed laser or an amplifier (excitation) laser is switched to switch ON/OFF of the output of the laser light L at a high speed. When the laser oscillator 310 uses an external modulator element, ON/OFF of the external modulator element (the AOM, the EOM, and the like) provided outside the resonator is switched to switch ON/OFF of the output of the laser light L at a high speed.

The shutter 320 opens and closes an optical path of the laser light L by a mechanical mechanism. ON/OFF of the output of the laser light L from the laser output unit 300 is switched by switching ON/OFF of the output of the laser light L in the laser oscillator 310 as described above. The shutter 320 is provided, so that, for example, the laser output unit 300 is prevented from unintentionally emitting the laser light L. The laser light L having passed through the shutter 320 is reflected by the mirror 304, and is sequentially incident on the λ/2 wavelength plate unit 330 and the polarizing plate unit 340 along the X axis direction.

The λ/2 wavelength plate unit 330 and the polarizing plate unit 340 function as output adjustment units which adjust the output (light intensity) of the laser light L. Furthermore, the λ/2 wavelength plate unit 330 and the polarizing plate unit 340 function as polarization direction adjustment units which adjust the polarization direction of the laser light L. The laser light L having sequentially passed through the λ/2 wavelength plate unit 330 and the polarizing plate unit 340 is incident on the beam expander 350 along the X axis direction.

The beam expander 350 adjusts the diameter of the laser light L and collimates the laser light L. The laser light L having passed through the beam expander 350 is incident on the mirror unit 360 along the X axis direction.

The mirror unit 360 includes a support base 361 and a plurality of mirrors 362 and 363. The support base 361 supports a plurality of mirrors 362 and 363. The support base 361 is attached to the attachment base 301 such that the position of the support base 361 can be adjusted along the X axis direction and the Y axis direction. The mirror (first mirror) 362 reflects the laser light L having passed through the beam expander 350 to the Y axis direction. The mirror 362 is attached to the support base 361 such that an angle of a reflection surface of the mirror 362 can be adjusted about, for example, an axial line parallel to the Z axis. The mirror (second mirror) 363 reflects the laser light L reflected by the mirror 362 to the Z axis direction. The mirror 363 is attached to the support base 361 such that an angle of a reflection surface of the mirror 363 can be adjusted about, for example, an axial line parallel to the X axis and the position thereof can be adjusted along the Y axis direction. The laser light L reflected by the mirror 363 passes through an opening 361a formed in the support base 361, and is incident on the laser condensing unit 400 (see FIG. 7) along the Z axis direction. That is, an emission direction of the laser light L from the laser output unit 300 matches with a movement direction of the laser condensing unit 400. As described above, each of the mirrors 362 and 363 has a mechanism which adjusts the angle of the reflection surface. The mirror unit 360 adjusts the position of the support base 361 with respect to the attachment base 301, adjusts the position of the mirror 363 with respect to the support base 361 and adjusts the angles of the reflection surfaces of the mirrors 362 and 363 to adjust a position and an angle of the optical axis of the laser light L emitted from the laser output unit 300 to the laser condensing unit 400. That is, a plurality of mirrors 362 and 363 is configured to adjust the optical axis of the laser light L emitted from the laser output unit 300.

Figure 10:
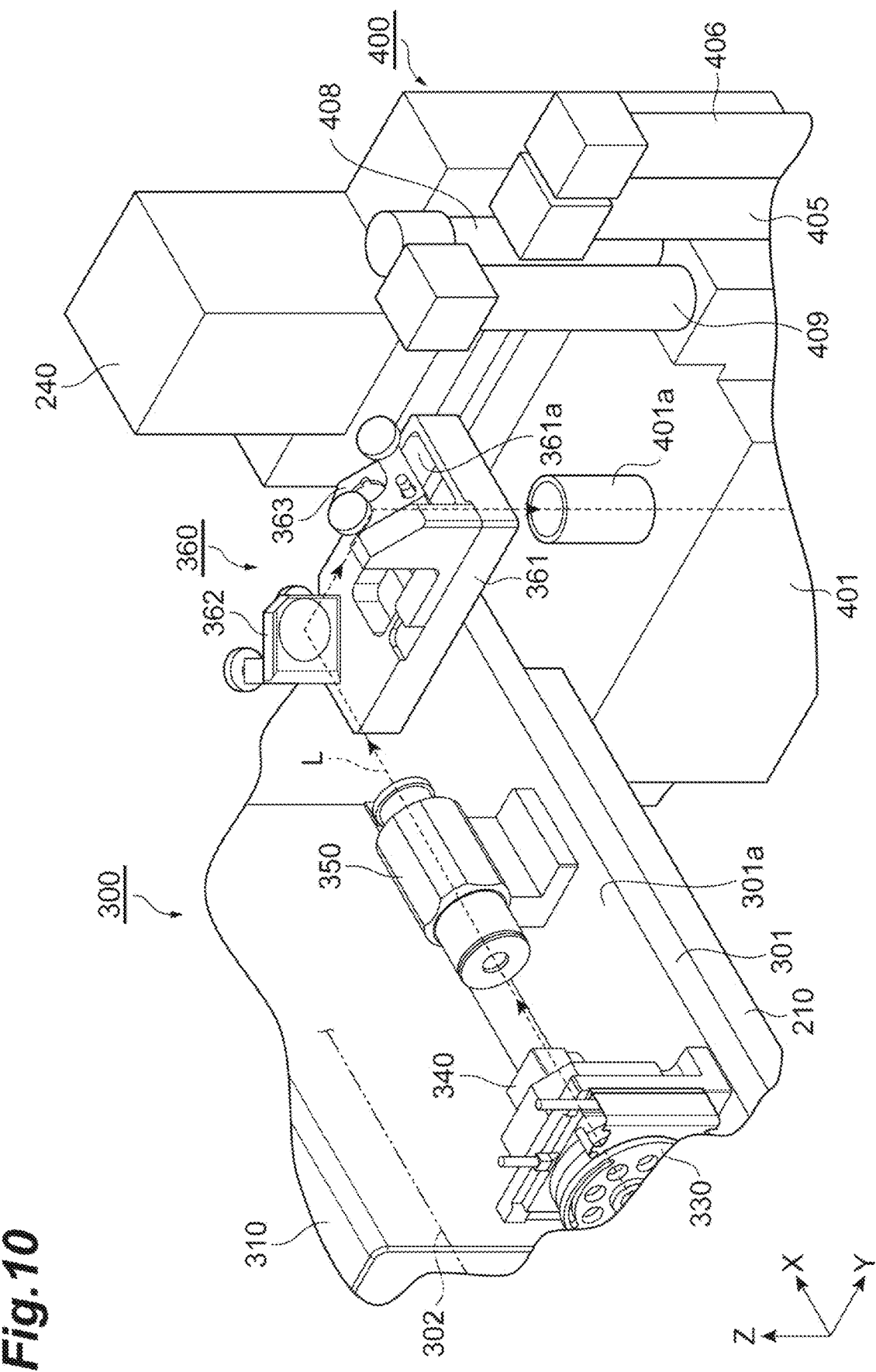
FIG. 10 is a perspective view of part of the laser output unit and a laser condensing unit of the laser machining device in FIG. 7.

As illustrated in FIG. 10, the laser condensing unit 400 includes a housing 401. The housing 401 has a rectangular parallelepiped shape whose Y axis direction is a longitudinal direction. The second movement mechanism 240 is attached to one side surface 401e of the housing 401 (see FIGS. 11 and 13). The housing 401 is provided with a cylindrical light incident portion 401a facing the opening 361a of the mirror unit 360 in the Z axis direction. The light incident portion 401a allows the laser light L emitted from the laser output unit 300 to be incident in the housing 401. The mirror unit 360 and the light incident portion 401a are apart from each other by such a distance that the mirror unit 360 and the light incident portion 401a do not contact each other when the second movement mechanism 240 moves the laser condensing unit 400 along the Z axis direction.

Figure 11:
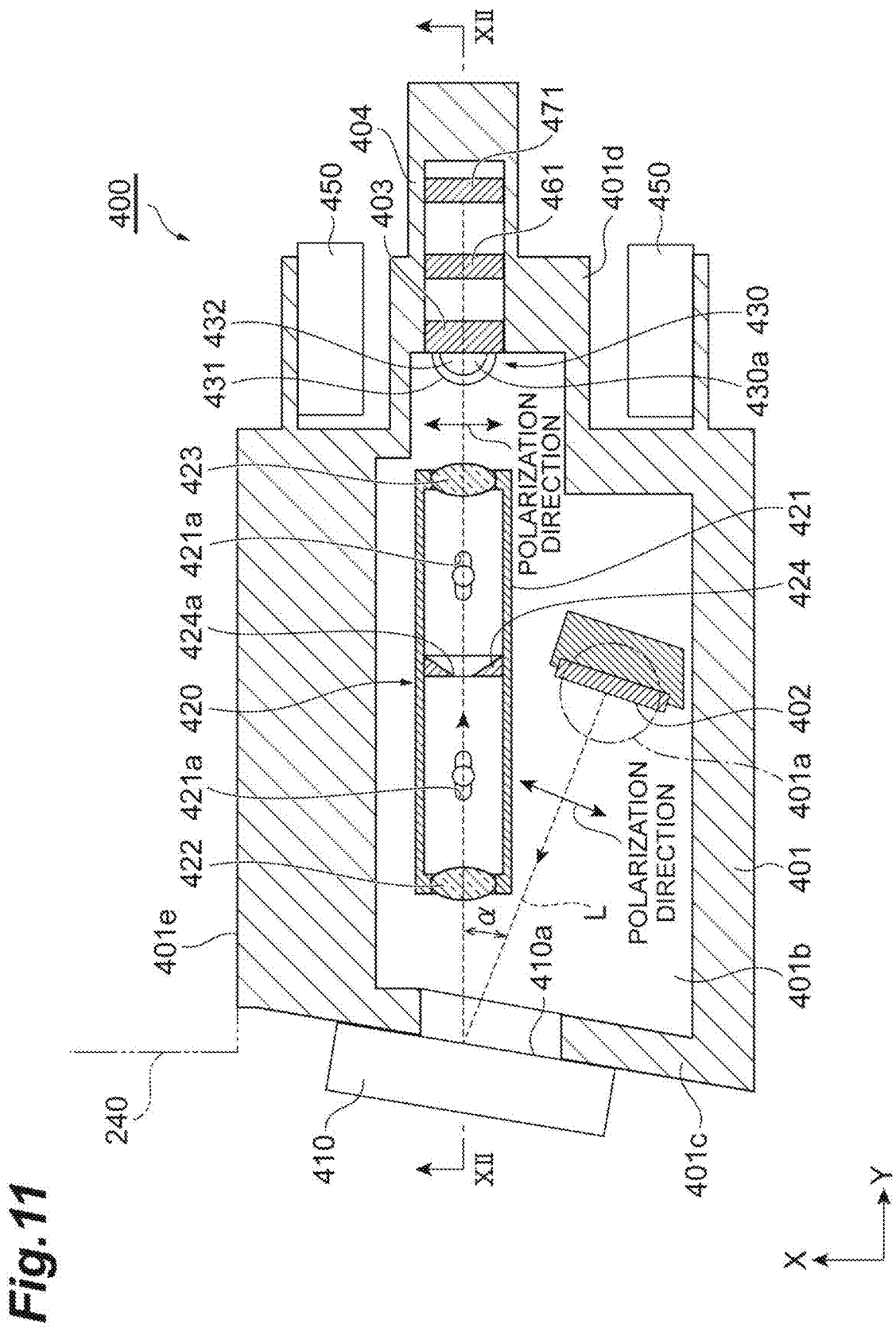
FIG. 11 is a cross-sectional view of a laser condensing unit along the XY plane in FIG. 7.
Figure 12:
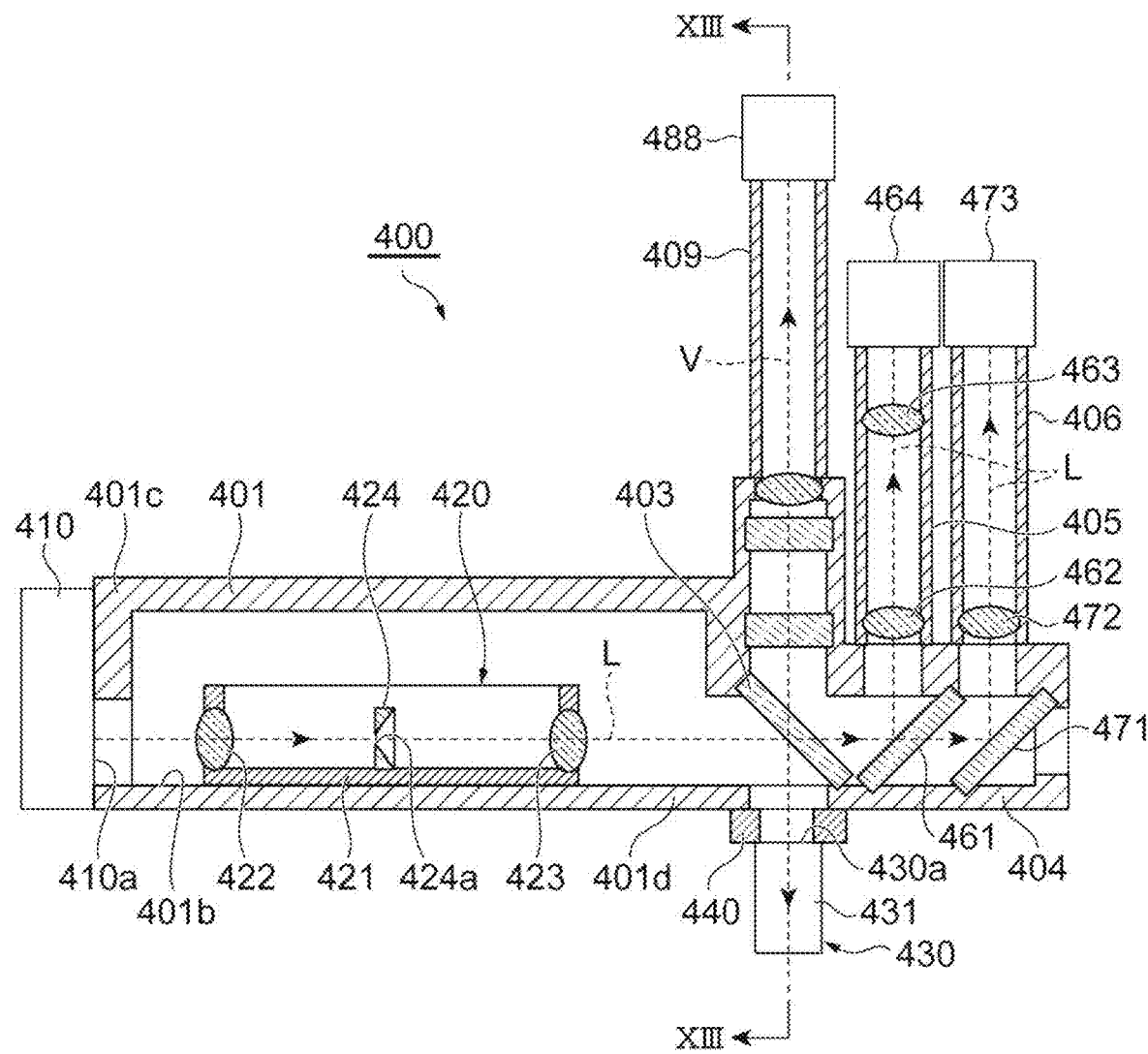
FIG. 12 is a cross-sectional view of the laser condensing unit along a XII-XII line in FIG. 11.

As illustrated in FIGS. 11 and 12, the laser condensing unit 400 includes a mirror 402 and a dichroic mirror 403. Furthermore, the laser condensing unit 400 includes a reflective spatial light modulator 410, a 4f lens unit 420, a condenser lens unit (objective lens) 430, a driving mechanism 440 and a pair of distance measurement sensors 450.

The mirror 402 is attached to a bottom surface 401b of the housing 401 to face the light incident portion 401a in the Z axis direction. The mirror 402 reflects the laser light L having been incident in the housing 401 via the light incident portion 401a, to a direction parallel to an XY plane. The mirror 402 causes the laser light L collimated by the beam expander 350 of the laser output unit 300 to be incident along the Z axis direction. That is, the laser light L is incident as the parallel light on the mirror 402 along the Z axis direction. Hence, even when the second movement mechanism 240 moves the laser condensing unit 400 along the Z axis direction, the laser light L incident on the mirror 402 along the Z axis direction is maintained in a fixed state. The laser light L reflected by the mirror 402 is incident on the reflective spatial light modulator 410.

The reflective spatial light modulator 410 is attached to an end portion 401c of the housing 401 in the Y axis direction in a state where a reflection surface 410a faces the interior of the housing 401. The reflective spatial light modulator 410 is, for example, a liquid crystal on silicon (LCOS) spatial light modulator (SLM), and modulates the laser light L and reflects the laser light L in the Y axis direction. The laser light L modulated and reflected by the reflective spatial light modulator 410 is incident on the 4f lens unit 420 along the Y axis direction. In this regard, an angle α formed between the optical axis of the laser light L incident on the reflective spatial light modulator 410 and the optical axis of the laser light L emitted from the reflective spatial light modulator 410 on a plane parallel to the XY plane is an acute angle (e.g., 10 to 60°). That is, the laser light L is reflected at the acute angle along the XY plane by the reflective spatial light modulator 410. This reflection suppresses an incident angle and a reflection angle of the laser light L, and a decrease in diffraction efficiency, and allows the reflective spatial light modulator 410 to sufficiently exhibit performance. In addition, in the reflective spatial light modulator 410, the thickness of an optical modulation layer for which liquid crystal is used is, for example, approximately several μm to several tens of μm and thin. Consequently, the reflection surface 410a can be regarded as substantially the same as a light incident/emission surface of the light modulation layer.

The 4f lens unit 420 includes a holder 421, a lens 422 on the side of the reflective spatial light modulator 410, a lens 423 on the side of the condenser lens unit 430 and a slit member 424. The holder 421 holds a pair of lenses 422 and 423 and the slit member 424. The holder 421 maintains a fixed positional relationship between a pair of lenses 422 and 423 and the slit member 424 in a direction along the optical axis of the laser light L. A pair of lenses 422 and 423 constitute a double-sided telecentric optical system having an image formation relationship between the reflection surface 410a of the reflective spatial light modulator 410 and an entrance pupil plane (pupil plane) 430a of the condenser lens unit 430. Thus, an image of the laser light L on the reflection surface 410a of the reflective spatial light modulator 410 (the image of the laser light L modulated by the reflective spatial light modulator 410) is transferred (formed) to the entrance pupil plane 430a of the condenser lens unit 430. A slit 424a is formed in the slit member 424. The slit 424a is located between the lens 422 and the lens 423 and near a focal plane of the lens 422. An unnecessary component of the laser light L modulated and reflected by the reflective spatial light modulator 410 is blocked by the slit member 424. The laser light L having passed through the 4f lens unit 420 is incident on the dichroic mirror 403 along the Y axis direction.

The dichroic mirror 403 reflects most (e.g., 95 to 99.5%) of the laser light L to the Z axis direction, and allows part (e.g., 0.5 to 5%) of the laser light L to transmit along the Y axis direction. The dichroic mirror 403 reflects most of the laser light L at a right angle along the ZX plane. The laser light L reflected by the dichroic mirror 403 is incident on the condenser lens unit 430 along the Z axis direction.

The condenser lens unit 430 is attached to an end portion 401d of the housing 401 (an end portion on the side opposite to the end portion 401c) in the Y axis direction with the driving mechanism 440 interposed therebetween. The condenser lens unit 430 includes a holder 431 and a plurality of lenses 432. The holder 431 holds a plurality of lenses 432. A plurality of lenses 432 condenses the laser light L on the machining object 1 (see FIG. 7) supported on the support stand 230. The driving mechanism 440 moves the condenser lens unit 430 along the Z axis direction by a driving force of a piezoelectric element.

A pair of distance measurement sensors 450 are attached to the end portion 401d of the housing 401 so as to be located on both sides of the condenser lens unit 430 in the X axis direction. Each distance measurement sensor 450 emits distance measurement light (e.g., laser light) to the laser light incidence surface of the machining object 1 (see FIG. 7) supported on the support stand 230, and detects the distance measurement light reflected on the laser light incident surface to obtain displacement data of the laser light incident surface of the machining object 1. In addition, for the distance measurement sensors 450, triangulation sensors, laser confocal sensors, white confocal sensors, spectral interference sensors and astigmatic sensors can be used.

The laser machining device 200 adopts the direction parallel to the X axis direction as the machining direction (the scanning direction of the laser light L) as described above. Hence, when the condensing point of the laser light L is relatively moved along each of the cutting scheduled lines 5a and 5b, the distance measurement sensor 450 of a pair of the distance measurement sensors 450 relatively preceding the condenser lens unit 430 obtains the displacement data of the laser light incident surface of the machining object 1 along each of the cutting scheduled lines 5a and 5b. Furthermore, the driving mechanism 440 moves the condenser lens unit 430 along the Z axis direction based on the displacement data obtained by the distance measurement sensor 450 to maintain a fixed distance between the laser light incident surface of the machining object 1 and the condensing point of the laser light L.

The laser condensing unit 400 includes a beam splitter 461, a pair of lenses 462 and 463 and a profile taking camera 464. The beam splitter 461 splits the laser light L having transmitted through the dichroic mirror 403 into a reflection component and a transmission component. The laser light L reflected by the beam splitter 461 is sequentially incident on a pair of lenses 462 and 463 and the profile taking camera 464 along the Z axis direction. A pair of lenses 462 and 463 constitute a double-sided telecentric optical system having an image formation relationship between the entrance pupil plane 430a of the condenser lens unit 430 and an imaging plane of the profile taking camera 464. Thus, the image of the laser light L on the entrance pupil plane 430a of the condenser lens unit 430 is transferred (formed) to the imaging plane of the profile taking camera 464. As described above, the image of the laser light L on the entrance pupil plane 430a of the condenser lens unit 430 is the image of the laser light L modulated by the reflective spatial light modulator 410. Consequently, the laser machining device 200 monitors an imaging result of the profile taking camera 464 to learn an operation state of the reflective spatial light modulator 410.

Furthermore, the laser condensing unit 400 includes a beam splitter 471, a lens 472 and a camera 473 for monitoring an optical axis position of the laser light L. The beam splitter 471 splits the laser light L having transmitted through the beam splitter 461 into a reflection component and a transmission component. The laser light L reflected by the beam splitter 471 is sequentially incident on the lens 472 and the camera 473 along the Z axis direction. The lens 472 condenses the incident laser light L on an imaging plane of the camera 473. The laser machining device 200 monitors imaging results of the profile taking camera 464 and the camera 473, and the mirror unit 360 adjusts the position of the support base 361 with respect to the attachment base 301, adjusts the position of the mirror 363 with respect to the support base 361 and adjusts the angles of the reflection surfaces of the mirrors 362 and 363 (see FIGS. 9 and 10). Consequently, it is possible to correct a shift of the optical axis of the laser light L incident on the condenser lens unit 430 (i.e., a position shift of a laser light intensity distribution with respect to the condenser lens unit 430 and an angle shift of the optical axis of the laser light L with respect to the condenser lens unit 430).

A plurality of beam splitters 461 and 471 is disposed in a cylindrical body 404 extending from the end portion 401d of the housing 401 along the Y axis direction. A pair of lenses 462 and 463 are disposed in a cylindrical body 405 vertically provided on the cylindrical body 404 along the Z axis direction. The profile taking camera 464 is disposed at the end portion of the cylindrical body 405. The lens 472 is disposed in a cylindrical body 406 vertically provided on the cylindrical body 404 along the Z axis direction. The camera 473 is disposed at the end portion of the cylindrical body 406. The cylindrical body 405 and the cylindrical body 406 are disposed side by side in the Y axis direction. In addition, the laser light L having transmitted through the beam splitter 471 may be absorbed by a damper provided at the end portion of the cylindrical body 404 or may be used for appropriate use.

Figure 13:
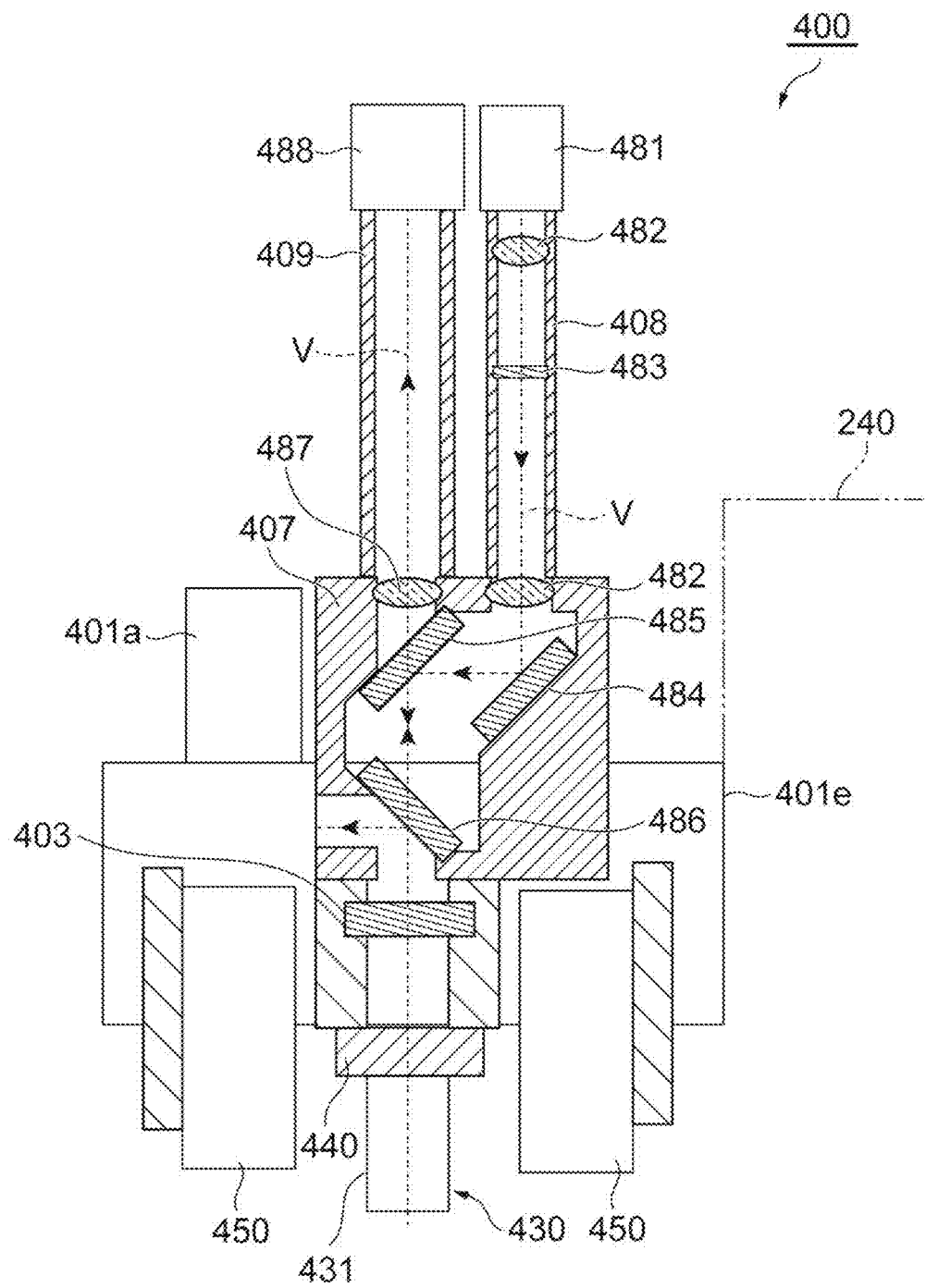
FIG. 13 is a cross-sectional view of the laser condensing unit along a XIII-XIII line in FIG. 12.

As illustrated in FIGS. 12 and 13, the laser condensing unit 400 includes a visible light source 481, a plurality of lenses 482, a reticle 483, a mirror 484, a half mirror 485, a beam splitter 486, a lens 487 and an observation camera 488. The visible light source 481 emits visible light V along the Z axis direction. A plurality of lenses 482 collimates the visible light V emitted from the visible light source 481. The reticle 483 assigns a gridline to the visible light V. The mirror 484 reflects the visible light V collimated by a plurality of lenses 482 to the X axis direction. The half mirror 485 splits the visible light V reflected by the mirror 484 into a reflection component and the transmission component. The visible light V reflected by the half mirror 485 sequentially transmits through the beam splitter 486 and the dichroic mirror 403 along the Z axis direction, and is irradiated on the machining object 1 (see FIG. 7) supported on the support stand 230 via the condenser lens unit 430.

The visible light V irradiated on the machining object 1 is reflected by the laser light incident surface of the machining object 1, is incident on the dichroic mirror 403 via the condenser lens unit 430 and transmits through the dichroic mirror 403 along the Z axis direction. The beam splitter 486 splits the visible light V having transmitted through the dichroic mirror 403 into a reflection component and a transmission component. The visible light V having transmitted through the beam splitter 486 transmits through the half mirror 485, and is sequentially incident on the lens 487 and the observation camera 488 along the Z axis direction. The lens 487 condenses the incident visible light V on an imaging plane of the observation camera 488. The laser machining device 200 can learn the state of the machining object 1 by observing an imaging result of the observation camera 488.

The mirror 484, the half mirror 485 and the beam splitter 486 are disposed in a holder 407 attached on the end portion 401*d* of the housing 401. A plurality of lenses 482 and the reticle 483 are disposed in the cylindrical body 408 vertically provided on the holder 407 along the Z axis direction. The visible light source 481 is disposed at an end portion of a cylindrical body 408. The lens 487 is disposed in a cylindrical body 409 vertically provide on the holder 407 along the Z axis direction. The observation camera 488 is disposed at an end portion of the cylindrical body 409. The cylindrical body 408 and the cylindrical body 409 are disposed side by side in the X axis direction. In addition, the visible light V having transmitted through the half mirror 485 along the X axis direction, and the visible light V having been reflected in the X axis direction by the beam splitter 486 may be respectively absorbed by a damper or the like provided at a wall portion of the holder 407 or may be used for appropriate use.

The laser machining device 200 assumes exchange of the laser output unit 300. This is because the wavelength of the laser light L suitable for machining differs according a specification, machining conditions and the like of the machining object 1. Hence, a plurality of laser output units 300 having different wavelengths of the laser light L to emit are prepared. In this regard, the laser output unit 300 whose wavelength of the laser light L to emit is included in the wavelength band of 500 to 550 nm, the laser output unit 300 whose wavelength of the laser light L to emit is included in the wavelength band of 1000 to 1150 nm, and the laser output unit 300 whose wavelength of the laser light L to emit is included in the wavelength band of 1300 to 1400 nm are prepared.

On the other hand, the laser machining device 200 does not assume exchange of the laser condensing unit 400. This is because the laser condensing unit 400 supports multiple wavelengths (support a plurality of non-continuous wavelength bands). More specifically, the mirror 402, the reflective spatial light modulator 410, a pair of lenses 422 and 423 of the 4f lens unit 420, the dichroic mirror 403, the lens 432 of the condenser lens unit 430 and the like support multiple wavelengths. In this regard, the laser condensing unit 400 supports wavelength bands of 500 to 550 nm, 1000 to 1150 nm and 1300 to 1400 nm. This is realized by, for example, coating a predetermined dielectric multilayer film on each component of the laser condensing unit 400, i.e., by designing each component of the laser condensing unit 400 to satisfy desired optical performance. In addition, in the laser output unit 300, the λ/2 wavelength plate unit 330 includes a λ/2 wavelength plate, and the polarizing plate unit 340 includes a polarizing plate. The λ/2 wavelength plate and the polarizing plate are optical elements having high wavelength dependency. Hence, the λ/2 wavelength plate unit 330 and the polarizing plate unit 340 are provided as different components per wavelength band to the laser output unit 300.

[Optical Path and Polarization Direction of Laser Light in Laser Machining Device]

In the laser machining device 200, the polarization direction of the laser light L condensed on the machining object 1 supported on the support stand 230 is a direction parallel to the X axis direction as illustrated in FIG. 11, and matches with a machining direction (the scanning direction of the laser light L). In this regard, the reflective spatial light modulator 410 reflects the laser light L as P polarized light. This is because, when liquid crystal is used for the light modulation layer of the reflective spatial light modulator 410, and liquid crystal is oriented such that liquid crystal molecules incline in a plane parallel to the plane including the optical axis of the laser light L incident on and emitted from the reflective spatial light modulator 410, phase modulation is performed on the laser light L in a state where rotation of a polarization plane is suppressed (see, for example, Japanese Patent No. 3878758). On the other hand, the dichroic mirror 403 reflects the laser light L as S polarized light. This is because, compared to a case where the laser light L is reflected as the P polarized light, reflecting the laser light L as the S polarized light decreases the number of times of coating of dielectric multilayer films for causing the dichroic mirror 403 to support multiple wavelengths, i.e., makes it easy to design the dichroic mirror 403.

Therefore, in the laser condensing unit 400, an optical path traveling from the mirror 402 to the dichroic mirror 403 via the reflective spatial light modulator 410 and the 4f lens unit 420 is set along the XY plane. An optical path traveling from the dichroic mirror 403 to the condenser lens unit 430 is set along the Z axis direction.

As illustrated in FIG. 9, in the laser output unit 300, the optical path of the laser light L is set along the X axis direction or the Y axis direction. More specifically, an optical path traveling from the laser oscillator 310 to the mirror 303 and the optical path traveling from the mirror 304 to the mirror unit 360 via the λ/2 wavelength plate unit 330, the polarizing plate unit 340 and the beam expander 350 are set along the X axis direction. An optical path traveling from the mirror 303 to the mirror 304 via the shutter 320 and an optical path traveling from the mirror 362 to the mirror 363 in the mirror unit 360 are set along the Y axis direction.

In this regard, the laser light L traveling from the laser output unit 300 to the laser condensing unit 400 along the Z axis direction is reflected in the direction parallel to the XY plane by the mirror 402 as illustrated in FIG. 11, and is incident on the reflective spatial light modulator 410. In this regard, the optical axis of the laser light L incident on the reflective spatial light modulator 410 and the optical axis of the laser light L emitted from the reflective spatial light modulator 410 on the plane parallel to the XY plane form the angle α which is an acute angle. On the other hand, as described above, in the laser output unit 300, the optical path of the laser light L is set along the X axis direction or the Y axis direction.

Therefore, in the laser output unit 300, the λ/2 wavelength plate unit 330 and the polarizing plate unit 340 need to not only function as the output adjustment units which adjust the output of the laser light L but also function as the polarization direction adjustment units which adjust the polarization direction of the laser light L.

[Reflective Spatial Light Modulator]

Figure 14:
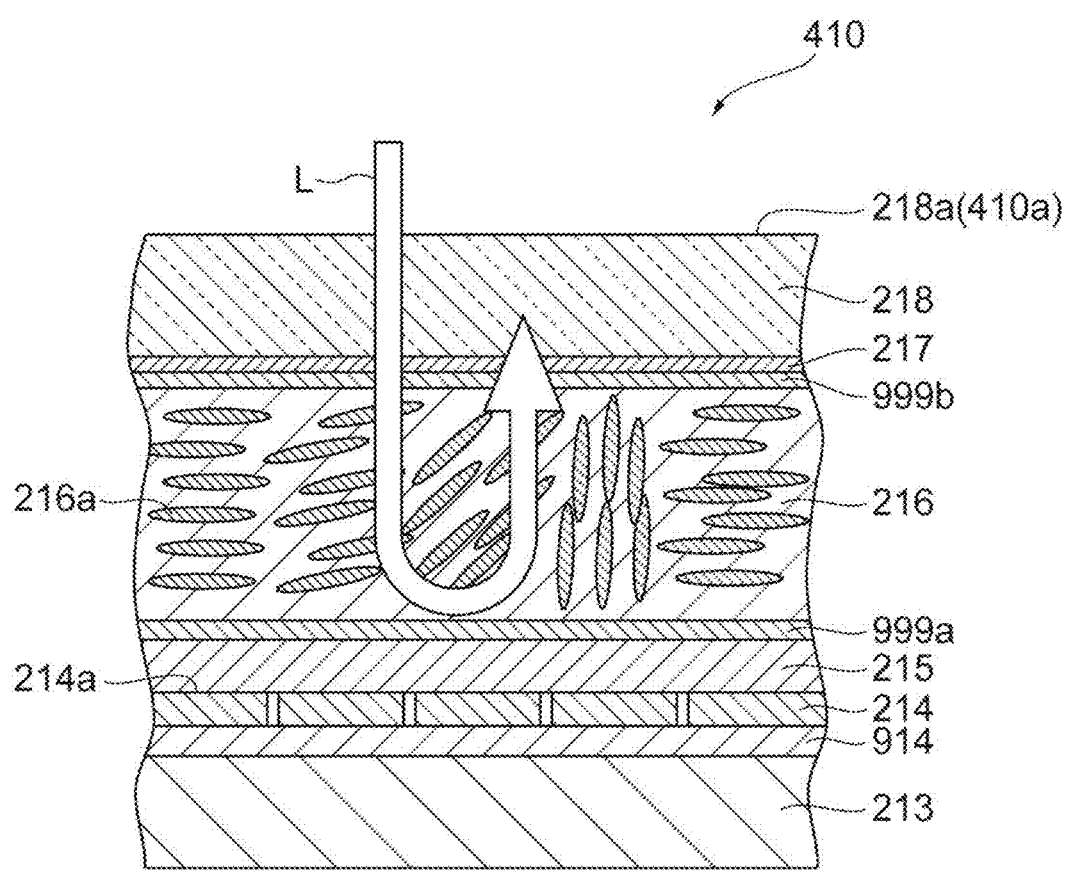
FIG. 14 is a partial cross-sectional view of a reflective spatial light modulator of the laser machining device in FIG. 7.

As illustrated in FIG. 14, the reflective spatial light modulator 410 is formed by laminating a silicon substrate 213, a driving circuit layer 914, a plurality of pixel electrodes 214, a reflection film 215 such as a dielectric multilayer film mirror, an orientation film 999*a*, a liquid crystal layer (display unit) 216, an orientation film 999b, a transparent conductive film 217 and a transparent substrate 218 such as a glass substrate in this order.

The transparent substrate 218 includes a surface 218a along the XY plane. This surface 218a constitutes the reflection surface 410a of the reflective spatial light modulator 410. The transparent substrate 218 is made of a light transmissive material such as glass, and allows the laser light L of a predetermined wavelength incident from the surface 218a of the reflective spatial light modulator 410 to transmit to the interior of the reflective spatial light modulator 410. The transparent conductive film 217 is formed on a back surface of the transparent substrate 218, and is made of a conductive material (e.g., ITO) which allows transmission of the laser light L.

A plurality of pixel electrodes 214 is aligned in a matrix pattern on the silicon substrate 213 along the transparent conductive film 217. Each pixel electrode 214 is made of a metal material such as aluminum. A surface 214a of each pixel electrode 214 is machined flatly and smoothly. A plurality of pixel electrodes 214 is driven by an active matrix circuit provided in the driving circuit layer 914.

The active matrix circuit is provided between a plurality of pixel electrodes 214 and the silicon substrate 213, and controls an application voltage for each pixel electrode 214 according to an optical image outputted from the reflective spatial light modulator 410. This active matrix circuit includes, for example, a first driver circuit which controls an application voltage for each unillustrated pixel column aligned in the X axis direction, and a second driver circuit which controls an application voltage for each pixel column aligned in the Y axis direction. The active matrix circuit is configured to apply a predetermined voltage to the pixel electrodes 214 of pixels designated by both driver circuits by a spatial light modulator controller 502 (see FIG. 16) in a controller 5000 described below.

The orientation films 999a and 999b are disposed on both end surfaces of the liquid crystal layer 216, and align liquid crystal molecule groups in a certain direction. The orientation films 999a and 999b are made of a polymer material such as polyimide, and a contact surface in contact with the liquid crystal layer 216 is subjected to rubbing processing.

The liquid crystal layer 216 is disposed between a plurality of pixel electrodes 214 and the transparent conductive film 217, and modulates the laser light L according to an electric field formed between each pixel electrode 214 and the transparent conductive film 217. That is, when the active matrix circuit of the driving circuit layer 914 applies the voltage to each pixel electrode 214, the electric field is formed between the transparent conductive film 217 and each pixel electrode 214, and an alignment direction of liquid crystal molecules 216a changes according to a magnitude of the electric field formed in the liquid crystal layer 216. Furthermore, when the laser light L transmits through the transparent substrate 218 and the transparent conductive film 217 and is incident on the liquid crystal layer 216, this laser light L is modulated by the liquid crystal molecules 216a while passing through the liquid crystal layer 216, is reflected by the reflection film 215, then is modulated by the liquid crystal layer 216 again and is emitted.

In this case, the spatial light modulator controller 502 (see FIG. 16) described below controls the voltage to be applied to each pixel electrode 214. According to this voltage, a refractive index of a portion sandwiched between the transparent conductive film 217 and each pixel electrode 214 in the liquid crystal layer 216 changes (the refractive index of the liquid crystal layer 216 at a position corresponding to each pixel changes). This change in the refractive index makes it possible to change the phase of the laser light L per pixel of the liquid crystal layer 216 according to the applied voltage. That is, the liquid crystal layer 216 can apply phase modulation matching a hologram pattern to each pixel. In other words, a modulation pattern which is the hologram pattern for applying modulation can be displayed on the liquid crystal layer 216 of the reflective spatial light modulator 410. A wavefront of the laser light L incident on and transmitting through the modulation pattern is adjusted, and the laser light L causes a phase shift of a component in a predetermined direction perpendicular to the traveling direction in each beam constituting this laser light L. Consequently, by appropriately setting the modulation pattern displayed by the reflective spatial light modulator 410, it is possible to modulate the laser light L (modulate, for example, the intensity, the amplitude, the phase or polarization of the laser light L).

[4f Lens Unit]

Figure 15:
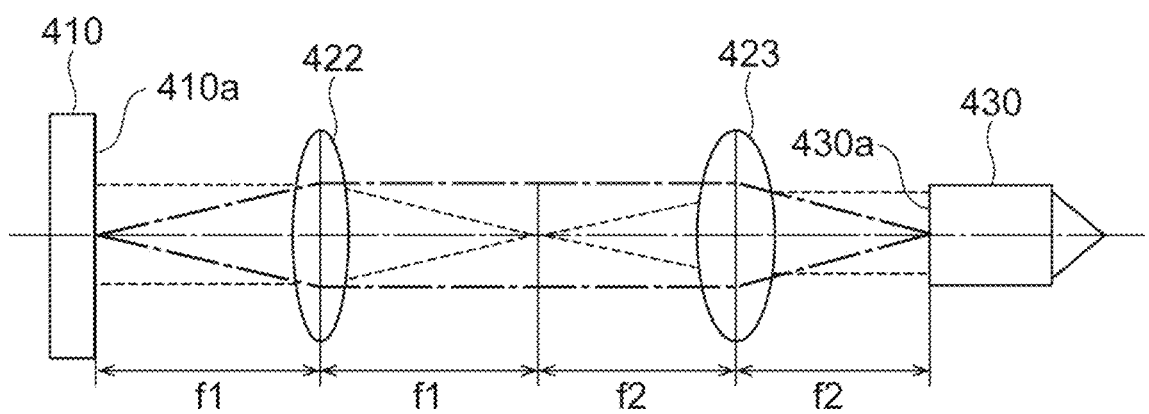
FIG. 15 is a view illustrating an optical arrangement relationship between the reflective spatial light modulator, a 4f lens unit and a condenser lens unit of the laser condensing unit in FIG. 11.

As described above, a pair of lenses 422 and 423 of the 4f lens unit 420 constitute the double-sided telecentric optical system having an image formation relationship between the reflection surface 410a of the reflective spatial light modulator 410 and an entrance pupil plane 430a of the condenser lens unit 430. More specifically, as illustrated in FIG. 15, a distance of an optical path between a center of the lens 422 on the side of the reflective spatial light modulator 410 and the reflection surface 410a of the reflective spatial light modulator 410 is a first focal distance f1 of the lens 422. A distance of an optical path between a center of the lens 423 on the side of the condenser lens unit 430 and the entrance pupil plane 430a of the condenser lens unit 430 is a second focal distance f2 of the lens 423. A distance of an optical path between the center of the lens 422 and the center of the lens 423 is a sum (i.e., f1+f2) of the first focal distance f1 and the second focal distance f2. An optical path between a pair of condenser lenses 422 and 423 among the optical paths traveling from the reflective spatial light modulator 410 to the condenser lens unit 430 is straight.

From a viewpoint to increase an effective diameter of the laser light L on the reflection surface 410a of the reflective spatial light modulator 410, a magnification M of the double-sided telecentric optical system in the laser machining device 200 satisfies $0.5 < M < 1$ (reduction system). When the effective diameter of the laser light L on the reflection surface 410a of the reflective spatial light modulator 410 is larger, the laser light L is modulated by a higher definition phase pattern. From a viewpoint to suppress an increase in the optical path of the laser light L traveling from the reflective spatial light modulator 410 to the condenser lens unit 430, the magnification M is preferably $0.6 \leq M \leq 0.95$. In this regard, (the magnification M of the double-sided telecentric optical system)=(a size of an image of the entrance pupil plane 430a of the condenser lens unit 430)/(a size of an object on the reflection surface 410a of the reflective spatial light modulator 410). In a case of the laser machining device 200, the magnification M of the double-sided telecentric optical system, the first focal distance f1 of the lens 422 and the second focal distance f2 of the lens 423 satisfy $M = f2/f1$.

In addition, from a viewpoint to decrease an effective diameter of the laser light L on the reflection surface 410a of the reflective spatial light modulator 410, the magnification M of the double-sided telecentric optical system may satisfy $1 < M < 2$ (enlargement system). When the effective diameter of the laser light L on the reflection surface 410a of the reflective spatial light modulator 410 is smaller, a magnification of the beam expander 350 (see FIG. 9) may be small. The angle α (see FIG. 11) formed between the optical axis of the laser light L incident on the reflective spatial light modulator 410 and the optical axis of the laser light L emitted from the reflective spatial light modulator 410 on the plane parallel to the XY plane becomes small. From a viewpoint to suppress an increase in the optical path of the laser light L traveling from the reflective spatial light modulator 410 to the condenser lens unit 430, the magnification M is preferably 1.05≤M≤1.7.

Next, main portions of the laser machining device 200 according to the embodiment will be described in detail.

Figure 16:
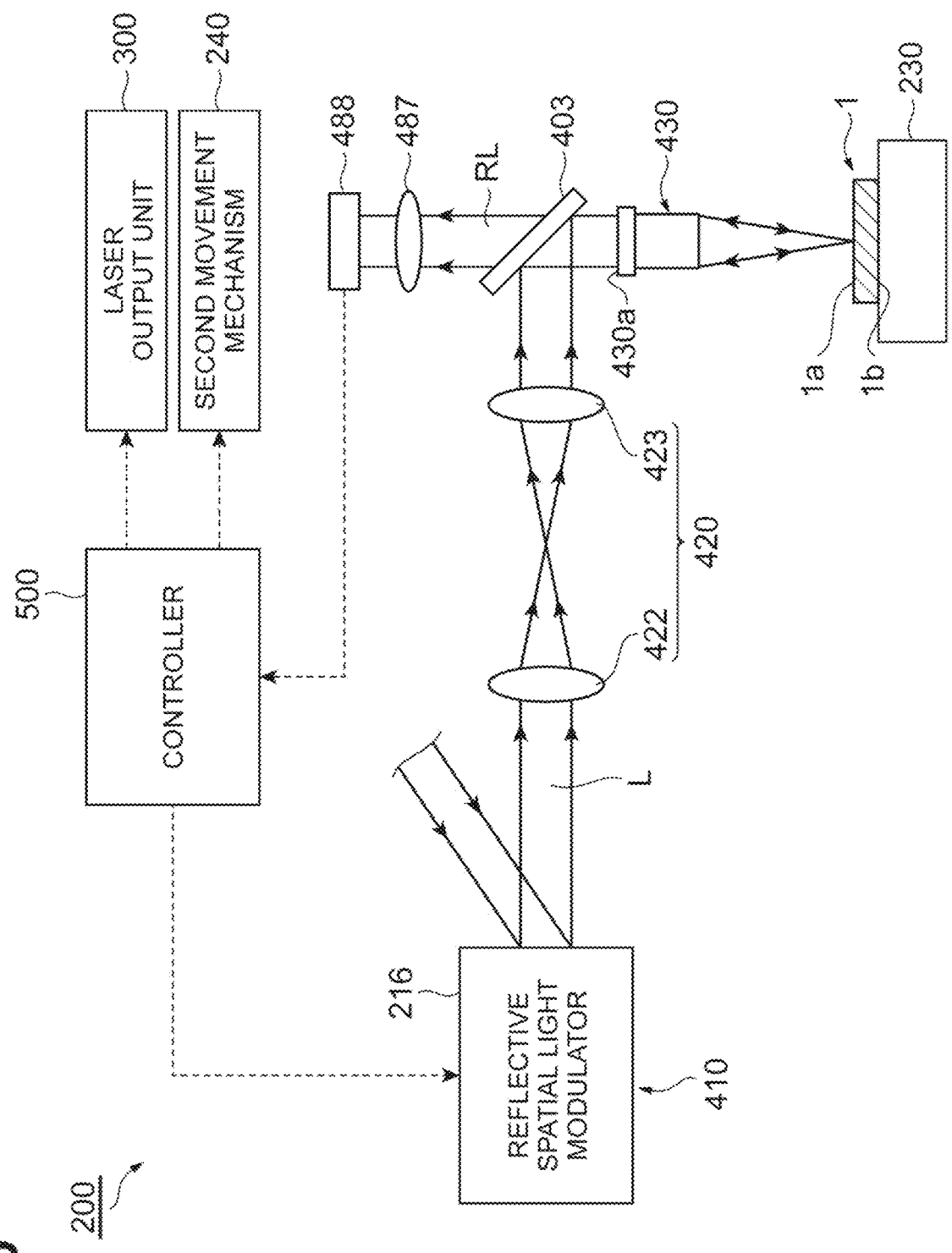
FIG. 16 is a schematic configuration diagram illustrating main portions of the laser machining device according to the embodiment.

FIG. 16 is a schematic configuration diagram illustrating main portions of the laser machining device 200 according to the embodiment. As illustrated in FIG. 16, the laser light L incident and reflected on the liquid crystal layer 216 of the reflective spatial light modulator 410 is converged by the lens 422 which is a relay lens of the 4f lens unit 420, then is collimated by the lens 423 which is a relay lens of the 4f lens unit 420 and is incident on the dichroic mirror 403. The laser light L reflected by the dichroic mirror 403 is incident on the condenser lens unit 430, and is irradiated on the machining object 1 via the condenser lens unit 430. The laser light L irradiated on the machining object 1 is reflected on the surface 1a which is the reflection surface. Reflected light RL of the laser light L reflected on the surface 1a transmits through the dichroic mirror 403, and then is incident on an imaging plane of the observation camera 488 via the lens 487.

A pair of lenses 422 and 423 of the 4f lens unit 420 transfer (relay) the wavefront of the laser light L on the reflection surface 410a of the liquid crystal layer 216 to the entrance pupil plane 430a of the condenser lens unit 430. By this means, the reflection surface 410a of the liquid crystal layer 216 and the entrance pupil plane 430a of the condenser lens unit 430 constitute a conjugate relationship. The 4f lens unit 420 constitutes an image-transfer optical system which transfers the image of the laser light L on the liquid crystal layer 216 to the entrance pupil plane 430a.

The observation camera 488 constitutes a reflected light detector which detects the reflected light RL reflected on the surface 1a. The observation camera 488 captures a point image photographic image which is an image including a point image of the reflected light RL (a beam spot, a surface reflection image or a condensing spot). The observation camera 488 outputs the captured point image photographic image to the controller 500.

The controller 500 controls a phase pattern to be displayed on the liquid crystal layer 216 of the reflective spatial light modulator 410. The phase pattern is the above modulation pattern, and a phase distribution for modulating the laser light L. The phase pattern is set by using a reference position set on the liquid crystal layer 216 as a reference. That is, a position of a reference for displaying the phase pattern on the liquid crystal layer 216 is set as a reference position (simply referred to as a "reference position" below). The position of the phase pattern is set in a coordinate system determined based on this reference position. For example, the position of the phase pattern is set as a coordinate value of a two-dimensional coordinate whose origin is the reference position on the liquid crystal layer 216. The coordinate system in the liquid crystal layer 216 includes an X direction and a Y direction as coordinate axis directions, and one pixel of the liquid crystal layer 216 can be one unit.

The controller 500 executes first display processing and second display processing related to control of display of the liquid crystal layer 216. The first display processing is processing of, when the observation camera 488 captures the image of the reflected light RL, displaying on the liquid crystal layer 216 a first phase pattern for adjusting the condensing position of the laser light L condensed by the condenser lens unit 430 to a first condensing position. The second display processing is processing of, when the observation camera 488 captures the image of the reflected light RL, displaying on the liquid crystal layer 216 a second phase pattern for adjusting the condensing position of the laser light L condensed by the condenser lens unit 430 to a second condensing position. The second condensing position is a position different from the first condensing position in the optical axis direction (irradiation direction) of the laser light L.

The first phase pattern is one of a black pattern, a first defocus pattern and a second defocus pattern. The second phase pattern is other one of the black pattern, the first defocus pattern and the second defocus pattern.

The black pattern is a phase pattern for keeping the condensing position of the laser light L condensed by the condenser lens unit 430 at the focal position of the condenser lens unit 430. The black pattern is a phase pattern which does not vary a condensing point position and is a pattern for uniformly displaying an entire area on the liquid crystal layer 216. Hereinafter, a condensing position in a case where the black pattern is displayed on the liquid crystal layer 216 is also referred to as a "reference condensing position".

The first defocus pattern is a phase pattern for adjusting the condensing position of the laser light L condensed by the condenser lens unit 430 to a position on the side of the condenser lens unit 430 (a position closer to the condenser lens unit 430) with respect to the focal position of the condenser lens unit 430. The first defocus pattern is a phase pattern which matches a convex lens, and is a pattern including a plurality of concentric circular figures. For example, the first defocus pattern is a phase pattern which matches the convex lens whose defocus amount is +30 μm. Hereinafter, a condensing position in a case where the first defocus pattern is displayed on the liquid crystal layer 216 is also referred to as a "convex lens DF condensing position".

The second defocus pattern is a phase pattern for adjusting the condensing position of the laser light L condensed by the condenser lens unit 430 to a position on the side opposite to the condenser lens unit 430 (a position apart from the condenser lens unit 430) with respect to the focal position of the condenser lens unit 430. The second defocus pattern is a phase pattern which matches a concave lens, and is a pattern including a plurality of concentric circular figures. For example, the second defocus pattern is a phase pattern which matches the concave lens whose defocus amount is −30 μm. For example, the defocus amounts of the first and second defocus pattern have the same absolute values, and different signs. Hereinafter, a condensing position in a case where the second defocus pattern is displayed on the liquid crystal layer 216 is also referred to as a "concave lens DF condensing position".

Consequently, the first condensing position is one of the following (A) to (C), and the second condensing position is the other one of following (A) to (C):

(A) A reference condensing position (a focal position of the condenser lens unit 430), (B) A convex lens DF condensing position (a position on the side of the condenser lens unit 430 with respect to the reference condensing position), and (C) A concave lens DF condensing position (a position on the side opposite to the condenser lens unit 430 with respect to the reference condensing position).

Alternatively, the controller 500 executes third display processing (display processing) related to control of display of the liquid crystal layer 216. The third display processing is processing of, when the observation camera 488 captures the image of the reflected light RL, displaying on the liquid crystal layer 216 a third phase pattern for condensing the laser light L condensed by the condenser lens unit 430 in an elongated condensing range along the irradiation direction.

The third phase pattern is a pattern for adjusting a range having a fixed length from the reference condensing position to one side or the other side in the irradiation direction of the laser light L as the condensing range, and making the condensed diameter the same as the reference condensed diameter (a condensed diameter of the reference condensing position) in the condensing range. The third phase pattern is a pattern for forming an elongated beam whose beam diameter on an irradiation direction front side or an irradiation direction rear side of the reference condensing position is substantially the same condensed diameter as the beam diameter of the reference condensing position. The third phase pattern includes as an aberration range an elongated range which is elongated compared to the reference aberration range in the irradiation direction. The third phase pattern is a pattern in which the intensity distribution of the laser light L in the irradiation direction has a continuous contrast in the elongated range. The third phase pattern is a pattern for giving an aberration to the laser light L to form condensing points of the laser light L at a plurality of positions aligned closely along the irradiation direction. The third phase pattern is a pattern for giving an aberration by phase modulation for realizing a function of an axicon lens. The third phase pattern is a first axicon pattern or a second axicon pattern. In addition, at least one of the first axicon pattern and the second axicon pattern will be referred to simply as an "axicon pattern". The condensing range of the laser light L is a range which is from condensation to diversion of the laser light L and in which the beam diameter does not expand.

The first axicon pattern and the second axicon pattern are phase patterns which match an axicon lens. According to the first axicon pattern and the second axicon pattern, the laser light L condensed by the condenser lens unit 430 has the condensing range.

The first axicon pattern is the phase pattern which matches a concave axicon lens. The first axicon pattern is a pattern which does not expand a beam diameter from the condensing position of the laser light L condensed by the condenser lens unit 430 to a position on the side opposite to the side of the condenser lens unit 430 (a position apart from the condenser lens unit 430). The second axicon pattern is the phase pattern which matches a convex axicon lens. The second axicon pattern is a pattern which does not expand a beam diameter from the condensing position of the laser light L condensed by the condenser lens unit 430 to a position on the side of the condenser lens unit 430 (a position closer to the condenser lens unit 430).

When the first axicon pattern is used, the first condensing position is one of following (A) and (B), and the second condensing position is the other one:

(A) The reference condensing position (the focal position of the condenser lens unit 430), and (B) A condensing position at which a beam diameter hardly expands and which is on the side opposite to the condenser lens unit 430 with respect to the reference condensing position.

When the second axicon pattern is used, the first condensing position is one of following (A) and (B), and the second condensing position is the other one:

(A) The reference condensing position (the focal position of the condenser lens unit 430), and (B) A condensing position at which a beam diameter hardly expands and which is on the side of the condenser lens unit 430 with respect to the reference condensing position.

The controller 500 executes first position obtaining processing of obtaining a first position which is a point image position of the point image photographic image captured by the observation camera 488 during execution of the first display processing. The point image position is, for example, a point image gravity center position, and can be calculated by a known method such as gravity center calculation or the like of image processing (the same applies below). The controller 500 repeatedly executes this first position obtaining processing once or a plurality of times while changing a position of the first phase pattern on the liquid crystal layer 216. Thus, the controller 500 obtains a plurality of first positions per position of the first phase pattern on the liquid crystal layer 216. More specifically, the controller 500 obtains the first position which is a point image gravity center position for each of a plurality of first phase patterns whose positions are shifted from each other by one or a plurality of pixels in at least one of the X direction and the Y direction.

The controller 500 executes second position obtaining processing of obtaining a second position which is a point image position of the point image photographic image captured by the observation camera 488 during execution of the second display processing. The controller 500 repeatedly executes this second position obtaining processing once or a plurality of times while changing a position of the second phase pattern on the liquid crystal layer 216. Thus, the controller 500 obtains a plurality of second positions per position of the second phase pattern on the liquid crystal layer 216. More specifically, the controller 500 obtains the second position which is a point image gravity center position for each of a plurality of second phase patterns whose positions are shifted by one or a plurality of pixels in at least one of the X direction and the Y direction.

Alternatively, the controller 500 executes first position obtaining processing of obtaining a first position which is a point image position of the point image photographic image captured by the observation camera 488 during execution of the third display processing. The controller 500 repeatedly executes this first position obtaining processing once or a plurality of times while changing a position of the third phase pattern on the liquid crystal layer 216. Thus, the controller 500 obtains a plurality of first positions per position of the third phase pattern on the liquid crystal layer 216. More specifically, the controller 500 obtains the first position which is a point image gravity center position for each of a plurality of third phase patterns whose positions are shifted from each other by one or a plurality of pixels in at least one of the X direction and the Y direction. The controller 500 executes second position obtaining processing of obtaining the second position which is the point image position of the point image photographic image captured by the observation camera 488 during execution of the third display processing with a different position of the condenser lens unit 430 in the irradiation direction from the third display processing of the first position obtaining processing. The controller 500 repeatedly executes this second position obtaining processing once or a plurality of times while changing a position of the third phase pattern on the liquid crystal layer 216. Thus, the controller 500 obtains a plurality of second positions per position of the third phase pattern on the liquid crystal layer 216. More specifically, the controller 500 obtains the second position which is the point image gravity center position for each of a plurality of third phase patterns whose positions are shifted from each other by one or a plurality of pixels in at least one of the X direction and the Y direction.

The controller 500 controls an operation of the second movement mechanism 240 to move the condenser lens unit 430 along the optical axis direction of the laser light L to a position at which the observation camera 488 can confirm the point image of the reflected light RL when the first position is obtained by the first position obtaining processing. Furthermore, the controller 500 controls the operation of the second movement mechanism 240 to move the condenser lens unit 430 along the optical axis direction of the laser light L to a position at which the observation camera 488 can confirm the point image of the reflected light RL when the second position is obtained by the second position obtaining processing.

Alternatively, the controller 500 controls an operation of the second movement mechanism 240 to move the condenser lens unit 430 along the optical axis direction of the laser light L to a position at which the observation camera 488 can confirm the point image of the reflected light RL when the first position is obtained by the first position obtaining processing. Furthermore, the controller 500 controls the operation of the second movement mechanism 240 to move the condenser lens unit 430 along the optical axis direction of the laser light L to another position at which the observation camera 488 can confirm the point image of the reflected light RL when the second position is obtained by the second position obtaining processing.

In this regard, when the first position is obtained, the condenser lens unit 430 is moved in an opposite movement direction (a movement direction is an opposite direction) with a substantially equal movement amount compared to a case where the condenser lens unit 430 is moved when the second position is obtained. The position at which the point image of the reflected light RL can be confirmed includes a position at which the point image is focused at a certain degree or more and, for example, the point image gravity center position can be recognized or subjected to image processing.

In a state where the first phase pattern is displayed on the liquid crystal layer 216, the controller 500 controls the operation of the laser output unit 300 to cause the laser oscillator 310 (see FIG. 9) to generate the laser light L and execute processing of irradiating the machining object 1 with the laser light L. The controller 500 executes processing of obtaining the point image photographic image of the reflected light RL captured by the observation camera 488, from the observation camera 488 in response to irradiation of the laser light L.

In addition, the controller 500 determines whether or not there is a shift (referred to as an "image-transfer position shift" below) between the center position of the entrance pupil plane 430a and the center position of the image of the laser light L transferred to the entrance pupil plane 430a by the 4f lens unit 420 based on the first position and the second position of the point image in the point image photographic image captured by the observation camera 488. Furthermore, the controller 500 adjusts the reference position of the phase pattern to reduce and eventually eliminate the image-transfer position shift. A principal or a phenomenon relative to determination on the image-transfer position shift and adjustment of the reference position will be described below.

Figure 17:
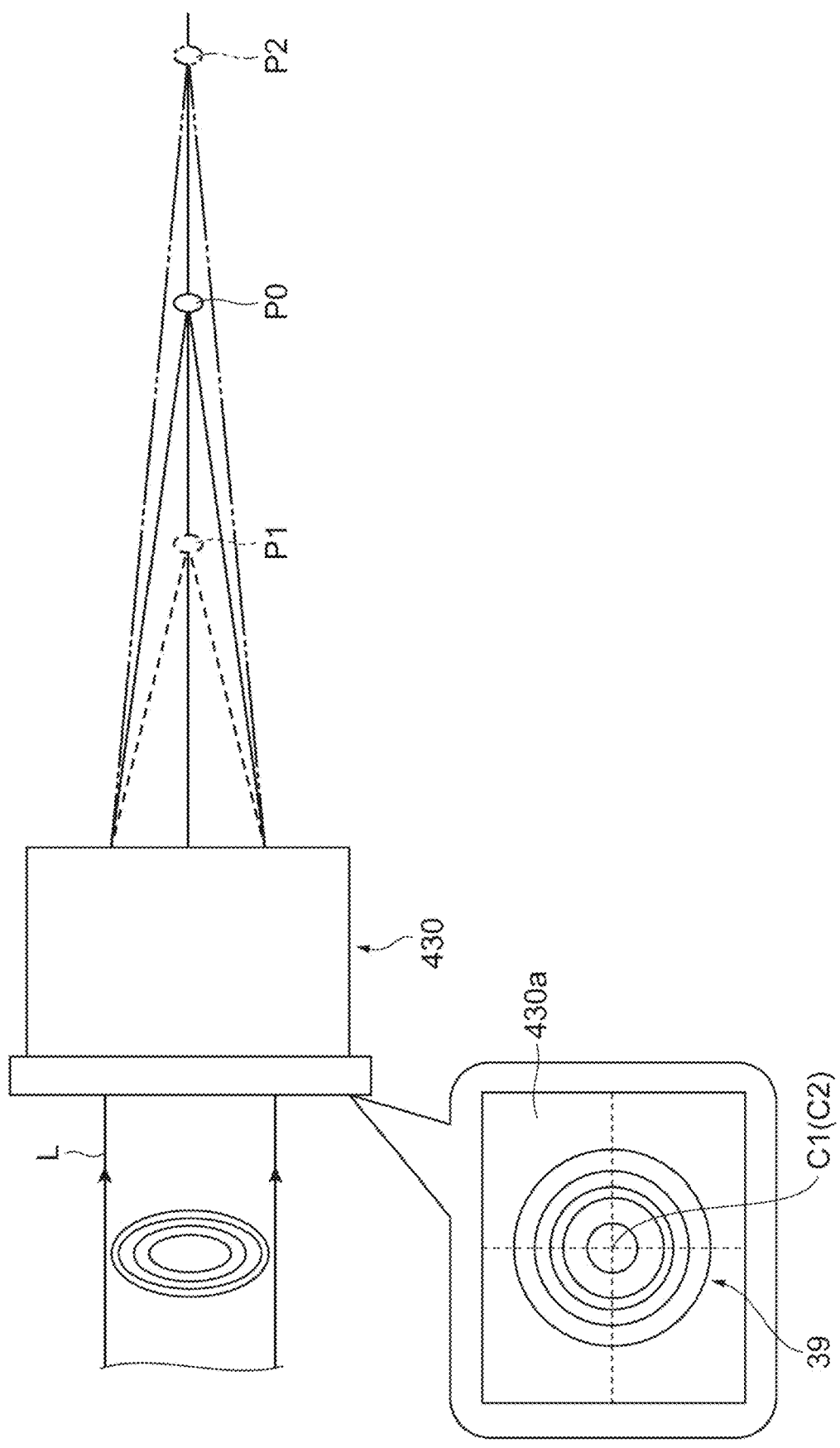
FIG. 17 is a schematic view for explaining a state where an image-transfer position shift does not occur.
Figure 20:
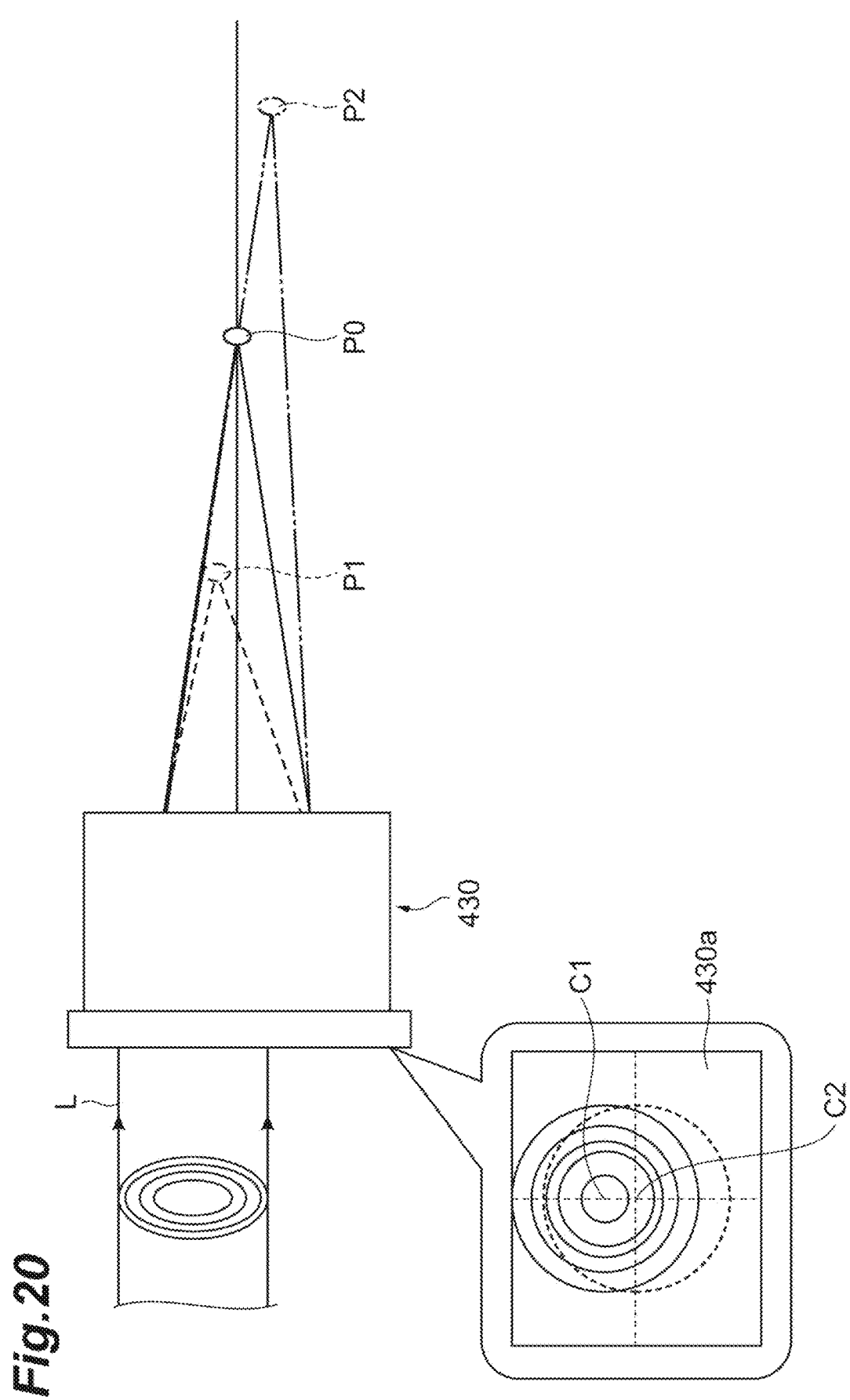
FIG. 20 is a schematic view for explaining a state where an image-transfer position shift occurs.

FIG. 17 is a schematic view for explaining a state where an image-transfer position shift does not occur. FIG. 20 is a schematic view for explaining a state where an image-transfer position shift occurs. When the reference position of the phase pattern on the liquid crystal layer 216 matches with the optical axis center, and the image-transfer position shift does not occur as illustrated in FIG. 17, the 4f lens unit 420 transfers the image of the laser light L reflected by the liquid crystal layer 216 of the reflective spatial light modulator 410 to the condenser lens unit 430 as it is. A center position C1 of an image 39 of the laser light L transferred to the entrance pupil plane 430a matches with a center position C2 of the entrance pupil plane 430a. In this case, it is found that a reference condensing position P0, a convex lens DF condensing position P1 and a concave lens DF condensing position P2 match with each other in a perpendicular direction (illustrated upper and lower directions) perpendicular to the optical axis direction of the laser light L.

Figure 18:
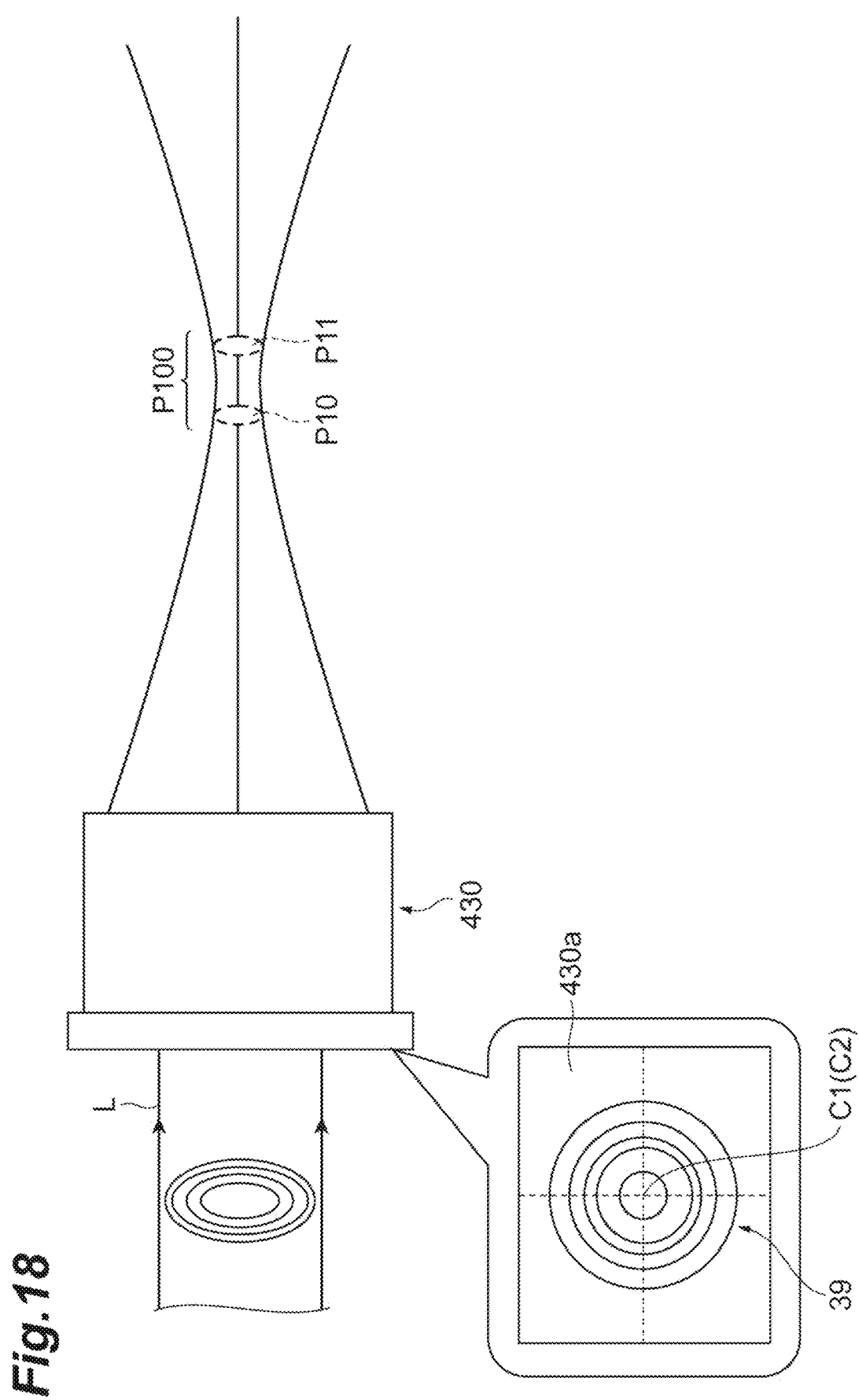
FIG. 18 is another schematic view for explaining a state where an image-transfer position shift does not occur.
Figure 19:
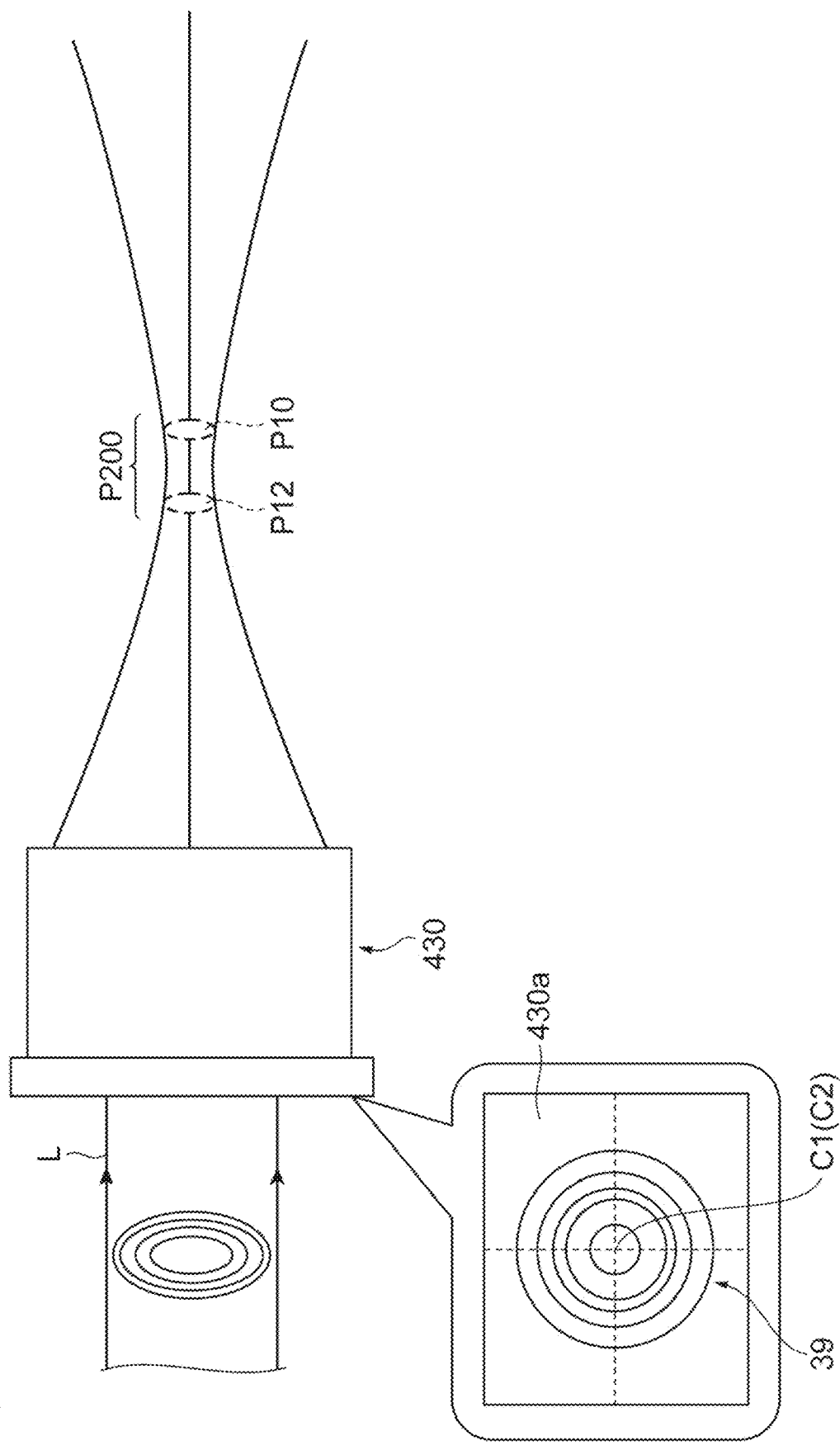
FIG. 19 is still another schematic view for explaining a state where an image-transfer position shift does not occur.

FIGS. 18 and 19 are other schematic views for explaining a state where an image-transfer position shift does not occur. In FIGS. 18 and 19, a first axicon condensing position P11 is a position at which a laser beam on the side opposite to the side of the condenser lens unit 430 does not expand too much with respect to a reference condensing position P10 (a position on the side opposite to the side of the condenser lens unit 430 in a condensing range P100 of the laser light L) in a case where the first axicon pattern is displayed on the liquid crystal layer 216. A second axicon condensing position P12 is a position at which a laser beam on the side of the condenser lens unit 430 does not expand too much with respect to a reference condensing position P10 (a position on the side of the condenser lens unit 430 in a condensing range P200 of the laser light L) in a case where the second axicon pattern is displayed on the liquid crystal layer 216.

It is found that, when the first axicon pattern is used and the image-transfer position shift does not occur as illustrated in FIG. 18, the reference condensing position P10 and the first axicon condensing position P11 match with each other in the perpendicular direction (illustrated upper and lower directions) perpendicular to the optical axis direction of the laser light L. It is found that, when the second axicon pattern is used, and the image-transfer position shift does not occur as illustrated in FIG. 19, the reference condensing position P10 and the second axicon condensing position P12 match with each other in the perpendicular direction (illustrated upper and lower directions) perpendicular to the optical axis direction of the laser light L.

On the other hand, when the reference position of the phase pattern and the optical axis center do not match on the liquid crystal layer 216 as illustrated in FIG. 20, the center position C1 of the image 39 of the laser light L transferred to the entrance pupil plane 430a shifts from the center position C2 of the entrance pupil plane 430a, i.e., the image-transfer position shift occurs. In this case, it is found that the condenser lens unit 430 does not adequately condense the laser light L, and the reference condensing position P0, the convex lens DF condensing position P1 and the concave lens DF condensing position P2 are apart from each other in the perpendicular direction perpendicular to the optical axis direction of the laser light L. More specifically, it is found that the convex lens DF condensing position P1 and the concave lens DF condensing position P2 shift toward one side and the other side, respectively, about the reference condensing position P0 in the perpendicular direction. When, for example, the center position of the phase pattern on the liquid crystal layer 216 is shifted by one pixel from the optical axis center, the image-transfer position shift of 20 μm occurs in some cases and is likely to influence machining quality.

Figure 21:
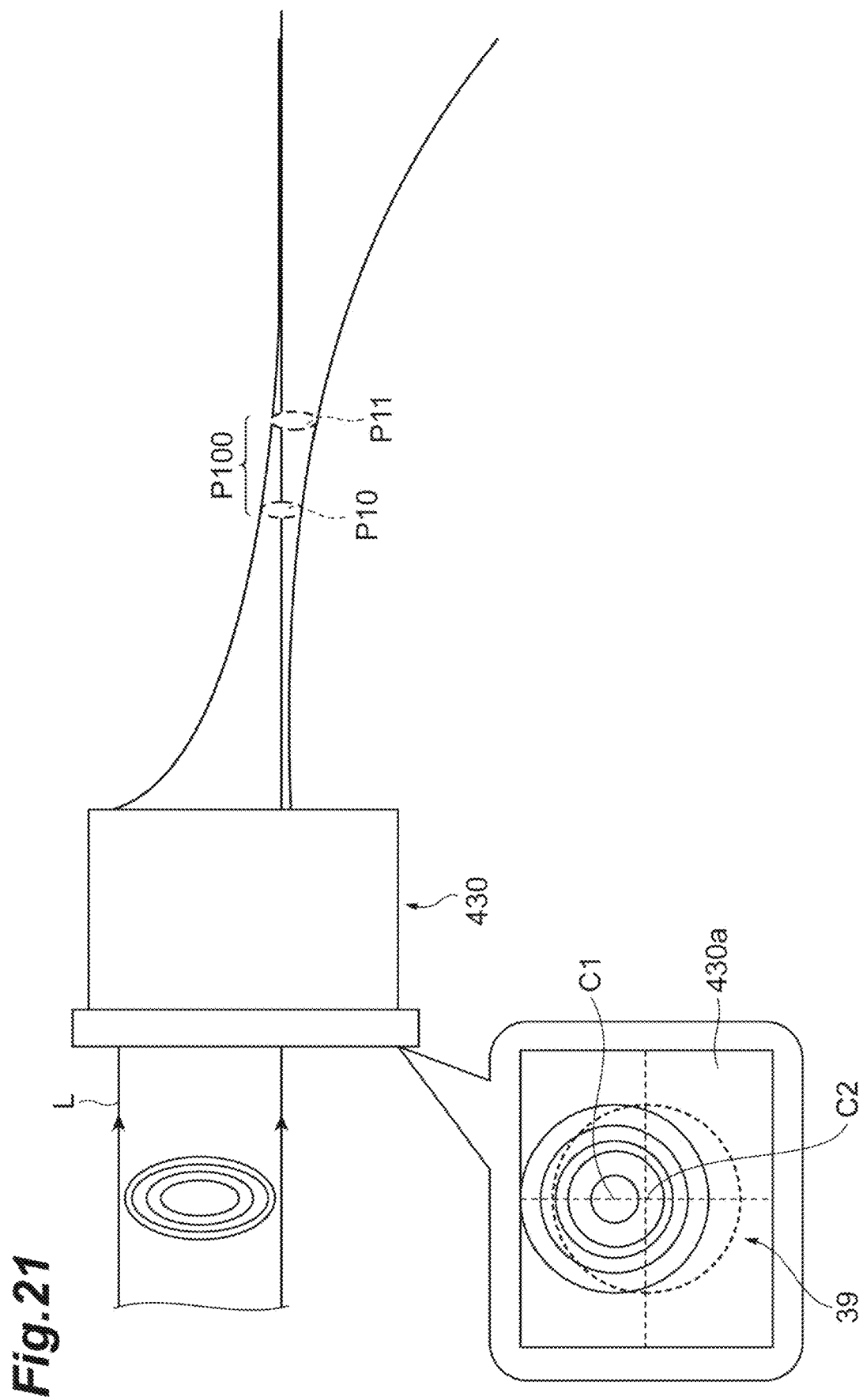
FIG. 21 is another schematic view for explaining a state where an image-transfer position shift occurs.
Figure 22:
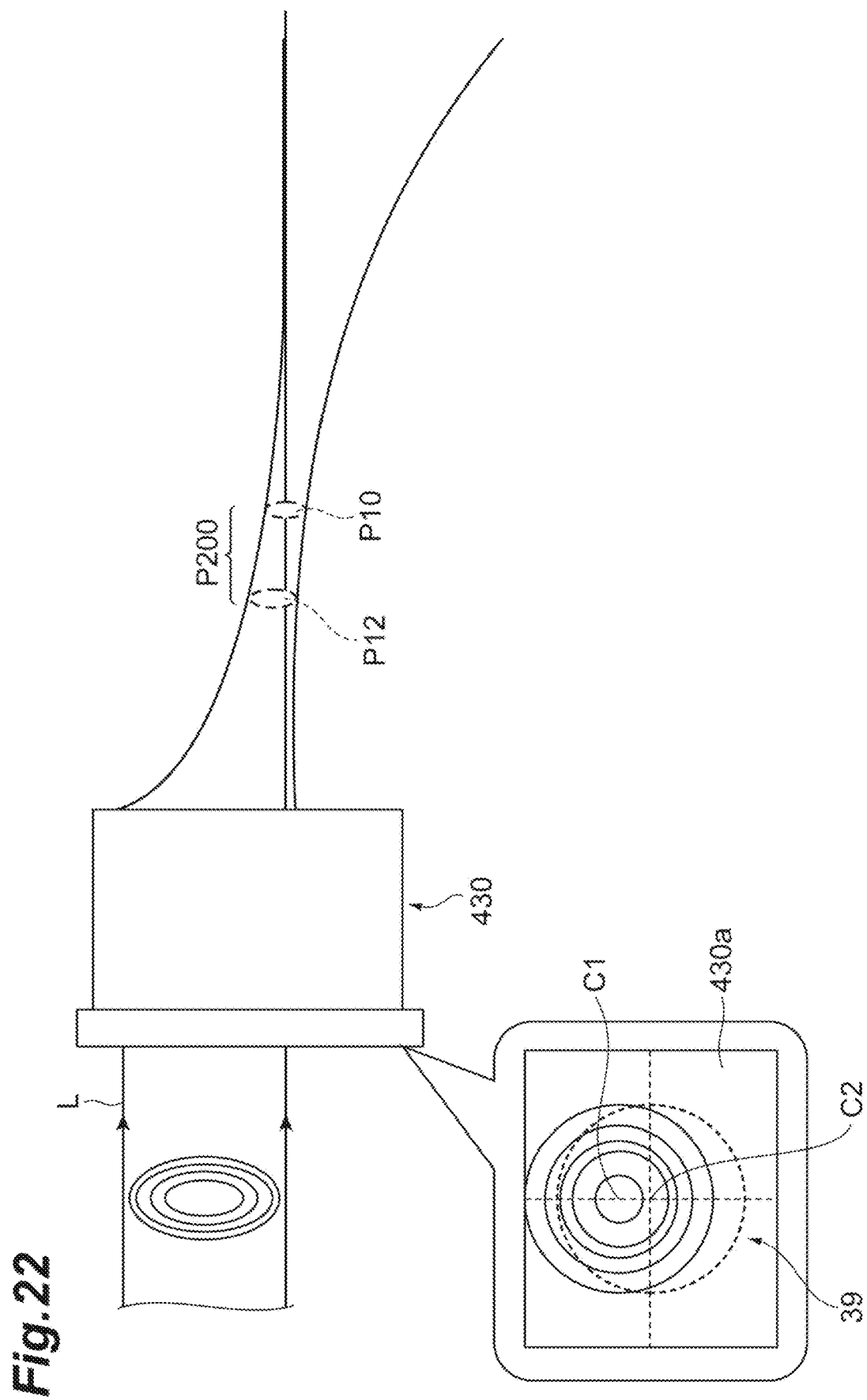
FIG. 22 is still another schematic view for explaining a state where an image-transfer position shift occurs.

FIGS. 21 and 22 are other schematic views for explaining a state where an image-transfer position shift occurs. It is found that, when the first axicon pattern is used and the image-transfer position shift occurs as illustrated in FIG. 21, the condenser lens unit 430 does not adequately condense the laser light L, and the reference condensing position P10 and the first axicon condensing position P11 are apart from each other in the perpendicular direction perpendicular to the optical axis direction of the laser light L. More specifically, it is found that the reference condensing position P10 and the first axicon condensing position P11 shift toward one side and the other side, respectively, about the reference condensing position P10 in the perpendicular direction.

It is found that, when the second axicon pattern is used and the image-transfer position shift occurs as illustrated in FIG. 22, the condenser lens unit 430 does not adequately condense the laser light L, and the reference condensing position P10 and the second axicon condensing position P12 are apart from each other in the perpendicular direction perpendicular to the optical axis direction of the laser light L. More specifically, it is found that the reference condensing position P10 and the second axicon condensing position P12 shift toward one side and the other side, respectively, about the reference condensing position P10 in the perpendicular direction.

Figure 23:
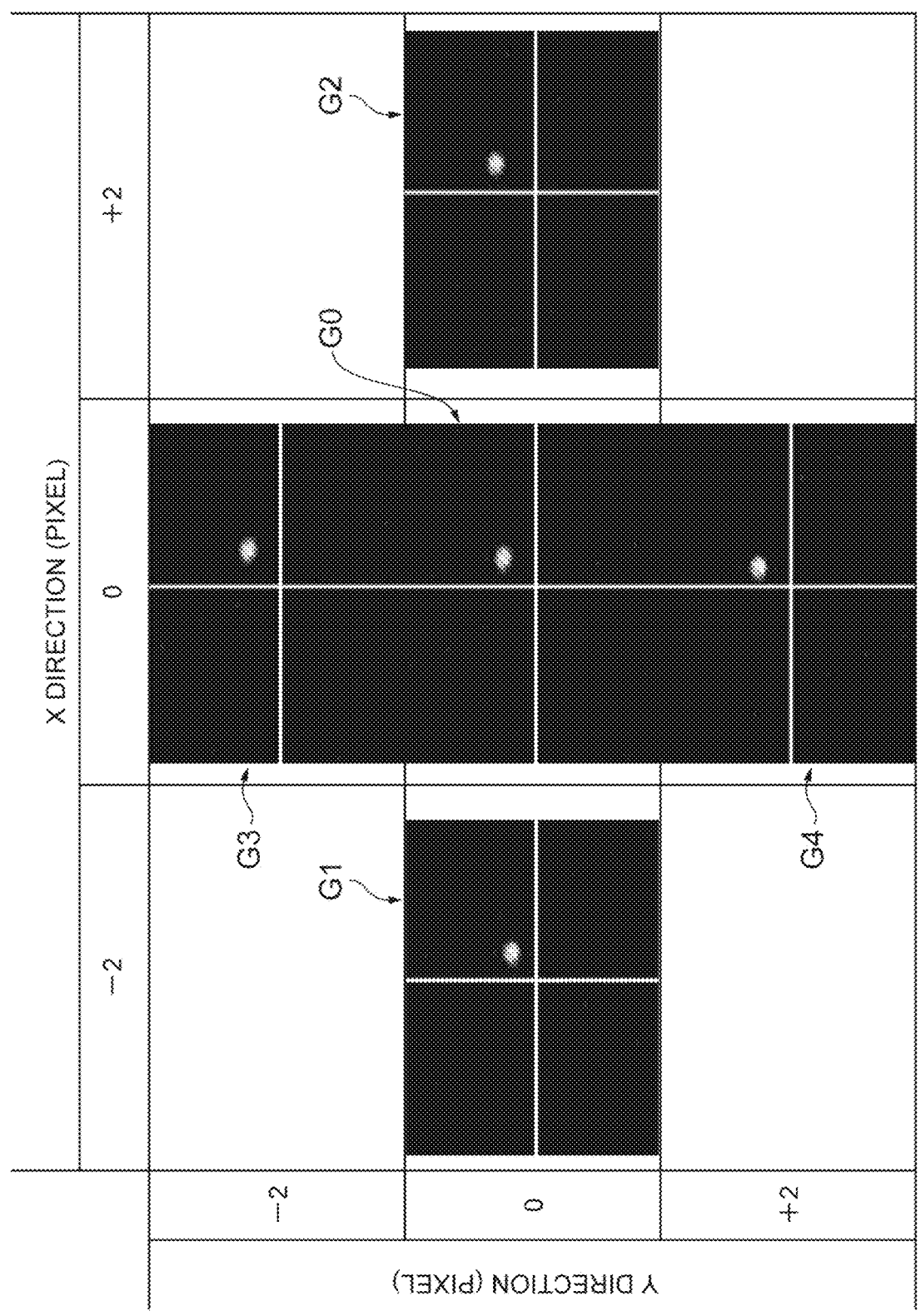
FIG. 23 is a view illustrating a point image photographic image in a case where a first defocus pattern is displayed on a liquid crystal layer.
Figure 24:
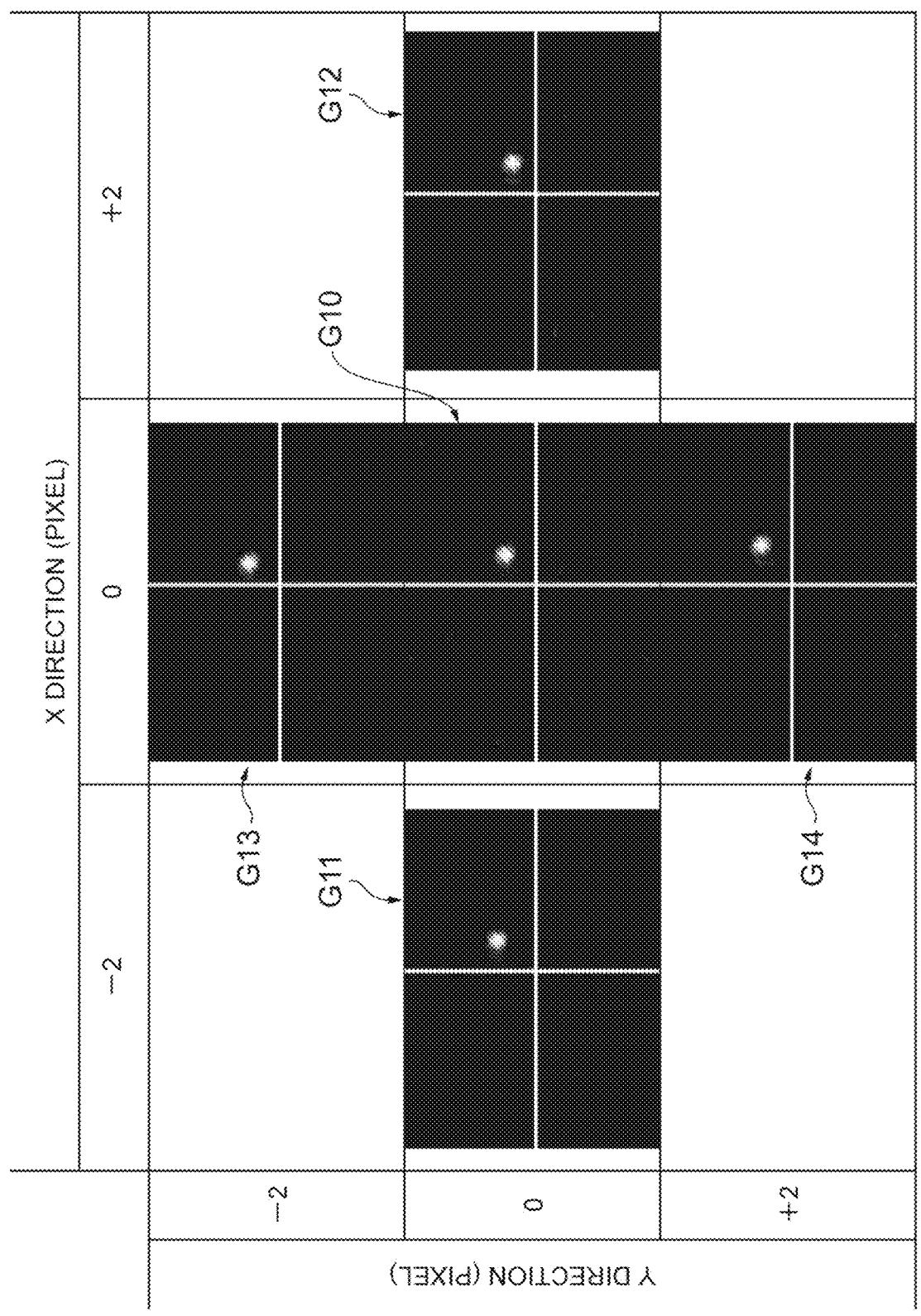
FIG. 24 is a view illustrating a point image photographic image in a case where a second defocus pattern is displayed on the liquid crystal layer.

FIG. 23 is a view illustrating a point image photographic image in a case where the first defocus pattern is displayed on the liquid crystal layer 216. This FIG. 23 illustrates a plurality of enlarged point image photographic images when the position of the first defocus pattern is changed. FIG. 24 is a view illustrating a point image photographic image in a case where the second defocus pattern is displayed on the liquid crystal layer 216. This FIG. 24 illustrates a plurality of enlarged point image photographic images when the position of the second defocus pattern is changed.

Point image photographic images G0 and G10 are point images in a case where the reference position is set to an optical axis center C4. Point image photographic images G1 and G11 are point images in a case where the reference position is shifted by two pixels from the optical axis center C4 toward a minus X direction of a coordinate system of the liquid crystal layer 216. Point image photographic images G2 and G12 are point images in a case where the reference position is shifted by two pixels from the optical axis center C4 toward a plus X direction of the coordinate system of the liquid crystal layer 216. Point image photographic images G3 and G13 are point images in a case where the reference position is shifted by two pixels from the optical axis center C4 toward a minus Y direction of the coordinate system of the liquid crystal layer 216. Point image photographic images G4 and G14 are point images in a case where the reference position is shifted by two pixels from the optical axis center C4 toward a plus Y direction of the coordinate system of the liquid crystal layer 216. Furthermore, the point image photographic images G0 and G10 are point images in a case where the image-transfer position shift does not occur. The point image photographic images G1 to G4 and G11 to G14 are point images in a case where the image-transfer position shift occurs. In addition, a cross hair appearing on each of the point image photographic images G0 to G4 and G10 to G14 is an indication added to an image when the observation camera 488 captures the image, and is not an indication indicating the coordinate systems of the liquid crystal layer 216 and the entrance pupil plane 430a.

As illustrated in FIG. 23, the point image gravity center positions of the point image photographic images G1 to G4 in which the image-transfer position shift occurs are apart (shifted) from the point image gravity center position of the point image photographic image G0 in which the image-transfer position shift does not occur. More specifically, the point image of the point image photographic image G1 is shifted downward in FIG. 23 compared to the point image of the point image photographic image G0. The point image of the point image photographic image G2 is shifted upward in FIG. 23 compared to the point image of the point image photographic image G0. The point image of the point image photographic image G3 is shifted rightward in FIG. 23 compared to the point image of the point image photographic image G0. The point image of the point image photographic image G4 is shifted leftward in FIG. 23 compared to the point image of the point image photographic image G0.

Similarly, as illustrated in FIG. 24, the point image gravity center positions of the point image photographic images G11 to G14 in which the image-transfer position shift occurs are apart from the point image gravity center position of the point image photographic image G10 in which the image-transfer position shift does not occur. More specifically, the point image of the point image photographic image G11 is shifted upward in FIG. 24 compared to the point image of the point image photographic image G10. The point image of the point image photographic image G12 is shifted downward in FIG. 24 compared to the point image of the point image photographic image G10. The point image of the point image photographic image G13 is shifted leftward in FIG. 24 compared to the point image of the point image photographic image G10. The point image of the point image photographic image G14 is shifted rightward in FIG. 24 compared to the point image of the point image photographic image G10.

In addition, even when the axicon pattern is used instead of the first defocus pattern, the same results as the results illustrated in FIGS. 23 and 24 can be obtained.

FIG. 25 is a graph illustrating a relationship between a point image gravity center position and a shift amount of the reference position with respect to the optical axis center. FIG. 25(a) illustrates the gravity center position in an X coordinate of the point image, and the shift amount in the X direction of the reference position. FIG. 25(b) illustrates the gravity center position in a Y coordinate of the point image, and the shift amount in the Y direction of the reference position. "Δ" in FIG. 25 indicates the first position (the point image gravity center position in a case where the first defocus pattern is displayed on the liquid crystal layer 216). "○" in FIG. 25 indicates the second position (the point image gravity center position in a case where the second defocus pattern is displayed on the liquid crystal layer 216).

As illustrated in FIG. 25, the first position has a proportional relationship of a positive proportionality coefficient with the shift amount of the reference position. The second position has a proportional relationship of a negative proportionality coefficient with the shift amount of the reference position. The reference position at an intersection of a straight line representing the proportional relationship of the first position and a straight line representing the proportional relationship of the second position matches with the optical axis center (the shift amount of the reference position is substantially 0).

That is, when the first position and the second position match, the shift amount of the reference position with respect to the optical axis center is 0, and the image-transfer position shift does not occur. In other words, when the shift amount of the reference position with respect to the optical axis center is 0 and the image-transfer position shift does not occur, the first position and the second position match with each other. On the other hand, when the first position and the second position are more apart from each other, the shift amount of the reference position becomes great, and the image-transfer position shift becomes significant. In other words, when an absolute value of the shift amount of the reference position with respect to the optical axis center is higher, the image-transfer position shift becomes significant, and the first position and the second position are apart from each other.

In addition, the match includes not only a perfect match but also a substantial match and a rough match. The match means substantially the same. The match permits, for example, an imaging error and a restriction of the observation camera 488, and a difference caused by a display error or a resolution restriction when a phase pattern is displayed on the liquid crystal layer 216. The match includes a state where, when the shift amount of the reference position is changed, the first position and the second position are the closest. For example, the match includes a positional relationship between the first position and the second position in a case where the shift amount of the reference position is 0 in FIG. 25.

According to knowledge on the above principal or phenomenon, as illustrated in FIG. 16, the controller 500 determines whether or not there is the image-transfer position shift based on the point image photographic image captured by the observation camera 488. More specifically, the controller 500 determines that there is the image-transfer position shift when the first position (a point image gravity center position in a case where the first phase pattern is displayed on the liquid crystal layer 216) and the second position (a point image gravity center position in a case where the second phase pattern is displayed on the liquid crystal layer 216) do not match.

Furthermore, the controller 500 adjusts the reference position in the liquid crystal layer 216 based on the point image photographic image captured by the observation camera 488. The controller 500 offsets (shifts) the reference position in the liquid crystal layer 216 based on the first and second positions obtained by the first and second position obtaining processing. The controller 500 offsets the reference position such that the first position and the second position obtained by executing the first and second position obtaining processing under the same reference position condition match with each other. For example, the controller 500 calculates the optical axis center from a plurality of first positions and a plurality of second positions by using the relationship illustrated in FIG. 25. Furthermore, the controller 500 offsets the reference position to the calculated optical axis center.

The controller 500 is connected with a monitor. The monitor can display the point image photographic image of the reflected light RL captured by the observation camera 488. The monitor can display the phase pattern to be displayed on the liquid crystal layer 216 by the spatial light modulator controller 502. The monitor can display as a log a determination result of the controller 500 regarding whether or not there is the image-transfer position shift. The monitor can display a reference position adjustment result of the controller 500 as a log.

Figure 26:
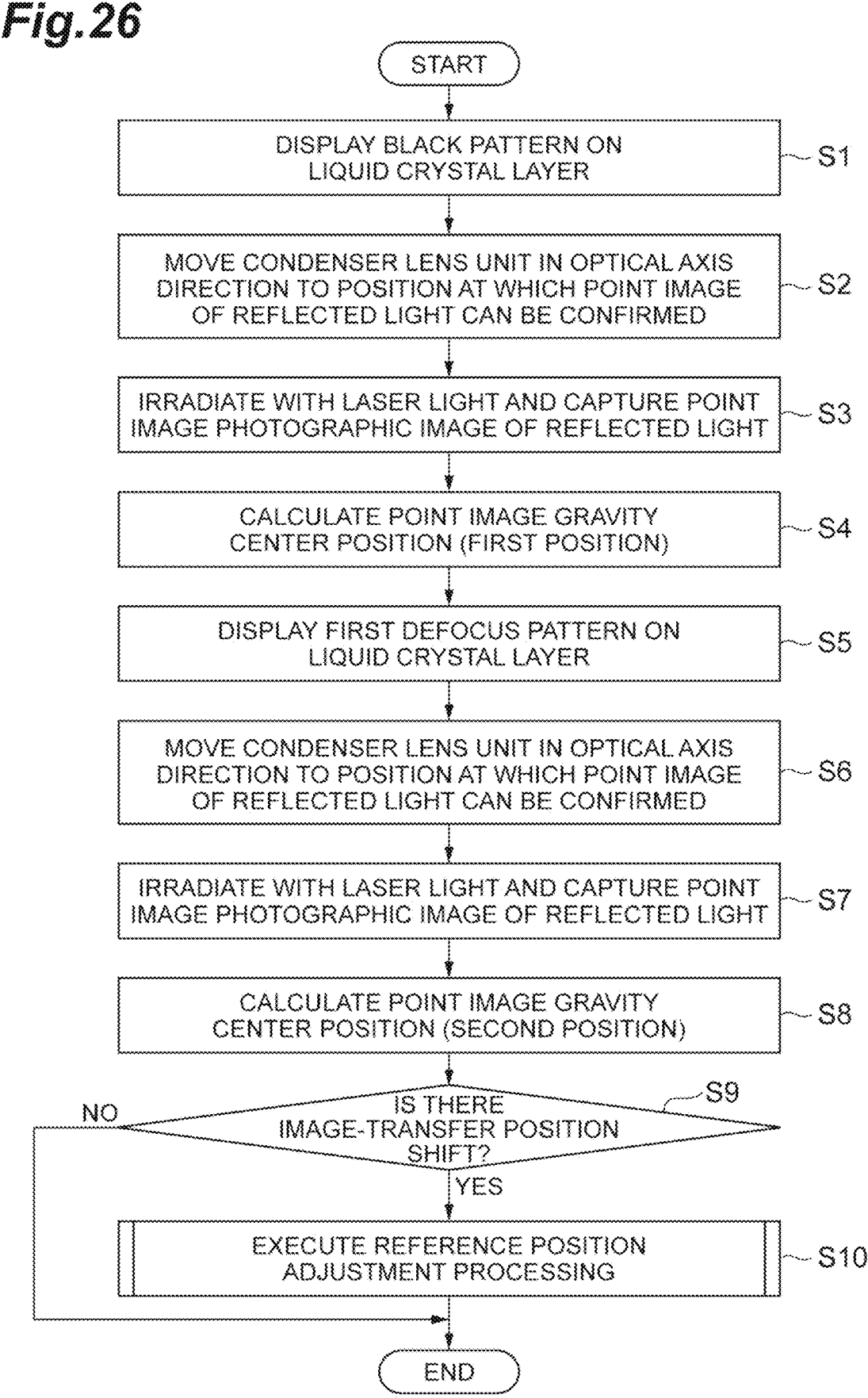
FIG. 26 is a flowchart illustrating a laser light irradiation method of the laser machining device in FIG. 16.
Figure 27:
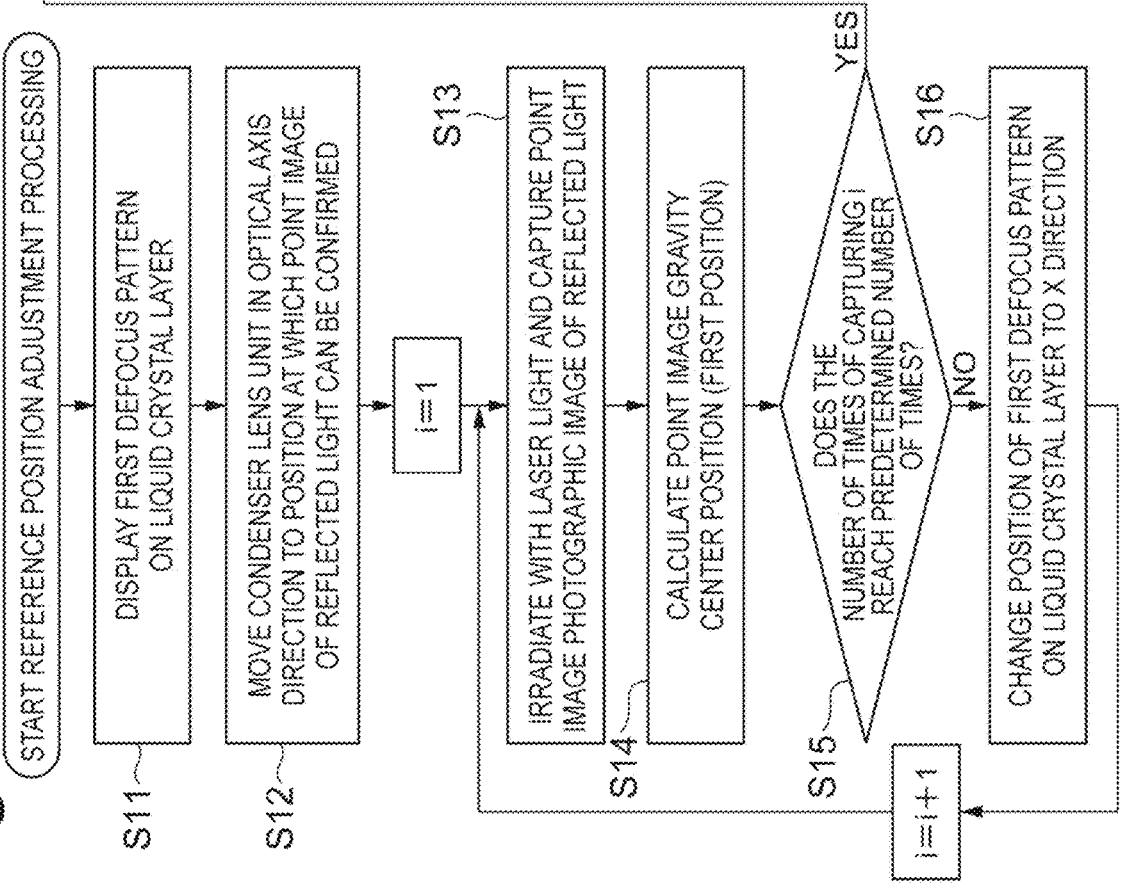
FIG. 27 is a flowchart illustrating reference position adjustment processing in FIG. 26.
Figure 28:
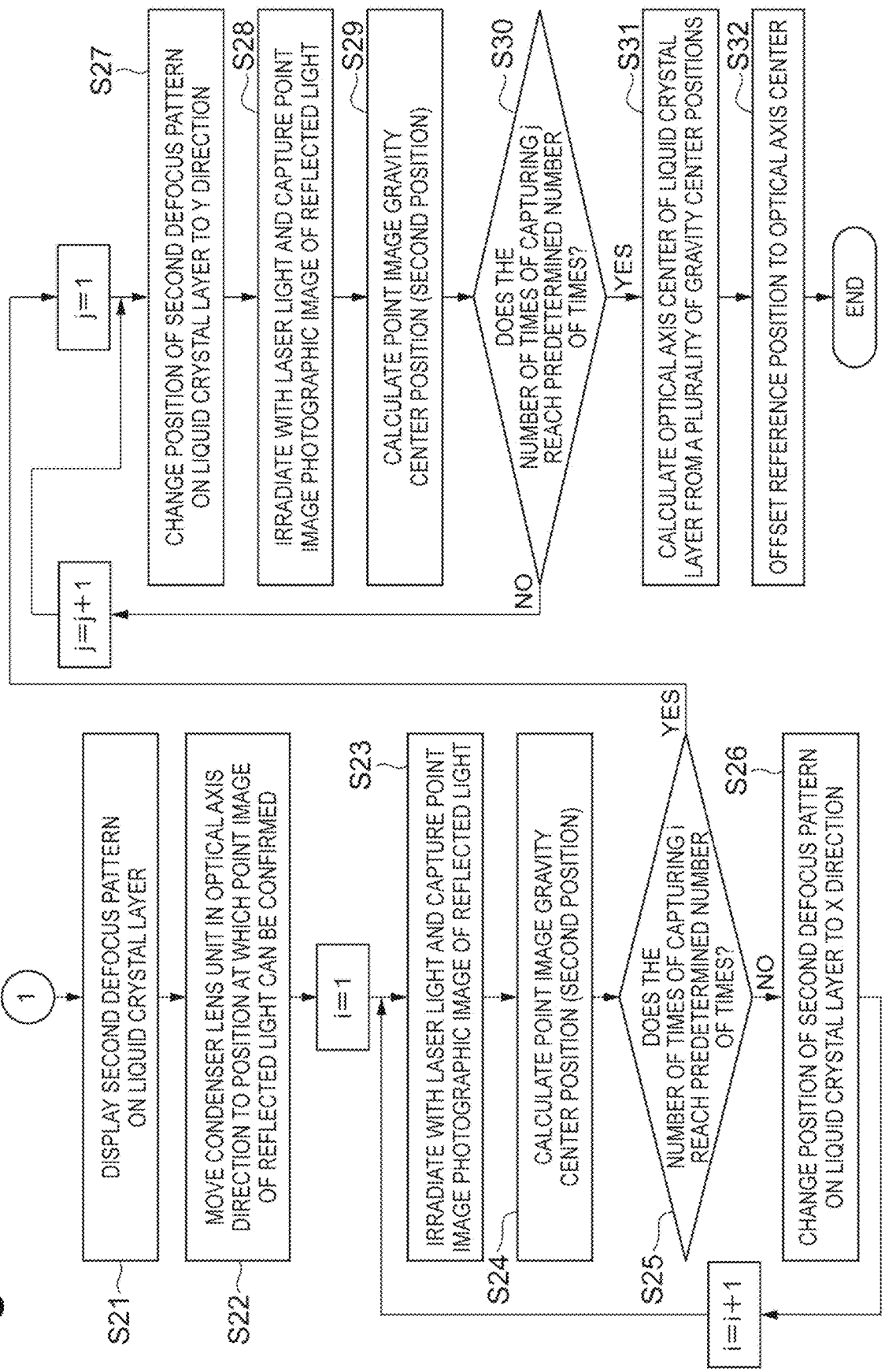
FIG. 28 is another flowchart illustrating the reference position adjustment processing in FIG. 26.

Next, an example of a laser light irradiation method according to the present embodiment will be described with reference to flowcharts in FIGS. 26 to 28.

The laser light irradiation method according to the present embodiment can be used as an inspection direction or an adjustment method for the laser machining device 200, and is carried out in a check mode during regular checkup, for example. According to the laser light irradiation method according to the present embodiment, the controller 500 executes the following processing. That is, first, a black pattern is displayed on the liquid crystal layer 216 (step S1). The second movement mechanism 240 moves the laser condensing unit 400 along the Z axis direction to move the condenser lens unit 430 to a position at which the point image of the reflected light RL can be confirmed and in the optical axis direction with respect to the machining object 1 (step S2). In above step S2, while the condenser lens unit 430 is moved in the optical axis direction, the observation camera 488 searches the point image of the reflected light RL.

In a state where the black pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S3). In above step S3, the laser output unit 300 (the λ/2 wavelength plate unit 330 and the polarizing plate unit 340 in particular) is controlled to adjust the output of the laser light L to a smaller output than a machining threshold of the machining object 1 such that the modified region 7 is not formed on the machining object 1 by irradiation of the laser light L. In addition, the output of the laser light L is adjusted to the smaller output than the machining threshold likewise in steps S7, S13, S18, S23 and S28 described below. The gravity center calculation of the image processing or the like is performed on the point image of the captured point image photographic image to calculate this point image gravity center position as the first position (step S4).

Subsequently, the first defocus pattern is displayed on the liquid crystal layer 216 (step S5). The second movement mechanism 240 moves the laser condensing unit 400 along the Z axis direction to move the condenser lens unit 430 to a position at which the point image of the reflected light RL can be confirmed and in the optical axis direction with respect to the machining object 1 (step S6). In above step S6, while the condenser lens unit 430 is moved in the optical axis direction, the observation camera 488 searches the point image of the reflected light RL.

In a state where the first defocus pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S7). The gravity center calculation of the image processing or the like is performed on the point image of the captured point image photographic image to calculate this point image gravity center position as the second position (step S8).

Whether or not there is the image-transfer position shift is determined based on the point image gravity center positions calculated in above steps S4 and S8 (step S9). More specifically, when the point image gravity center position in the case where the black pattern is displayed on the liquid crystal layer 216 and the point image gravity center position in the case where the first defocus pattern is displayed on the liquid crystal layer 216 match with each other, NO is determined in step S9, it is determined that there is no image-transfer position shift and processing is finished. On the other hand, when these gravity center positions do not match with each other, YES is determined in above step S9, it is determined that there is the image-transfer position shift, and reference position adjustment processing of adjusting a phase pattern reference position is executed (step S10).

According to the reference position adjustment processing, the first defocus pattern is first displayed on the liquid crystal layer 216 similar to above step S5 (step S11). Similar to step S6, the second movement mechanism 240 moves the laser condensing unit 400 along the Z axis direction to move the condenser lens unit 430 to a position at which the point image of the reflected light RL can be confirmed and in the optical axis direction with respect to the machining object 1 (step S12). Similar to step S7, in the state where the first defocus pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S13).

Similar to above step S8, the gravity center calculation of the image processing or the like is performed on the point image of the point image photographic image to calculate this point image gravity center position as the first position (step S14). Whether or not the number of times of capturing i which is the number of times of processing in above step S13 reaches a preset predetermined number of times (=an integer equal to or more than two) is determined (step S15). In a case of NO in above step S15, the phase pattern position on the liquid crystal layer 216 is changed by one pixel along the X direction to return to the processing in above step S13 (step S16).

In a case of YES in above step S15, the first defocus pattern position on the liquid crystal layer 216 is changed by one pixel along the Y direction (step S17). Similar to step S13, in the state where the first defocus pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S18). Similar to above step S14, the gravity center calculation of the image processing is performed on the point image of the point image photographic image to calculate this point image gravity center position as the first position (step S19). Whether or not the number of times of capturing j which is the number of times of processing in above step S18 reaches the preset predetermined number of times (=the integer equal to or more than two) is determined (step S20). In a case of NO in above step S20, the processing returns to above step S17.

In a case of YES in above step S20, the second defocus pattern is displayed on the liquid crystal layer 216 (step S21). The second movement mechanism 240 moves the laser condensing unit 400 along the Z axis direction to move the condenser lens unit 430 to a position at which the point image of the reflected light RL can be confirmed and in the optical axis direction with respect to the machining object 1 (step S22). In above step S22, while the condenser lens unit 430 is moved in the optical axis direction, the observation camera 488 searches the point image of the reflected light RL.

In a state where the second defocus pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S23).

The gravity center calculation of the image processing or the like is performed on the point image of the point image photographic image to calculate this point image gravity center position as the second position (step S24). Whether or not the number of times of capturing i which is the number of times of processing in above step S23 reaches the preset predetermined number of times (=the integer equal to or more than two) is determined (step S25). In a case of NO in above step S25, the phase pattern position on the liquid crystal layer 216 is changed by one pixel along the X direction to return to the processing in above step S23 (step S26).

In a case of YES in above step S25, the second defocus pattern position on the liquid crystal layer 216 is changed by one pixel along the Y direction (step S27). Similar to step S23, in the state where the second defocus pattern is displayed on the liquid crystal layer 216, the laser oscillator 310 generates the laser light L to irradiate the machining object 1 with the laser light L. In response to the irradiation, the observation camera 488 captures the point image photographic image of the reflected light RL (step S28). Similar to above step S24, the gravity center calculation of the image processing or the like is performed on the point image of the point image photographic image to calculate this point image gravity center position as the second position (step S29). Whether or not the number of times of capturing j which is the number of times of processing in above step S28 reaches the preset predetermined number of times the integer equal to or more than two) is determined (step S30). In a case of NO in above step S30, the processing returns to above step S27.

Subsequently, the optical axis center of the liquid crystal layer 216 is calculated based on a plurality of first positions calculated in above step S14 and above step S19 and a plurality of second positions calculated in above step S24 and above step S29 (step S31). In, for example, above step S31, a linear function of the center position and the first positions of the phase pattern is calculated. A linear function of the center position and the second positions of the phase pattern is calculated. Furthermore, the optical axis center is calculated from the phase pattern position in a case where these linear functions intersect. The controller 500 offsets the reference position of the liquid crystal layer 216 to the calculated optical axis center (step S32). By this means, the position of the image 39 of the laser light L transferred to the entrance pupil plane 430$a$ is corrected to a state where the image-transfer position shift is reduced and eventually does not occur.

In the example of the laser light irradiation method, when a point image position shift is determined, the first phase pattern is the black pattern, and the second phase pattern is the first defocus pattern. According to the reference position adjustment processing, the first phase pattern is the first defocus pattern, and the second phase pattern is the second defocus pattern. However, the first phase pattern may be one of the black pattern, the first defocus pattern and the second defocus pattern. The second phase pattern may be the other one of the black pattern, the first defocus pattern and the second defocus pattern.

In the above description, the controller 500 constitutes a point image position obtaining unit, a position determining unit and a position adjusting unit. Above step S11 constitutes a first step. Above steps S13 and S18 constitute a second step. Above steps S14 and S19 constitute a third step. Above steps S15 to S17 and S20 constitute a fourth step. Above step S21 constitutes a fifth step. Above steps S23 and S28 constitute a sixth step. Above steps S24 and S29 constitute a seventh step. Above steps S25 to S27 and S30 constitute an eighth step. Above steps S31 and S32 constitute a ninth step.

Figure 29:
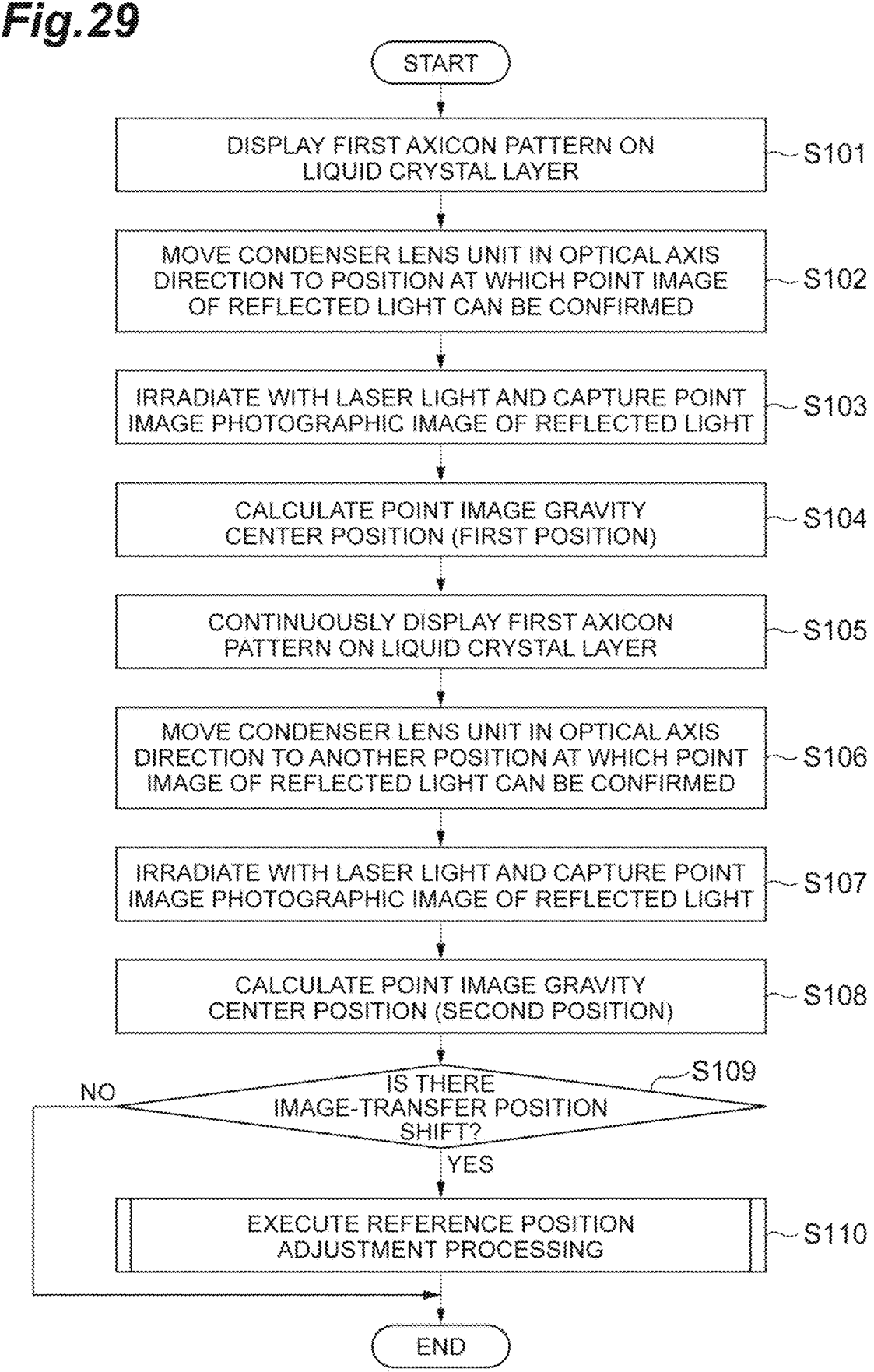
FIG. 29 is a flowchart illustrating another laser light irradiation method of the laser machining device in FIG. 16.
Figure 30:
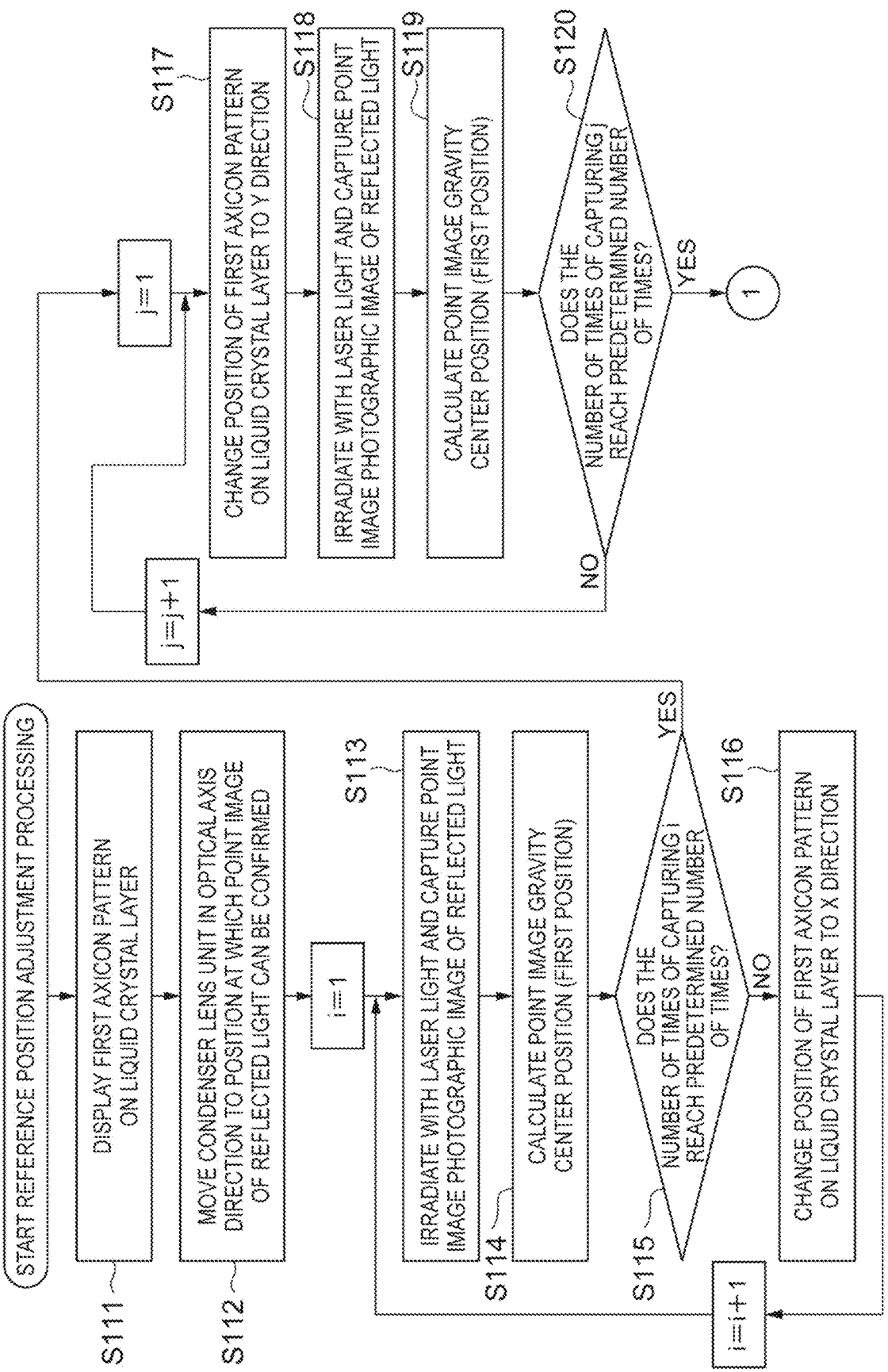
FIG. 30 is a flowchart illustrating reference position adjustment processing in FIG. 29.
Figure 31:
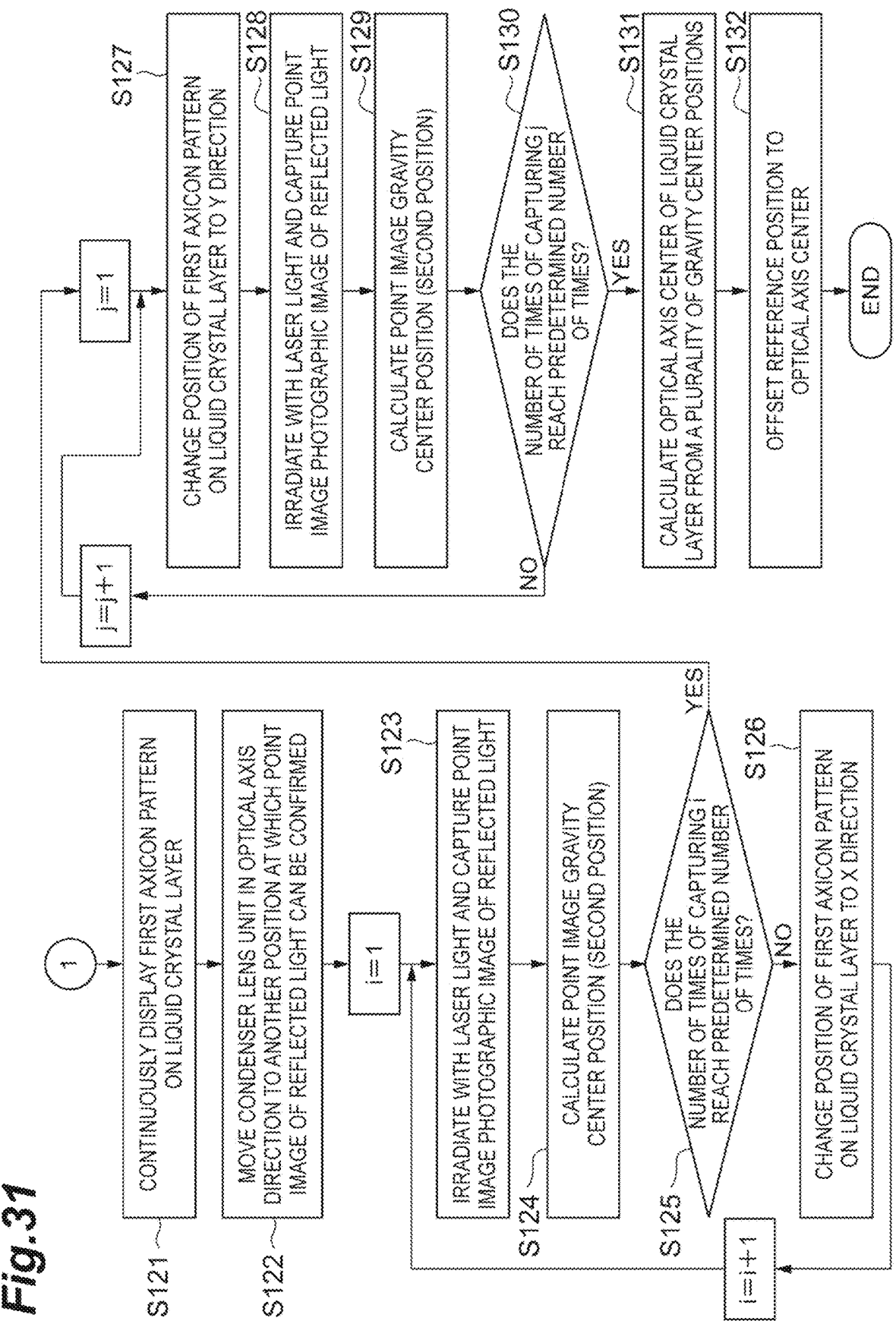
FIG. 31 is another flowchart illustrating the reference position adjustment processing in FIG. 29.

Next, another example of the laser light irradiation method according to the present embodiment will be described with reference to flowcharts in FIGS. 29 to 31. In addition, portions which overlap the above description regarding the flowchart in FIGS. 26 to 28 will be omitted.

In another example of the laser light irradiation method according to the present embodiment, the controller 500 executes the following processing. That is, first, the first axicon pattern is displayed on the liquid crystal layer 216 (step S101). The condenser lens unit 430 is moved to a position at which the point image of the reflected light RL can be confirmed and in the optical axis direction with respect to the machining object 1 (step S102). The laser oscillator 310 generates the laser light L to irradiate the machining object 1 with the laser light L. The observation camera 488 captures the point image photographic image of the reflected light RL (step S103). The point image gravity center position is calculated as the first position (step S104).

Subsequently, the first axicon pattern is continuously displayed on the liquid crystal layer 216 (step S105). The condenser lens unit 430 is moved to another position at which the point image of the reflected light RL can be confirmed and in the optical axis direction with respect to the machining object 1 (step S106). In a state where the first axicon pattern is displayed on the liquid crystal layer 216, the laser oscillator 310 generates the laser light L to irradiate the machining object 1 with the laser light L. The observation camera 488 captures the point image photographic image of the reflected light RL (step S107). The point image gravity center position is calculated as the second position (step S108).

Whether or not there is the image-transfer position shift is determined based on the point image gravity center position calculated in above steps S104 and S108 (step S109). More specifically, when the point image gravity center position at the first position in the case where the first axicon pattern is displayed on the liquid crystal layer 216 and the point image gravity center position at the second position in the case where the first axicon pattern is displayed on the liquid crystal layer 216 match with each other, NO is determined in step S109, it is determined that there is no image-transfer position shift and processing is finished. On the other hand, when these gravity center positions do not match with each other, YES is determined in above step S109, it is determined that there is the image-transfer position shift, and the reference position adjustment processing of adjusting a phase pattern reference position is executed (step S110).

According to the reference position adjustment processing, first, the first axicon pattern is displayed on the liquid crystal layer 216 (step S111). The condenser lens unit 430 is moved to a position at which the point image of the reflected light RL can be confirmed and in the optical axis direction with respect to the machining object 1 (step S112). In addition, a movement position is set to one of positions in the condensing range P100. In a state where the first axicon pattern is displayed on the liquid crystal layer 216, the laser oscillator 310 generates the laser light L to irradiate the machining object 1 with the laser light L. The observation camera 488 captures the point image photographic image of the reflected light RL (step S113).

The point image gravity center position is calculated as the first position (step S114). Whether or not the number of times of capturing i which is the number of times of processing in above step S113 reaches the preset predetermined number of times (=the integer equal to or more than two) is determined (step S115). In a case of NO in above step S115, the phase pattern position on the liquid crystal layer 216 is changed by one pixel along the X direction to return to the processing in above step S113 (step S116).

In a case of YES in above step S15, the first axicon pattern position on the liquid crystal layer 216 is changed by one pixel along the Y direction (step S117). In the state where the first axicon pattern is displayed on the liquid crystal layer 216, the laser oscillator 310 generates the laser light L to irradiate the machining object 1 with the laser light L. The observation camera 488 captures the point image photographic image of the reflected light RL (step S118). The point image gravity center position is calculated as the first position (step S119). Whether or not the number of times of capturing j which is the number of times of processing in above step S118 reaches the preset predetermined number of times (=the integer equal to or more than two) is determined (step S120). In a case of NO in above step S120, the processing returns to above step S117.

In a case of YES in above step S120, the first axicon pattern is continuously displayed on the liquid crystal layer 216 (step S121). The condenser lens unit 430 is moved to another position at which the point image of the reflected light RL can be confirmed (one of positions in the condensing range P100 and a position different from that in step S112) and in the optical axis direction with respect to the machining object 1 (step S122). In a state where the first axicon pattern is displayed on the liquid crystal layer 216, the laser oscillator 310 generates the laser light L to irradiate the machining object 1 with the laser light L. The observation camera 488 captures the point image photographic image of the reflected light RL (step S123). The point image gravity center position is calculated as the second position (step S124). Whether or not the number of times of capturing i which is the number of times of processing in above step S123 reaches the preset predetermined number of times (=the integer equal to or more than two) is determined (step S125). In a case of NO in above step S125, the phase pattern position on the liquid crystal layer 216 is changed by one pixel along the X direction to return to the processing in above step S123 (step S126).

In a case of YES in above step S125, the first axicon pattern position on the liquid crystal layer 216 is changed by one pixel along the Y direction (step S127). In the state where the first axicon pattern is displayed on the liquid crystal layer 216, the laser oscillator 310 generates the laser light L to irradiate the machining object 1 with the laser light L. The observation camera 488 captures the point image photographic image of the reflected light RL (step S128). The point image gravity center position is calculated as the second position (step S129). Whether or not the number of times of capturing j which is the number of times of processing in above step S128 reaches the preset predetermined number of times (=the integer equal to or more than two) is determined (step S130). In a case of NO in above step S130, the processing returns to above step S127.

Subsequently, the optical axis center of the liquid crystal layer 216 is calculated based on a plurality of first positions calculated in above step S114 and above step S119 and a plurality of second positions calculated in above step S124 and above step S129 (step S131). The controller 500 offsets the reference position of the liquid crystal layer 216 to the calculated optical axis center (step S132). By this means, the position of the image 39 of the laser light L transferred to the entrance pupil plane 430a is corrected to a state where the image-transfer position shift is reduced and eventually does not occur.

In another example of the above laser light irradiation method, the third phase pattern is the first axicon pattern, yet may be the second axicon pattern.

As described above, in the laser machining device 200 according to the present embodiment, the observation camera 488 captures the point image photographic image including the point image of the reflected light RL of the laser light L reflected on the surface 1a of the machining object 1. When the point image photographic image is captured, the first phase pattern is displayed on the liquid crystal layer 216 by the first display processing of the controller 500, and this first phase pattern adjusts the condensing position of the laser light L to the first condensing position. Furthermore, when the point image photographic image is captured, the second phase pattern is displayed on the liquid crystal layer 216 by the second display processing of the controller 500, and this second phase pattern adjusts the condensing position of the laser light L to the second condensing position. In this regard, a knowledge is found that, as illustrated in FIGS. 17 and 20, too, compared to a case where there is not image-transfer position shift, when there is an image-transfer position shift, the condenser lens unit 430 is not likely to adequately condense the laser light L, and the first condensing position and the second condensing position are likely to be apart from each other in the perpendicular direction perpendicular to the optical axis direction of the laser light L. Consequently, it is possible to learn the image-transfer position shift based on a capturing result of the observation camera 488 during execution of each of the first display processing and the second display processing.

In the laser machining device 200, the controller 500 obtains the first position which is a point image position of the reflected light RL captured by the observation camera 488 during execution of the first display processing, and obtains the second position which is a point image position of the reflected light RL captured by the observation camera 488 during the execution of the second display processing. According to the above knowledge, it is possible to learn the image-transfer position shift based on the obtained first position and second position.

In the laser machining device 200, the controller 500 determines that there is the image-transfer position shift when the obtained first position and second position do not match with each other. In this case, it is possible to automatically determine whether or not there is the image-transfer position shift.

In the laser machining device 200, the controller 500 offsets the reference position of the liquid crystal layer 216 based on the first position and the second position. In this case, it is possible to automatically adjust the position of the image 39 of the laser light L transferred to the entrance pupil plane 430a to, for example, reduce and eventually eliminate the image-transfer position shift.

When obtaining the first position, the laser machining device 200 moves the condenser lens unit 430 along the Z axis direction to the position at which the observation camera 488 can confirm the point image of the reflected light RL. The laser machining device 200 obtains a plurality of first positions by changing the position of the first phase pattern on the liquid crystal layer 216. Furthermore, when obtaining the second position, the laser machining device 200 moves the condenser lens unit 430 along the Z axis direction to the position at which the observation camera 488 can confirm the point image of the reflected light RL. The laser machining device 200 obtains a plurality of second positions by changing the position of the second phase pattern on the liquid crystal layer 216. The laser machining device 200 calculates the optical axis center of the liquid crystal layer 216 based on a plurality of first positions and a plurality of second positions, and offsets the reference position to the optical axis center. Consequently, it is possible to adjust the position of the image 39 of the laser light L transferred to the entrance pupil plane 430a to reduce and eventually eliminate the image-transfer position shift.

In the laser machining device 200, the first condensing position is one of above (A) to above (C), and the second condensing position is the other one of above (A) to above (C). Consequently, when there is an image-transfer position shift, it is possible to remarkably realize a state in FIG. 20 where the first condensing position and the second condensing position are apart from each other.

According to the laser light irradiation method which uses the laser machining device 200, it is possible to learn the image-transfer position shift based on the obtained first position and second position. Furthermore, by offsetting the reference position based on a plurality of first positions and a plurality of second positions, it is possible to adjust the position of the image 39 of the laser light L transferred to the entrance pupil plane 430a to, for example, reduce and eventually eliminate the image-transfer position shift.

Generally, there is adopted a method for actually performing laser machining on the machining object 1, deciding an image-transfer position shift from the machining quality (e.g., an elongation amount of a crack) of the machining object 1 after the laser machining, and adjusting the reference position of the liquid crystal layer 216. In this regard, the present embodiment enables a simple operation during, for example, regular condition check. Furthermore, before the reference position adjustment processing is executed, whether or not there is an image-transfer position shift is determined first. Consequently, even when there is no image-transfer position shift, it is possible to prevent the reference position adjustment processing from being executed, and perform an efficient operation.

In the laser machining device 200, the observation camera 488 captures the point image photographic image including the point image of the reflected light RL of the laser light L reflected on the surface 1a of the machining object 1. When the point image photographic image is captured, the third phase pattern is displayed on the liquid crystal layer 216 by the display processing of the controller 500, and this third phase pattern condenses the laser light L to be condensed to the elongated condensing range. In this regard, as illustrated in FIGS. 18, 19, 21 and 22, too, compared to a case where there is no image-transfer position shift, when there is an image-transfer position shift, the condenser lens unit 430 is likely not to adequately condense the laser light L. It is found that the side of the condenser lens unit 430 and the opposite side of the condenser lens unit 430 in the condensing range are likely to be apart from each other in the direction perpendicular to the irradiation direction of the laser light. Consequently, it is possible to learn the image-transfer position shift based on a capturing result of the observation camera 488 during execution of the display processing.

The preferred embodiment has been described above. However, the present invention is not limited to the above embodiment, and may be modified without changing the gist recited in each claim and be applied to other embodiments.

The embodiment is not limited to a case where the modified region 7 is formed inside the machining object 1, and other laser machining such as ablation may be performed. The embodiment is not limited to the laser machining device which is used for laser machining for condensing the laser light L inside the machining object 1. The laser machining device used for laser machining for condensing the laser light L on the surface 1a or 3 or the back surface 1b of the machining object 1 may be used. Devices to which the present invention is applied are not limited to the laser machining device, and are applicable to various laser light irradiation devices as long as the devices irradiate an object with the laser light L. In the above embodiment, the cutting scheduled line 5 is an irradiation scheduled line. However, the irradiation scheduled line is not limited to the cutting scheduled line 5, and may be a line along which the laser light L is irradiated.

In the above embodiment, image formation optical systems which constitute the double-sided telecentric optical system having the image formation relationship between the reflection surface 410a of the reflective spatial light modulator 410 and the entrance pupil plane 430a of the condenser lens unit 430 are not limited to a pair of lenses 422 and 423. The image formation optical systems may include a first lens system (e.g., a doublet or three or more lenses) on the side of the reflective spatial light modulator 410, and a second lens system (e.g., a doublet or three or more lenses) on the side of the condenser lens unit 430.

In the above embodiment, relay magnifications of the lens 422, the lens 423 and the lens 463 may be any magnifications. In the above embodiment, the reflective spatial light modulator 410 is provided. However, the spatial light modulator is not limited to a reflective type, and may include a transmissive spatial light modulator.

In the above embodiment, the condenser lens unit 430 and a pair of distance measurement sensors 450 are attached to the end portion 401d of the housing 401 in the Y axis direction. However, the condenser lens unit 430 and the pair of distance measurement sensors 450 only need to be attached closer to the side of the end portion 401d than the center position of the housing 401 in the Y axis direction. The reflective spatial light modulator 410 is attached to the end portion 401c of the housing 401 in the Y axis direction. However, the reflective spatial light modulator 410 only needs to be attached closer to the side of the end portion 401c than the center position of the housing 401 in the Y axis direction. Furthermore, the distance measurement sensors 450 may be disposed only on one side of the condenser lens unit 430 in the X axis direction.

In the above embodiment, the controller 500 performs both of determination on the image-transfer position shift and adjustment (offset) of the reference position. However, the controller 500 may only determine the image-transfer position shift or only adjust the reference position. Furthermore, instead of or in addition to that the controller 500 determines the image-transfer position shift, the monitor may display a point image photographic image (a detection result of the reflected light RL), and an operator may visually check and decide the image-transfer position shift based on the point image photographic image. Instead of or in addition to that the controller 500 adjusts the reference position, the monitor may display a point image photographic image, and the operator may visually check and adjust the reference position based on the point image photographic image. The controller 500 may be one electronic controller or may include a plurality of electronic controllers.

In the above embodiment, the reflection surface of the laser light L is the surface 1a of the machining object 1, yet may be the back surface 1b. In this case, the reflected light RL may be the laser light L which is incident on the surface 1a of the machining object 1, transmits through the inside of the machining object 1 and is reflected on the back surface 1b. In the above embodiment, an object irradiated with the laser light L is not limited to the machining object 1, and may be an object including the reflection surface. For example, the object may be a mirror including the reflection surface.

REFERENCE SIGNS LIST

1 machining object (object)
1a, 3 surface (reflection surface)
100, 200 laser machining device (laser light irradiation device)
216 liquid crystal layer (display unit)
240 second movement mechanism (movement mechanism)
310 laser oscillator (laser light source)
410 reflective spatial light modulator (spatial light modulator)
420 4f lens unit (image-transfer optical system)
430 condenser lens unit (objective lens)
430a entrance pupil plane
488 observation camera (camera)
500 control unit (point image position obtaining unit, position determining unit, position adjusting unit)
L laser light
P100 condensing range
P200 condensing range
RL reflected light

The invention claimed is:

1. A laser light irradiation device configured to irradiate an object including a reflection surface with laser light, the laser light irradiation device comprising:
   a laser light source configured to generate the laser light;
   a spatial light modulator comprising a display unit configured to display a phase pattern, the spatial light modulator configured to cause the laser light generated by the laser light source to enter the display unit, modulate the laser light according to the phase pattern, and emit the laser light from the display unit;
   an objective lens configured to condense the laser light emitted from the spatial light modulator on the object;
   an image-transfer optical system configured to transfer an image of the laser light of the display unit of the spatial light modulator to an entrance pupil plane of the objective lens;
   a camera configured to capture an image including a point image of reflected light of the laser light irradiated on the object and reflected on the reflection surface;
   a controller configured to control at least the phase pattern to be displayed on the display unit, wherein the controller executes
      first display processing of, when the camera captures the image, causing the display unit to display a first phase pattern for adjusting a condensing position of the laser light condensed by the objective lens to a first condensing position, and
      second display processing of, when the camera captures the image, causing the display unit to display a second phase pattern for adjusting the condensing position of the laser light condensed by the objective lens to a second condensing position different from the first condensing position in an irradiation direction of the laser light;

a monitor configured to display the image captured by the camera, wherein the monitor displays the image including the point image of the reflected light captured by the camera during the first display processing and to be placed at a first position and the image including the point image of the reflected light captured by the camera during the second display processing and to be placed at a second position that does not match the first position if there is a shift between a center position of the entrance pupil plane and a center position of the image of the laser light transferred to the entrance of the pupil plane by the image-transfer optical system;

a point image position obtaining unit configured to obtain a position of the point image of the reflected light in the image captured by the camera, wherein the point image position obtaining unit executes first position obtaining processing of obtaining the first position, the first position being the position of the point image of the reflected light in the image captured by the camera during the execution of the first display processing, and second position obtaining processing of obtaining the second position, the second position being the position of the point image of the reflected light in the image captured by the camera during the execution of the second display processing;

a position adjusting unit configured to offset a reference position based on the first position and the second position obtained by the point image position obtaining unit, the reference position being a reference when the display unit displays the phase pattern; and a movement mechanism configured to move at least one of the objective lens and the object, wherein the controller causes the movement mechanism to move at least one of the objective lens and the object to a position at which the camera can confirm the point image of the reflected light when the first position is obtained by the first position obtaining processing of the point image position obtaining unit, and causes the movement mechanism to move at least one of the objective lens and the object to the position at which the camera can confirm the point image of the reflected light when the second position is obtained by the second position obtaining processing of the point image position obtaining unit, the point image position obtaining unit repeatedly executes the first position obtaining processing a plurality of times while changing a position of the first phase pattern on the display unit, and repeatedly executes the second position obtaining processing a plurality of times while changing a position of the second phase pattern on the display unit, and the position adjusting unit calculates an optical axis center of the display unit based on a plurality of the first positions and a plurality of the second positions, and offsets the reference position to the optical axis center.

2. The laser light irradiation device according to claim 1, comprising a position determining unit configured to, when the first position and the second position obtained by the point image position obtaining unit do not match with each other, determine that there is a shift between a center position of the entrance pupil plane and a center position of the image of the laser light transferred to the entrance pupil plane by the image-transfer optical system.

3. The laser light irradiation device according to claim 1, wherein the first condensing position is one of following (A) to (C), and the second condensing position is another one of the following (A) to (C):

(A) a focal position of the objective lens, (B) a position on a side of the objective lens with respect to the focal position of the objective lens, and (C) a position on a side opposite to the objective lens with respect to the focal position of the objective lens.

4. A laser light irradiation device configured to irradiate an object including a reflection surface with laser light, the laser light irradiation device comprising:

a laser light source configured to generate the laser light;

a spatial light modulator comprising a display unit configured to display a phase pattern, the spatial light modulator configured to cause the laser light generated by the laser light source to enter the display unit, modulate the laser light according to the phase pattern, and emit the laser light from the display unit;

an objective lens configured to condense the laser light emitted from the spatial light modulator on the object;

an image-transfer optical system configured to transfer an image of the laser light of the display unit of the spatial light modulator to an entrance pupil plane of the objective lens;

a camera configured to capture an image including a point image of reflected light of the laser light irradiated on the object and reflected on the reflection surface;

a controller configured to control at least the phase pattern to be displayed on the display unit, wherein the controller executes first display processing of, when the camera captures the image, causing the display unit to display a first phase pattern for adjusting a condensing position of the laser light condensed by the objective lens to a first condensing position, and second display processing of, when the camera captures the image, causing the display unit to display a second phase pattern for adjusting the condensing position of the laser light condensed by the objective lens to a second condensing position different from the first condensing position in an irradiation direction of the laser light;

a monitor configured to display the image captured by the camera, wherein the monitor displays the image including the point image of the reflected light captured by the camera during the first display processing and to be placed at a first position and the image including the point image of the reflected light captured by the camera during the second display processing and to be placed at a second position that does not match the first position if there is a shift between a center position of the entrance pupil plane and a center position of the image of the laser light transferred to the entrance of the pupil plane by the image-transfer optical system;

a point image position obtaining unit configured to obtain a position of the point image of the reflected light in the image captured by the camera, wherein the point image position obtaining unit executes first position obtaining processing of obtaining the first position, the first position being the position of the point image of the reflected light in the image captured by the camera during the execution of the first display processing, and second position obtaining processing of obtaining the second position, the second position being the position of the point image of the reflected light in the image captured by the camera during the execution of the second display processing;

a position determining unit configured to, when the first position and the second position obtained by the point image position obtaining unit do not match with each other, determine that there is a shift between a center position of the entrance pupil plane and a center position of the image of the laser light transferred to the entrance pupil plane by the image-transfer optical system;

a position adjusting unit configured to offset a reference position based on the first position and the second position obtained by the point image position obtaining unit, the reference position being a reference when the display unit displays the phase pattern; and a movement mechanism configured to move at least one of the objective lens and the object, wherein the controller causes the movement mechanism to move at least one of the objective lens and the object to a position at which the camera can confirm the point image of the reflected light when the first position is obtained by the first position obtaining processing of the point image position obtaining unit, and causes the movement mechanism to move at least one of the objective lens and the object to the position at which the camera can confirm the point image of the reflected light when the second position is obtained by the second position obtaining processing of the point image position obtaining unit, the point image position obtaining unit repeatedly executes the first position obtaining processing a plurality of times while changing a position of the first phase pattern on the display unit, and repeatedly executes the second position obtaining processing a plurality of times while changing a position of the second phase pattern on the display unit, and the position adjusting unit calculates an optical axis center of the display unit based on a plurality of the first positions and a plurality of the second positions, and offsets the reference position to the optical axis center.

5. A laser light irradiation device configured to irradiate an object including a reflection surface with laser light, the laser light irradiation device comprising:

a laser light source configured to generate the laser light;

a spatial light modulator comprising a display unit configured to display a phase pattern, the spatial light modulator configured to cause the laser light generated by the laser light source to enter the display unit, modulate the laser light according to the phase pattern, and emit the laser light from the display unit;

an objective lens configured to condense the laser light emitted from the spatial light modulator on the object;

an image-transfer optical system configured to transfer an image of the laser light of the display unit of the spatial light modulator to an entrance pupil plane of the objective lens;

a camera configured to capture an image including a point image of reflected light of the laser light irradiated on the object and reflected on the reflection surface;

a controller configured to control at least the phase pattern to be displayed on the display unit, wherein the controller executes first display processing of, when the camera captures the image, causing the display unit to display a first phase pattern for adjusting a condensing position of the laser light condensed by the objective lens to a first condensing position, and second display processing of, when the camera captures the image, causing the display unit to display a second phase pattern for adjusting the condensing position of the laser light condensed by the objective lens to a second condensing position different from the first condensing position in an irradiation direction of the laser light;

a point image position obtaining unit configured to obtain a position of the point image of the reflected light in the image captured by the camera, wherein the point image position obtaining unit executes first position obtaining processing of obtaining a first position, the first position being the position of the point image of the reflected light in the image captured by the camera during the execution of the first display processing, and second position obtaining processing of obtaining a second position, the second position being the position of the point image of the reflected light in the image captured by the camera during the execution of the second display processing;

a position adjusting unit configured to offset a reference position based on the first position and the second position obtained by the point image position obtaining unit, the reference position being a reference when the display unit displays the phase pattern; and a movement mechanism configured to move at least one of the objective lens and the object, wherein the controller causes the movement mechanism to move at least one of the objective lens and the object to a position at which the camera can confirm the point image of the reflected light when the first position is obtained by the first position obtaining processing of the point image position obtaining unit, and causes the movement mechanism to move at least one of the objective lens and the object to the position at which the camera can confirm the point image of the reflected light when the second position is obtained by the second position obtaining processing of the point image position obtaining unit, the point image position obtaining unit repeatedly executes the first position obtaining processing a plurality of times while changing a position of the first phase pattern on the display unit, and repeatedly executes the second position obtaining processing a plurality of times while changing a position of the second phase pattern on the display unit, and the position adjusting unit calculates an optical axis center of the display unit based on a plurality of the first positions and a plurality of the second positions, and offsets the reference position to the optical axis center.

6. A laser light irradiation device configured to irradiate an object including a reflection surface with laser light, the laser light irradiation device comprising:

a laser light source configured to generate the laser light;

a spatial light modulator comprising a display unit configured to display a phase pattern, the spatial light modulator configured to cause the laser light generated by the laser light source to enter the display unit, modulate the laser light according to the phase pattern, and emit the laser light from the display unit;

an objective lens configured to condense the laser light emitted from the spatial light modulator on the object;

an image-transfer optical system configured to transfer an image of the laser light of the display unit of the spatial light modulator to an entrance pupil plane of the objective lens;

a camera configured to capture an image including a point image of reflected light of the laser light irradiated on the object and reflected on the reflection surface;

a controller configured to control at least the phase pattern to be displayed on the display unit, wherein the controller executes first display processing of, when the camera captures the image, causing the display unit to display a first phase pattern for adjusting a condensing position of the laser light condensed by the objective lens to a first condensing position, and second display processing of, when the camera captures the image, causing the display unit to display a second phase pattern for adjusting the condensing position of the laser light condensed by the objective lens to a second condensing position different from the first condensing position in an irradiation direction of the laser light;

a point image position obtaining unit configured to obtain a position of the point image of the reflected light in the image captured by the camera, wherein the point image position obtaining unit executes first position obtaining processing of obtaining a first position, the first position being the position of the point image of the reflected light in the image captured by the camera during the execution of the first display processing, and second position obtaining processing of obtaining a second position, the second position being the position of the point image of the reflected light in the image captured by the camera during the execution of the second display processing;

a position determining unit configured to, when the first position and the second position obtained by the point image position obtaining unit do not match with each other, determine that there is a shift between a center position of the entrance pupil plane and a center position of the image of the laser light transferred to the entrance pupil plane by the image-transfer optical system;

a position adjusting unit configured to offset a reference position based on the first position and the second position obtained by the point image position obtaining unit, the reference position being a reference when the display unit displays the phase pattern; and a movement mechanism configured to move at least one of the objective lens and the object, wherein the controller
causes the movement mechanism to move at least one of the objective lens and the object to a position at which the camera can confirm the point image of the reflected light when the first position is obtained by the first position obtaining processing of the point image position obtaining unit, and causes the movement mechanism to move at least one of the objective lens and the object to the position at which the camera can confirm the point image of the reflected light when the second position is obtained by the second position obtaining processing of the point image position obtaining unit, the point image position obtaining unit
repeatedly executes the first position obtaining processing a plurality of times while changing a position of the first phase pattern on the display unit, and repeatedly executes the second position obtaining processing a plurality of times while changing a position of the second phase pattern on the display unit, and the position adjusting unit calculates an optical axis center of the display unit based on a plurality of the first positions and a plurality of the second positions, and offsets the reference position to the optical axis center.

* * * * *